(12) United States Patent
Shapiro

(10) Patent No.: US 6,916,028 B2
(45) Date of Patent: Jul. 12, 2005

(54) COLLAPSIBLE COMPACT CARRIER DEVICE WITH COLLAPSIBLE WHEEL CONSTRUCTION

(76) Inventor: Richard N. Shapiro, 2248 Haversham Close, Virginia Beach, VA (US) 23454

(*) Notice: Subject to any disclaimer, the term of this patent is extended or adjusted under 35 U.S.C. 154(b) by 215 days.

(21) Appl. No.: 10/323,892

(22) Filed: Dec. 20, 2002

(65) Prior Publication Data

US 2003/0085552 A1 May 8, 2003

Related U.S. Application Data

(60) Division of application No. 09/604,769, filed on Jun. 28, 2000, now Pat. No. 6,581,945, which is a continuation-in-part of application No. 09/271,274, filed on Mar. 17, 1999, now Pat. No. 6,220,611.

(51) Int. Cl.[7] ............................................. B62B 11/00
(52) U.S. Cl. ........................... 280/47.34; 280/87.05; 280/648; 280/47.18; 280/47.25; 280/651
(58) Field of Search ................................. 280/827, 1.23, 280/828, 7.1, 7.15, 647, 648, 650, 651, 655, 656, 657, 658, 87.01, 87.021, 87.05, 47.18, 47.25, 47.38, 47.4

(56) References Cited

U.S. PATENT DOCUMENTS

| | | | | |
|---|---|---|---|---|
| 125,126 A | * | 4/1872 | Eastman | 280/39 |
| 474,138 A | * | 5/1892 | Long | 280/7.17 |
| 598,964 A | | 2/1898 | Stern et al. | 280/37 |
| 855,000 A | | 5/1907 | Grimmer | 280/37 |
| 877,350 A | * | 1/1908 | Long | 280/37 |
| 955,783 A | * | 4/1910 | Folgeman et al. | 280/37 |
| 987,895 A | * | 3/1911 | Long | 280/37 |
| 989,561 A | * | 4/1911 | Braham | 280/37 |
| 1,017,983 A | * | 2/1912 | Long | 280/37 |
| 1,024,176 A | * | 4/1912 | Boyens | 280/37 |
| 1,025,292 A | * | 5/1912 | Nilsson | 280/37 |
| 1,076,087 A | * | 10/1913 | Wannenwetsch | 280/37 |
| 1,352,577 A | * | 9/1920 | Brock | 280/87.05 |
| 1,373,034 A | * | 3/1921 | Trevillian | 280/37 |
| 1,449,255 A | * | 3/1923 | Abrahams et al. | 280/7.1 |
| 1,465,211 A | * | 8/1923 | Dunkelberger | 280/87.01 |
| 1,492,244 A | * | 4/1924 | Jousset et al. | 280/87.01 |
| 1,569,498 A | * | 1/1926 | Ferris | 280/400 |
| 1,622,108 A | * | 3/1927 | Hawkinson | 280/87.05 |
| 1,650,163 A | * | 11/1927 | Taylor | 280/87.01 |

(Continued)

Primary Examiner—Christopher P. Ellis
Assistant Examiner—Bridget Avery

(57) ABSTRACT

A wheeled carrier device is provided which, in one embodiment, includes a plurality of foldable walls supported on a base member and movable between an erected state wherein the walls define a carrier space and a collapsed state wherein the walls are folded on top of the base member. The carrier device has at least two wheels and a wheel mounting assembly pivotably mounts the wheels on the device on opposite sides thereof such that, in one embodiment, the wheels are movable through 270° from a first, operative position wherein the wheels support the carrier device and a second, inoperative position wherein upon release of a latching mechanism the wheels are folded over on top of the folded walls in the collapsed state thereof. A handle is affixed to the carrier device and is movable between an operative state wherein the handle can be used to pull the carrier device and an inoperative state wherein the handle is stowed in substantially flush relation with the remainder of the carrier. In other embodiments, the wheels are pivoted through 90° to the stowed state thereof. In some embodiments, one or more of the wheels is rotatable about a support axle and various arrangements are provided for fixating the wheels against rotation. In other embodiments, some of the same basic principles are used in a collapsible stroller/jogger as well as in a collapsible "fun car" for children.

32 Claims, 54 Drawing Sheets

U.S. PATENT DOCUMENTS

| | | | | |
|---|---|---|---|---|
| 1,662,292 A | * | 3/1928 | Bender | 280/7.1 |
| 2,080,922 A | * | 5/1937 | Kraeft | 280/828 |
| 2,092,388 A | * | 9/1937 | Caulkins | 280/87.01 |
| 2,222,678 A | * | 11/1940 | Mittleburg et al. | 280/16 |
| 2,225,999 A | * | 12/1940 | Kroll et al. | 280/649 |
| 2,276,792 A | * | 3/1942 | Peltier | 280/7.1 |
| 2,802,672 A | * | 8/1957 | D Angelo | 280/40 |
| 2,986,400 A | * | 5/1961 | Phillips | 280/7.17 |
| 2,998,979 A | * | 9/1961 | Sandell | 280/87.05 |
| 3,116,935 A | * | 1/1964 | Mitchin et al. | 280/7.1 |
| 3,143,359 A | * | 8/1964 | Dupuis | 280/87.03 |
| 3,204,367 A | * | 9/1965 | Stubbmann | 446/227 |
| 3,318,612 A | * | 5/1967 | Kuhn | 280/79.2 |
| 3,488,062 A | * | 1/1970 | Walda | 280/43 |
| 4,089,543 A | * | 5/1978 | Osborne | 280/647 |
| 4,165,094 A | * | 8/1979 | Onda | 280/261 |
| 4,779,889 A | * | 10/1988 | Morrison | 280/475 |
| 4,796,909 A | * | 1/1989 | Kirkendall | 280/651 |
| 5,261,690 A | * | 11/1993 | Kluber | 280/648 |
| 5,310,199 A | * | 5/1994 | Korkin | 280/87.01 |
| 5,772,222 A | * | 6/1998 | Sim et al. | 280/30 |
| 5,884,922 A | * | 3/1999 | Pickering | 280/7.17 |
| 5,997,016 A | * | 12/1999 | Kaechele | 280/87.021 |
| 6,250,652 B1 | * | 6/2001 | Nelson | 280/47.38 |

* cited by examiner

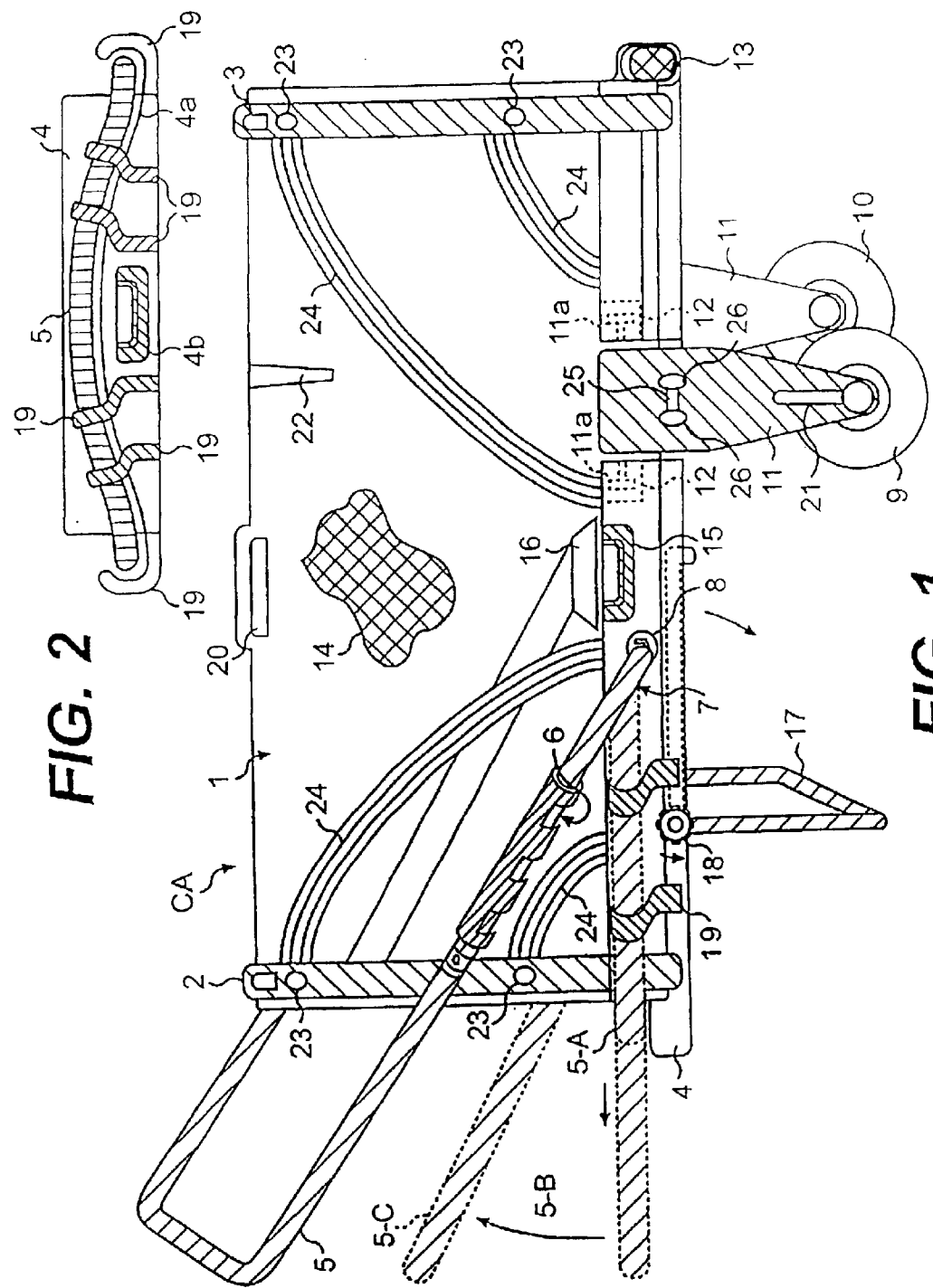

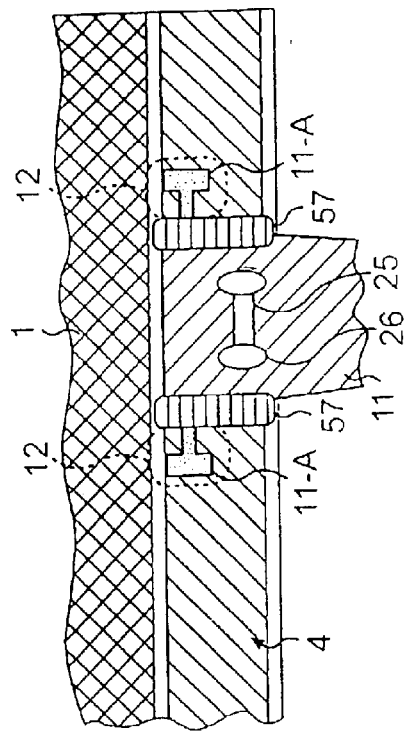
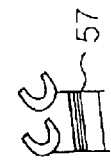
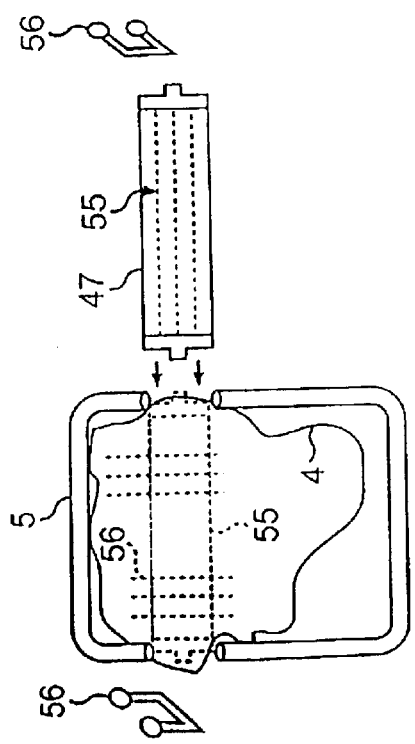
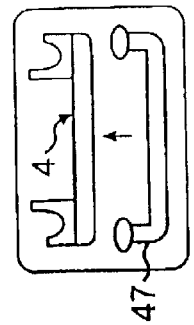

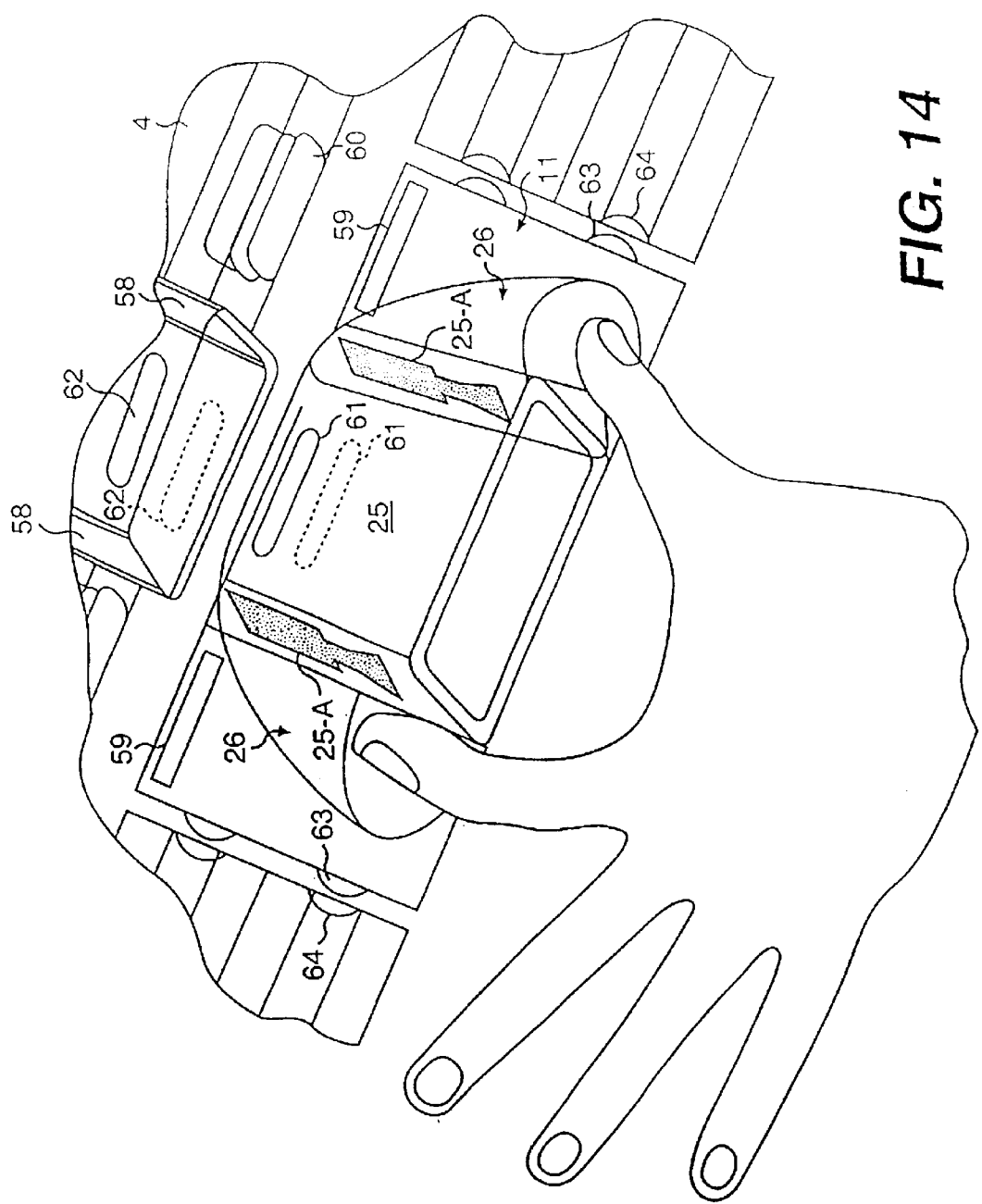

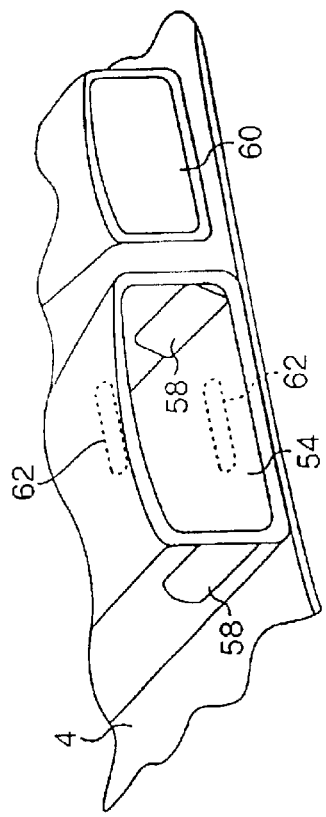
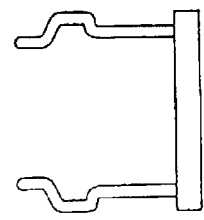
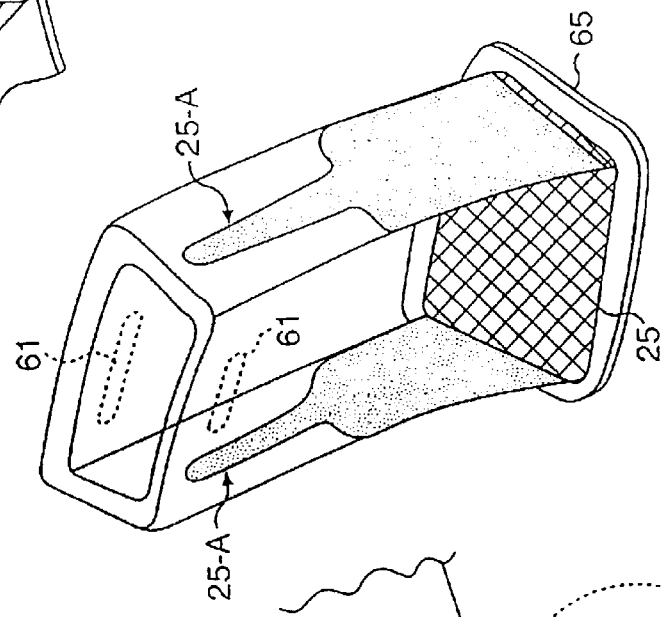
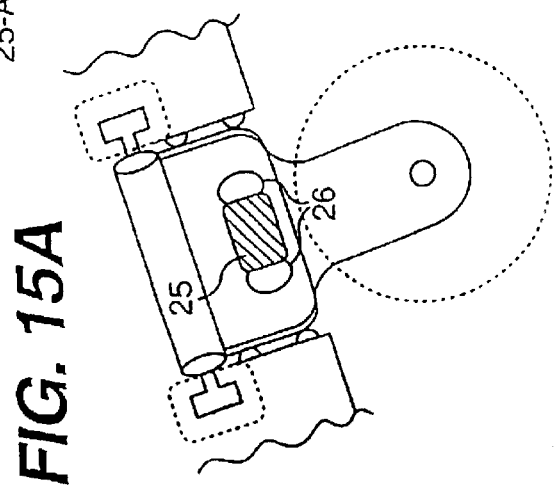

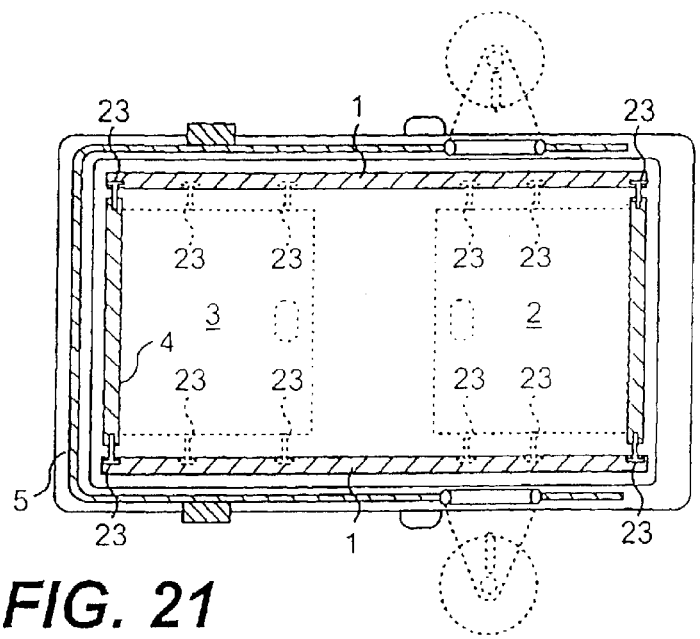
FIG. 21
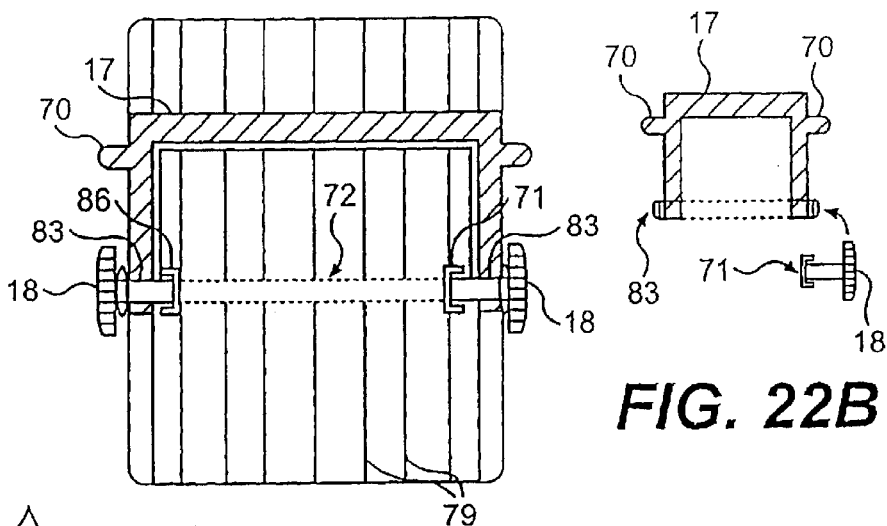
FIG. 22A
FIG. 22B
FIG. 22C

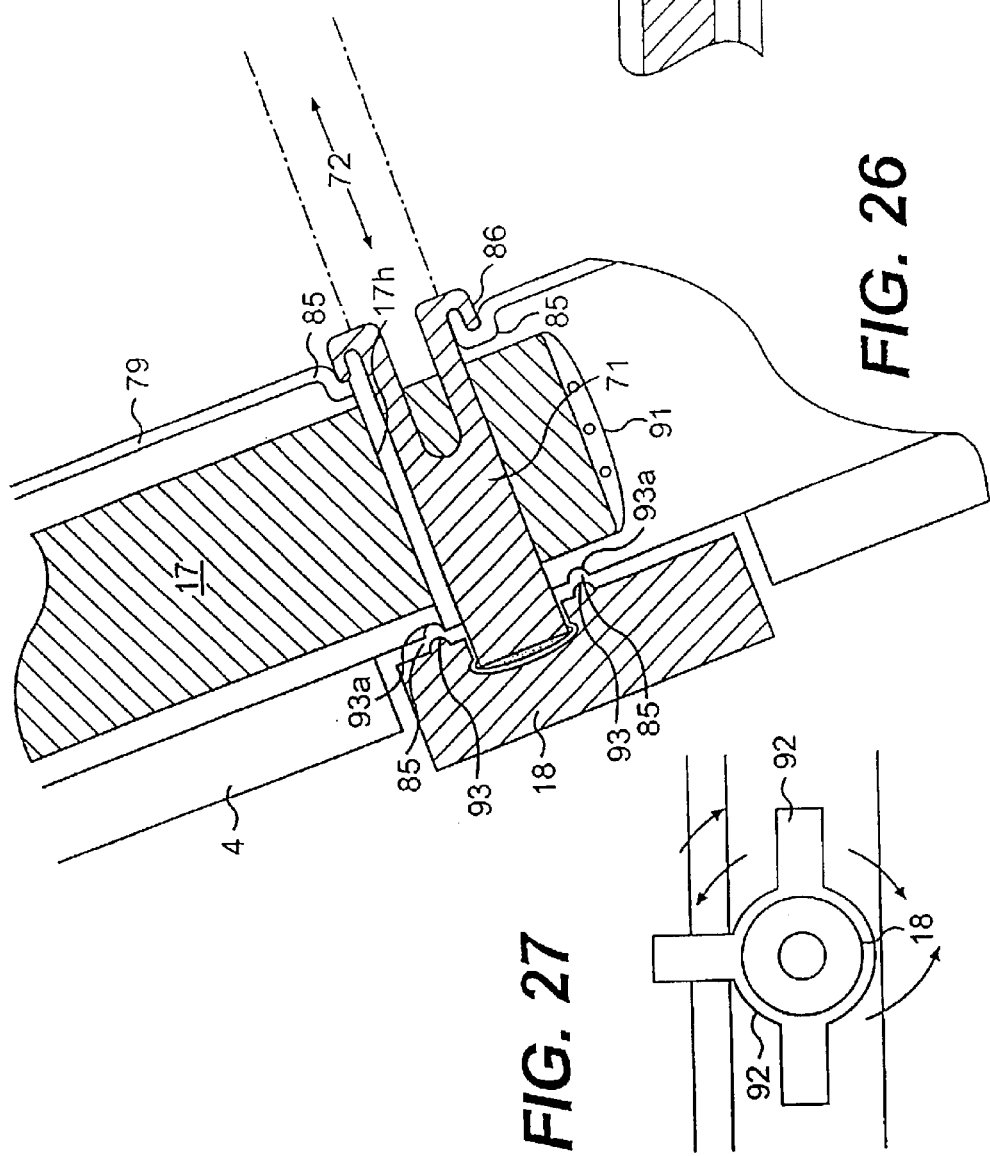

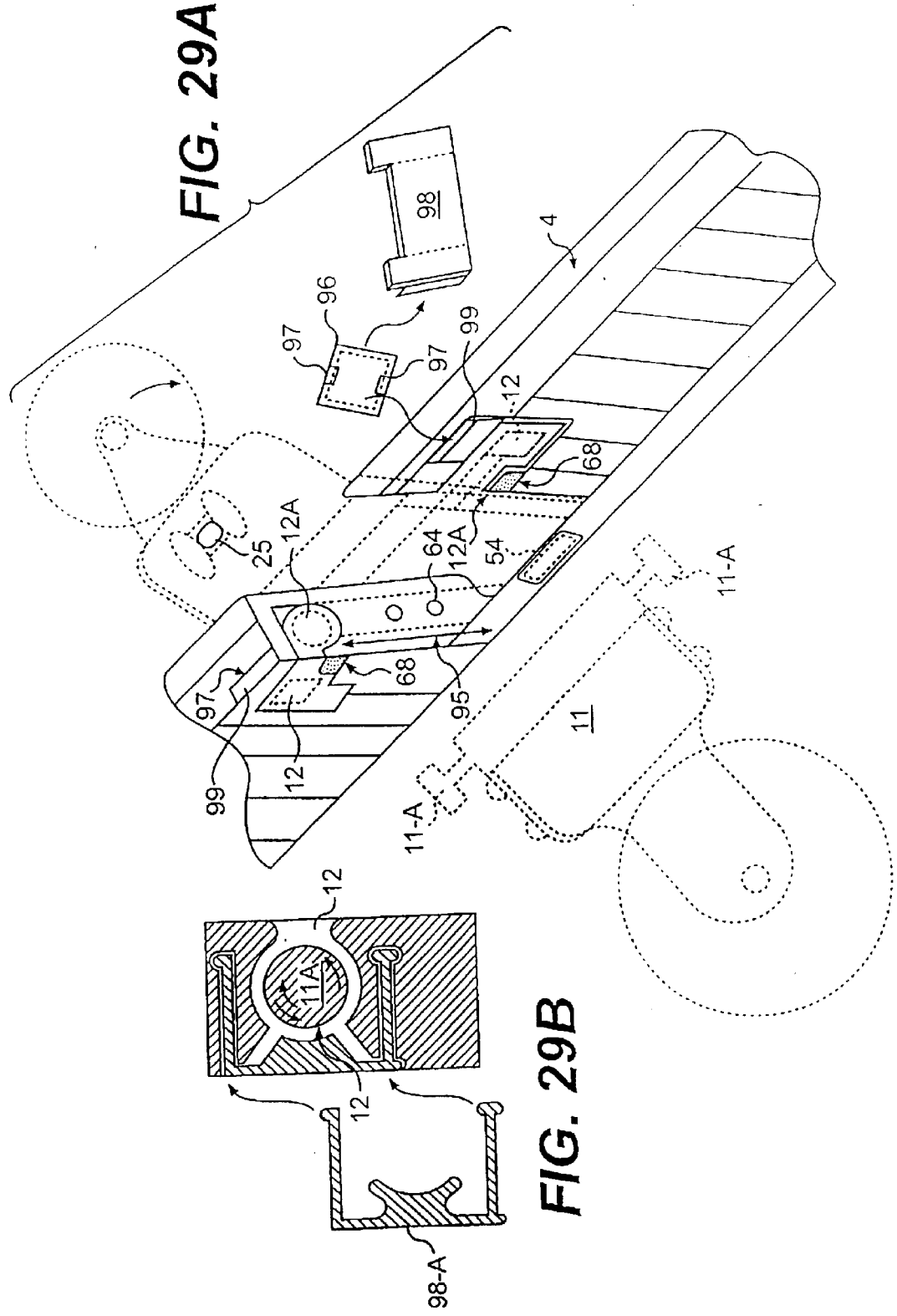

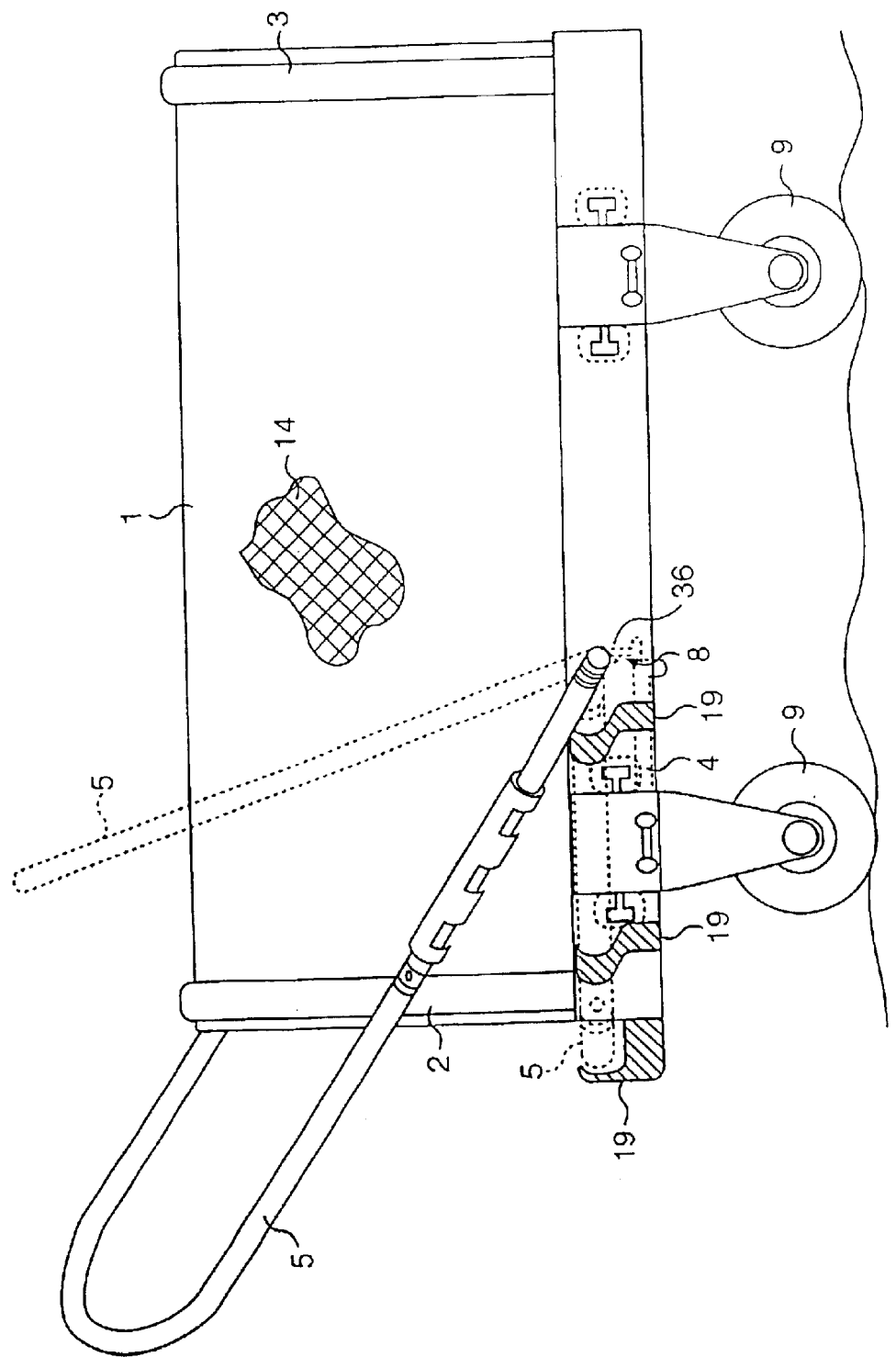

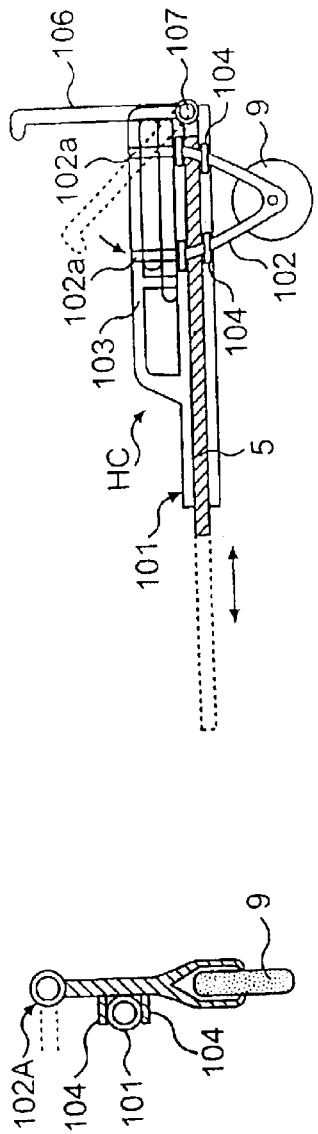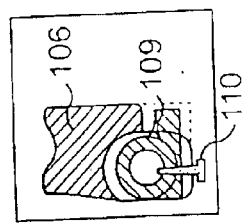

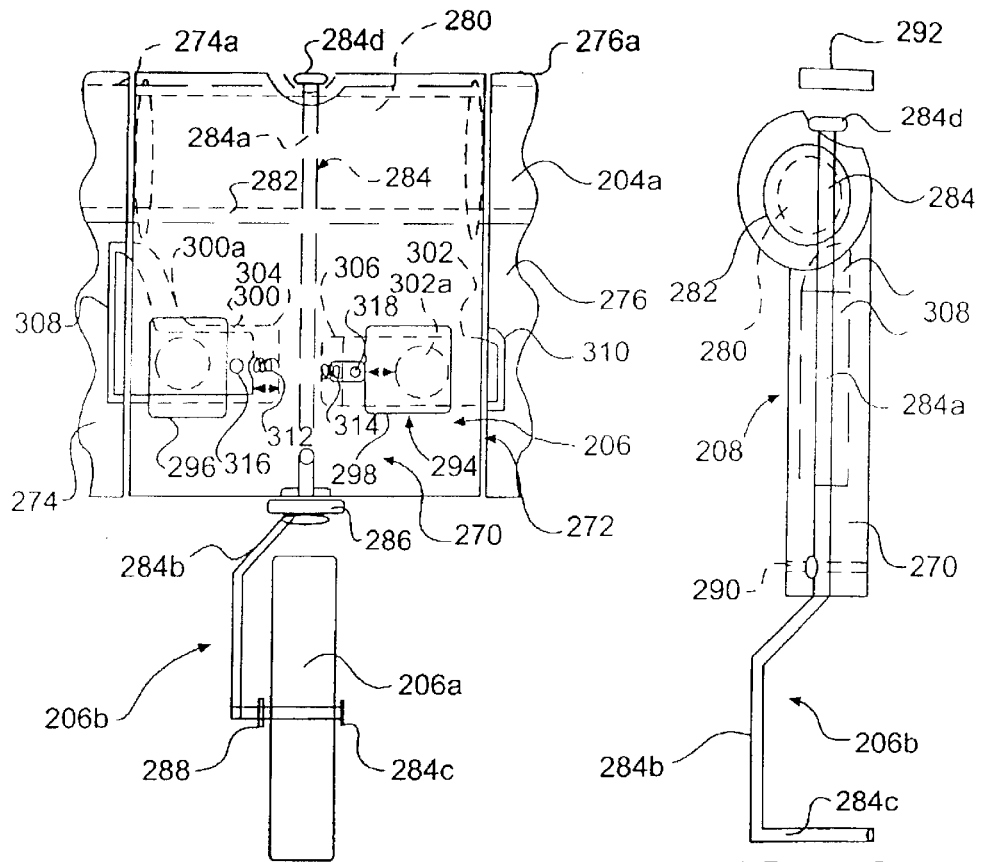
FIG. 56  FIG. 59
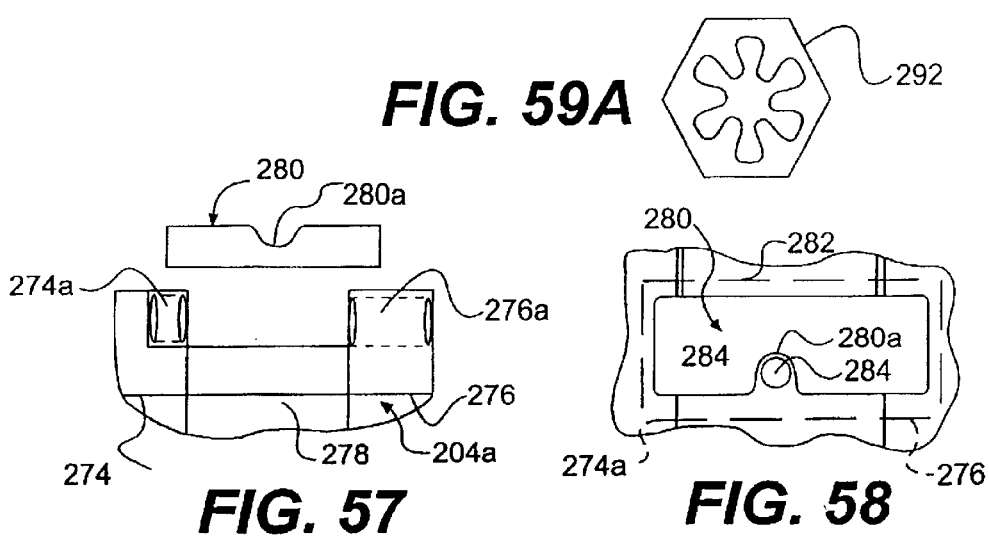
FIG. 59A
FIG. 57  FIG. 58

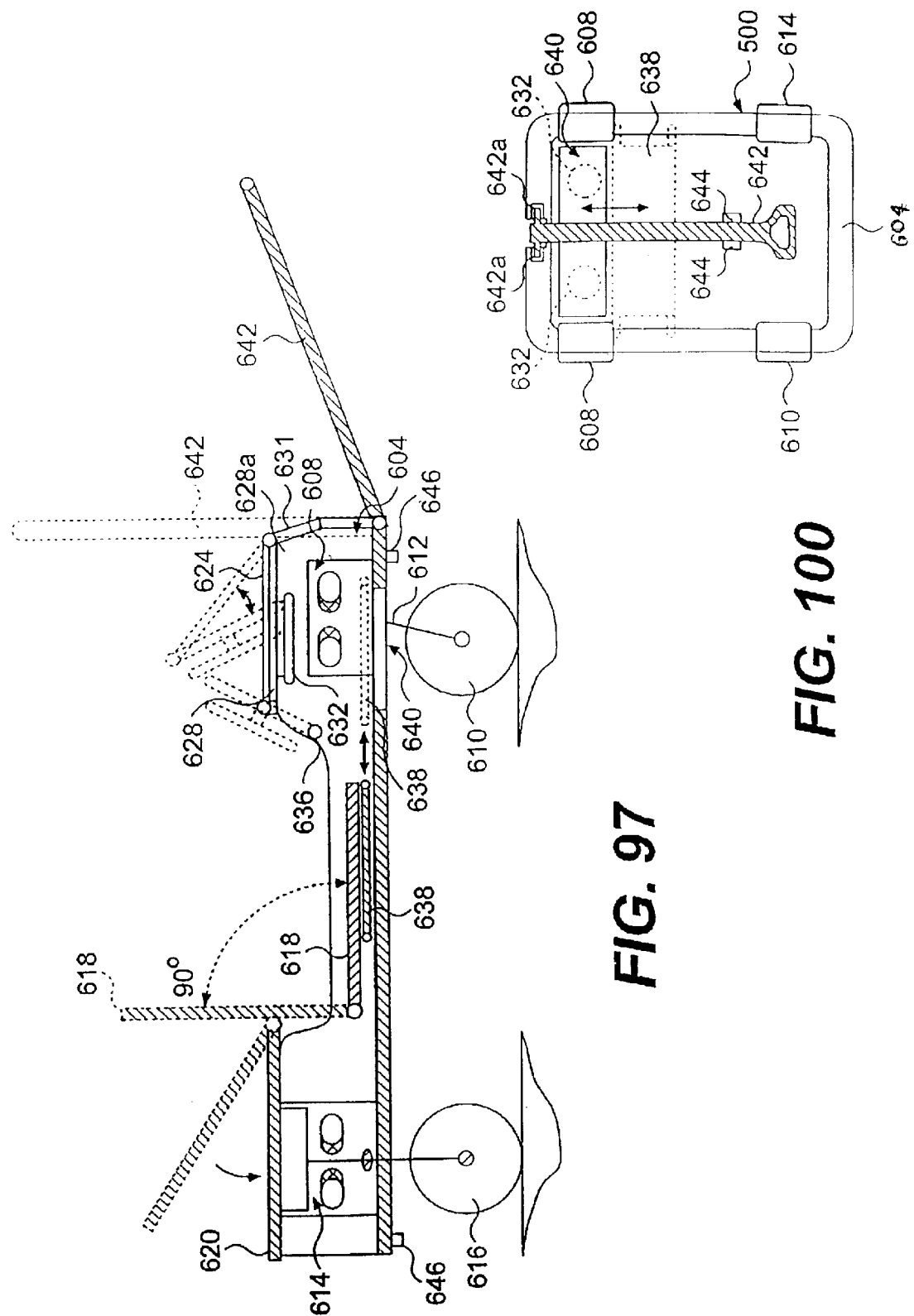

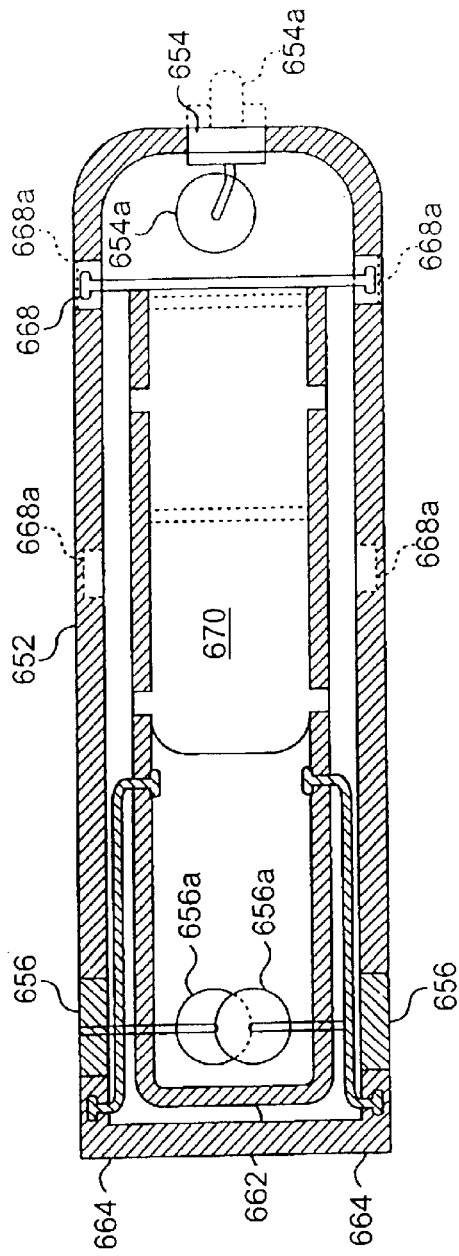
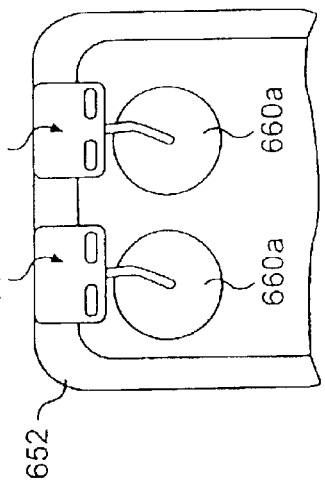
FIG. 107
FIG. 108
FIG. 109

COLLAPSIBLE COMPACT CARRIER DEVICE WITH COLLAPSIBLE WHEEL CONSTRUCTION

CROSS REFERENCE TO OTHER APPLICATIONS

This application is a division of U.S. Ser. No. 09/604,769 filed on Jun. 28, 2000 now U.S. Pat. No. 6,581,945, which is itself a continuation-in-part of U.S. application Ser. No. 09/271,274 filed on Mar. 17, 1999 now U.S. Pat. No. 6,220,611.

FIELD OF THE INVENTION

The present invention relates to wheeled carts, wagons and like carrier devices and, more particularly, to a collapsible wheeled carrier device which folds or collapses down to a very thin profile.

BACKGROUND OF THE INVENTION

Consumers have increasingly placed a premium on compact yet durable, space saving devices which move cargo, a fact that is easily demonstrated by the exponential growth in wheeled luggage devices using recessing, telescoping handles, as well as the ever expanding number of utility carts and four wheel wagons providing folding or recessing handles. It is often the stated object of many of these latter mentioned cart or wagon devices to provide for a simple design which includes a folding or recessing handle structure, thereby allowing for easier transport of devices, e.g., in a car trunk, or to allow for compact display or storage. However, in actuality, there is little that is compact or space-saving in most of these devices which characteristically incorporate a fixed or one piece cargo area or "well," and set of two or four wheels which are affixed to an axle, and which provide no method for any of the wheels to fold or recess in a space saving manner. In general, merely recessing or folding a handle structure alone goes a very little way in creating a truly space-saving cart or wagon device.

Over many years, countless designs have been proposed for folding or collapsing rolling carts and wagons. Most suffer from a number of problems, including those relating to difficulty of manufacture, the need for many detachable parts, or difficulty in use, i.e., the requirement for non-intuitive actions by a consumer in order to determine how to collapse or set-up the cart or wagon. For example, see U.S. Pat. Nos. 4,109,926 (Lane), 4,856,810 (Smith), 4,765,643 (Pappanikolaou). Previous patents have also generally disclosed folding side, front and rear walls which fold or collapse in various fashions (see, e.g., U.S. Pat. No. 4,887,836 (Simjian)).

Further, numerous patents have described methods to fold or nest cart or wagon handles using various methods, including articulating joints, detachable handles, or pivoting handle structures. For example, see U.S. Pat. Nos. 2,350,062 (Mosier), 2,984,499 (Humphrey), 4,889,360 (Havlovitz) and 5,692,761 (Havlovitz). The devices of the Havlovitz patents are notable for the simplicity of their design and both include a folding handle. The primary deficiency of the devices of the Havlovitz Patents, despite their simplicity, is that the devices are not truly compact designs. Moreover, in the latter patent, it is quite awkward for the consumer to fold the handle down, since this requires lifting of the entire cart off the ground to achieve the recess handle position. The prior art also discloses wheel support arms which pivot through, in general, 90° along an axis adjacent to the base or underside of the wheeled device, but, in general, such wheels support arms must be folded out from the underside of the device and generally require some other interfitting device or part to cooperate with the wheel support arms to "lock" or resiliently retain the pivoting wheel structure in place.

In general, the invention overcomes a large number of deficiencies and disadvantages in the prior art carts and wagons. It is believed that these deficiencies and disadvantages have prevented the manufacture of a truly compact, space saving wheeled device having a very thin profile. The invention also provides a folding cart or wagon which is simple to assemble and manufacture, which sets up in seconds, which includes a minimum number of separate parts, which has no part which normally detaches, which is very simple to operate properly, and which does not require a consumer to occupy an awkward position to set up.

Objects of the invention include the following: to provide a unique 270° pivoting wheel and wheel support structure which may be used with several different types of support arm structures, including the provision of retention means between the support arm structure and the base and/or walls of the various two or four-wheel devices described hereinbelow; to provide a unique ultra-flat, compact and space saving construction which involves recessing of a generally "U" shaped handle (or two straight handles) into the profile of such a device, as well as in the provision of cooperating sleeves constructed as a part of the folding side walls, to provide that the handle, whether generally "U" shaped or in the form of two straight handles, telescopes and engages the outer portion of the cart base along a slide path, is provided with detents so that the handle may recess directly inside a sleeve or cylinder around which a pivoting wheel support structure pivots; to provide several alternative embodiments for a simple kickstand or other underside support for the device; to provide for cooperation and interlocking between the walls of the cart in the movement thereof between their folded raised position, to further provide a four-wheel wagon or cart embodiment which includes a center pull handle which folds and nests flat into the base or bed of the wagon, and provide for a zippered carry bag made of a mesh, or other suitable material, which is capable of being rolled up and stored in a storage cavity provided in either end of the base of the cart, as well as a shoulder strap for transporting the collapsed cart, and to provide for a fold-down drink and/or implement holder as a part of a wall of the wagon or cart, to provide for a number of alternative wheel structures and support arm structures, and to provide a number of base underside strengthening and support embodiments, as well as other important improvements as further described hereinafter.

According to one aspect of the invention, a wheeled carrier device is provided which comprises a base member; a plurality of foldable walls supported on the base member and movable between an erected state wherein the walls define a carrier space and a collapsed state wherein the walls are folded on top of the base member; at least two wheels; and wheel mounting means for pivotably mounting the at least two wheels on the device on opposite sides thereof such that the at least two wheels are movable through 270° from a first, operative position wherein the wheels support the carrier device and a second, inoperative position wherein the wheels are folded over on top of the folded walls in the collapsed state of the latter.

Preferably, the wheeled carrier device further comprises a handle affixed to the carrier device and movable between an operative state wherein the handle can be used to pull the carrier device and an inoperative state wherein the handle is stowed in substantially flush relation with the remainder of the carrier in the collapsed state of the walls.

In one preferred embodiment of the handle, the handle comprises a substantially U-shaped handle member including parallel arms pivotably connected to the carrier device. The foldable walls include side walls and these side walls preferably each include handle receiving means for supporting the parallel arms in the operative state of the handle. The parallel arms of said U-shaped handle member advantageously comprise telescoping arm elements which telescope between an extended position in the operative state of the handle and a retracted position in the inoperative state of the handle. The handle member further comprises releasable means for retaining the telescoping arm elements in the retracted state thereof.

In a further preferred embodiment thereof, the handle preferably comprises an elongate handle member pivotably connected to one end of the carrier device and movable to a folded down storage position wherein the handle extends longitudinally of the carrier device in the collapsed state of the walls.

In an advantageous embodiment, the walls comprise first and second spaced, parallel walls and third and fourth spaced, parallel walls extending orthogonally to the first and second walls, the first and second walls each having and inwardly facing surface including at least one curved channel therein at each end thereof extending between side and bottom edges thereof, and the third and fourth walls including projecting elements received in the channels for enabling a downward folding movement of the third and fourth walls to collapsed positions wherein the third and fourth walls fold down on the base member.

The wheel mounting means preferably includes a wheel support member including oppositely extending mounting elements and the base member of the carrier device preferably includes spaced, opposed cavities therein in which the mounting elements are pivotably received. The wheel mounting means preferably includes manually operable releasable means for, when engaged, serving to retain the at least two wheels in the operative position thereof.

In an embodiment wherein the carrier device has two wheels the carrier device further comprises an erectable support element affixed to the carrier device in spaced relation to the two wheels for, when erected, supporting the base member of the carrier device in a substantially horizontal position. In a preferred implementation, the erectable support element comprises a U-shaped support member including support arms pivotably connected to the base member and pivotably to a nested position with respect to the base member.

Advantageously, the wheeled carrier device further comprises an erectable tray element for, when erected, providing a support surface.

The wheeled carrier device preferably further comprises means defining an elongate storage space at one end of the device, and a rollable carrier bag stowable in said storage space.

In an embodiment wherein the cart has four wheels, two of the wheels, in the operative state thereof, are rotatable through 360° beneath the base member.

According to a further aspect of the invention, a wheeled carrier device is provided which comprises a base member; a plurality of foldable end walls and side walls supported on said base member and movable between an erected state wherein said walls define a carrier space and a collapsed state wherein the walls are folded on top of said base member; at least two wheels; and a handle affixed to the carrier device and movable between an operative state wherein the handle can be used to pull the carrier device and an inoperative state wherein the handle is stowed in substantially flush relation with the remainder of the carrier in the collapsed state of said walls, the handle including handle arms disposed on opposite sides of the side walls, and the side walls each including handle arm receiving means for supporting the handle arms in the operative state of said handle.

As set forth above, the handle advantageously comprises a substantially U-shaped handle member and the handle arms comprise parallel arms of the U-shaped handle member pivotably connected to the carrier device.

As in the first aspect of the invention, the walls preferably comprise first and second spaced, parallel walls and third and fourth spaced, parallel walls extending orthogonally to the first and second walls, said first and second walls each having an inwardly facing surface including at least one curved channel therein at each end thereof extending between side and bottom edges thereof, and the third and fourth walls including projecting elements received in the channels for enabling a downward folding movement of the third and fourth walls to collapsed positions wherein said third and fourth walls fold down on the base member.

Similar to the first aspect of the invention, each wheel mounting means includes a wheel support member including oppositely extending mounting elements and the base member of the carrier device includes spaced, opposed cavities therein in which the mounting elements are pivotably received.

In accordance with a third aspect of the invention, a wheeled carrier device is provided which comprises: a base member; a plurality of foldable end walls and side walls supported on said base member and movable between an erected state wherein said walls define a carrier space and a collapsed state wherein the walls are folded on top of said base member; at least two wheels; and a handle affixed to the carrier device and movable between an operative state wherein the handle can be used to pull the carrier device and an inoperative state wherein the handle is stowed in substantially flush relation with the remainder of the carrier in the collapsed state of said walls, the handle comprising an elongate handle member pivotably connected to the carrier device at one end thereof centrally of said one end and being pivoted back, in said operative state, to a folded down position between the folded side walls in the collapsed state of the side walls.

In accordance with yet another embodiment of the invention, a wheeled carrier device is provided comprising: a base member; a plurality of foldable walls supported on the base member and movable between an erected state wherein the walls define a carrier space and a collapsed state wherein the walls are folded on top of said base member; at least two wheels; and wheel mounting means for pivotably mounting said at least two wheels on said device on opposite sides thereof such that the at least two wheels are movable through 270° from a first, operative position wherein the wheels support the carrier device and a second, inoperative position wherein the wheels are folded over on top of the folded walls in the collapsed state thereof, the wheel mounting means each including a wheel support member and a wheel support axle which is supported by said wheel support member and on which a said wheel is mounted for rotation, said wheel support members each including releasable latching means for latching said wheel support member in an operative position thereof when the associated wheel is in the first, operative position thereof.

Preferably, a handle is affixed to the carrier device and is movable between an operative state wherein the handle can be used to pull the carrier device and an inoperative state wherein the handle is stowed in substantially flush relation with the remainder of the carrier in the collapsed state of the walls.

Advantageously, the base member includes a wall extending around at least a portion of the perimeter thereof, the wheel support member is received between adjacent spaced facing portions of the wall, and the latching means includes at least one spring biased latch for, in a latched state, engaging one of said facing wall portions of said wall to latch the wheel support member in place and thus latch the associated wheel in the erected state thereof. The latching means preferably includes first and second spring-biased latches each engaging a respective one of the facing wall portions in the latched state thereof and finger-activated release means for disengaging the latches from the latched states thereof. Advantageously, the first latch comprises a first latch member and first biasing spring disposed in a first cavity in one side of said wheel support member, and the second latch comprises a second latch member and second biasing spring disposed in a second cavity in the opposite side of said wheel support member, said facing wall portions each including a respective recess in which a respective latch member is received in the latched state thereof. The finger actuated release means preferably includes spaced access openings in said wheel support member and a respective opening in each of said latch members for enabling the latching members to be moved toward each other against the biasing force of said springs to release said latch members from the recesses in said facing wall portions.

The adjacent facing wall portions preferably include facing cavities therein and each said wheel mounting means includes oppositely extending pivot elements which are received in said cavities and about which the associated wheel support member pivots. The pivot elements advantageously comprise opposite end portions of a pivot shaft and the wheel support member advantageously includes a transversely extending opening at a pivot end thereof through which said pivot shaft extends. Preferably, the pivot shaft includes an indention intermediate said pivot element and a portion of said wheel support axle is received in said indention.

In accordance with yet another embodiment of the invention, a wheeled carrier device is provided comprising: a base member; a plurality of foldable end walls and side walls supported on said base member and movable between an erected state wherein said walls define a carrier space and a collapsed state wherein the walls are folded on top of said base member; at least two wheels; a pivotable support stand movable between a first, operative position wherein said support stand supports said device and a second, retracted position; a pivotable handle member movable between a first, operative position wherein the handle can be used to pull the carrier device and a second, inoperative position wherein the handle is stowed within the carrier device; and a common pivot axle, supported by said base member, about which said support stand and said handle pivot.

Advantageously, the device further comprises latching means for latching said support stand in both of said first and second positions thereof. Preferably, the support stand includes at least one cylindrical portion and the latching means includes a latching pin and a rotatable retention member mounted on said cylindrical portion and rotatable between a first latching position wherein said latching pin is extended beyond said cylindrical portion and a second, retracted position.

Preferably, the device also comprises latching means for latching the handle in the operative position thereof, and, more preferably, the device further comprises latching means for latching said handle into both of said first and second positions thereof.

According to a still further embodiment of the invention, a wheeled carrier device is provided which comprises: a base member including first end walls and side walls creating carrier profile; a plurality of second, foldable end walls and side walls supported on said base member and movable between an erected state wherein said second walls define a carrier space and a collapsed state wherein the second walls are folded on top of said base member within the carrier profile created by said first walls; at least two wheels on which said device rolls; support means for enabling movement of said second walls between said erected state and said collapsed state in response to a lifting and pivoting force exerted thereon; and latching means for latching said second walls in the erected state thereof.

Preferably, said second sides each include lower, oppositely extending projections and said support means including guide paths formed in the first end walls in which said projections are received. Advantageously, the guide paths each include a first vertical portion for enabling the associated side wall to be lifted and a further arcuate portion for enabling the associated side wall to be pivoted.

Preferably, said first side walls each include a shaped cavity in an upper surface thereof and said second side walls include matching shaped projections extending laterally outwardly thereof and receivable in said shaped cavities in the erected states of the associated second walls.

Advantageously, said second end walls each include lower oppositely extending pivot projections and said support means includes means defining first and second, oppositely facing, vertically elongated slots in which said pivot projections are received so as to enable lifting and pivoting of the associated end wall.

In accordance with a further embodiment of the invention a wheeled carrier device is provided comprising: a base member including upright end and side walls creating a carrier device profile; at least two wheels; wheel mounting means for pivotably mounting said at least two wheels on said device on opposite sides thereof such that the at least two wheels are movable through 270° from a first, operative position wherein the wheels support the carrier device and a second, inoperative position wherein the wheels are folded over on top of the base member so as to lay within the carrier device profile created by the upright walls; and a handle affixed to said carrier device and movable between an operative state wherein said handle can be used to pull the carrier device and an inoperative state wherein said handle is stowed in a substantially flush relation with the remainder of the carrier device within the carrier device profile created by the upright walls.

In accordance with yet another aspect of the invention, there is provided a rolling device including a carrier unit and a plurality of wheels supporting the carrier unit, and a wheel-support assembly for supporting at least one of said wheels, said at least one wheel including an outer rim and a central hub and said hub including a transverse opening therein, and said wheel support assembly including a wheel support member, and an elongate wheel support element, said wheel support element including a transverse portion at said first end received in said opening in said hub and forming an axle about which said wheel rotates, and a further portion extending orthogonally to said transverse portion and being received in said support member, said further portion terminating in said second end, and said wheel support member including a cavity therein disposed adjacent to said second end, and said wheel support assembly further comprising a terminal fixing member affixed to said second end of said support element and received in said cavity, said fixing member being of size and shape relative to that of said cavity so as to prevent rotation thereof in said cavity, whereby axial rotation of said further portion is prevented and thus said at least one wheel is prevented from rotation about said further portion and is limited to rotation about the axle formed by said first portion.

In accordance with a related aspect of the invention, there is provided a rolling device including a carrier unit and a plurality of wheels supporting the carrier unit, and a wheel-support assembly for supporting at least one of said wheels, said at least one wheel including an outer rim and a central hub and said hub including a transverse opening therein, and said wheel support assembly including a wheel support member, and an elongate wheel support element, said wheel support element including a transverse portion at a first end thereof received in said opening in said hub and forming an axle about which said wheel rotates, and a further portion extending orthogonally to said transverse portion and being received in said support member, said wheel support assembly further comprising fixing means engaging said further portion of said support element so as to prevent rotation thereof, whereby axial rotation of said further portion is prevented and thus said at least one wheel is prevented from rotation about said further portion of said wheel support element and is limited to rotation about the axle formed by said first portion of the wheel support element.

In accordance with yet another related aspect of the invention, a carrier device is provided which comprises a carrier unit and at least two wheels supporting said carrier unit, said wheels being adapted for rolling movement along the ground so as to provide corresponding movement of the carrier unit, at least one of said wheels including a support axle mounted on said carrier unit so as to provide rotation of said at least one wheel about an axis defined by said support axle, and said device further comprising fixating means for fixating said wheel so as to prevent rotation thereof about the axis defined by said support axle. In one advantageous implementation of this aspect of the invention, the device includes a wheel support member, the support axle is mounted for axial movement within said wheel support member, the fixating means comprises at least one projection extending outwardly from said axle, and at least one recess included in said wheel support member and disposed relative to said axle such that through a combination of rotation and axial movement of said axle, said projection can be caused to engage in said recess to prevent further rotation of said wheel about said axis defined by said axle and such that through a combination of oppositely directed axial movement and rotation of said axle, said projection can be released from engagement with said recess so as to enable rotation of said wheel about said axis defined by said axle.

In accordance with a further embodiment of the invention, there is provided a stroller device for transporting small children, the device comprising: a support frame defining a side elevational profile; a seat frame member mounted on said support frame and movable between a first, operative position wherein the seat frame member is disposed out of the profile of said support frame and a second, stowed position wherein the seat frame is disposed substantially within the profile of said support frame; a flexible seat element affixed to said seat frame member so as to form a seat when said seat frame member is in the operative position thereof and to collapse so as to be disposed substantially within the profile of the support frame in the stowed position of the seat frame member; and a plurality of wheels affixed to said support frame and movable between a first, operative position wherein said wheels are erected to provide rolling support for said support frame, and a second, stowed position wherein said wheels are displaced through an angle from said first position so as to be disposed at least close to being within said side elevational profile.

In one preferred embodiment, the wheels pivot through and angle of 270° between said first and second positions thereof, while in another, said wheels pivot through an angle of 90° between said first and second positions thereof.

According to yet another embodiment of the invention, there is provided a collapsible carrier device for children for, when erected, simulating a motor driven vehicle or the like, said device comprising: a base member; a pivotable seatback member movable between a first, operative position wherein said member serves as a back rest for an occupant of the carrier device and a second, stowed position wherein said member is disposed at least close to said base member; a collapsible front end portion connected to said base member and movable between an operative, erected position wherein a front end portion of a motor driven vehicle or the like is simulated and a collapsed, storage position; and a plurality of wheels mounted on said base member and movable between a first, operative position wherein said wheels are erected to provide rolling support for said base member and a second, stowed position wherein said wheels are displaced through an angle from said first position so as to be disposed at least close to said base member.

In one advantageous implementation of this embodiment which is applicable to other embodiments as well, said wheels are mounted on said base member by a wheel support member including means cooperating with said base member to provide a releasable snap in connection between said wheel support member and said base whereby release of said snap-in connection enables movement of said wheels between said first and second positions thereof.

In accordance with a further embodiment of the invention, a collapsible wheeled carrier device is provided comprising: a carrier base defining a carrier plane; at least two wheels; wheel mounting means for mounting said wheels on said carrier base such that said wheels are movable between a first, operative position wherein said wheels extend orthogonally to said carrier base to provide rolling support for said carrier base, and a second, stowed position wherein said at least two wheels at least partially overlay one another in a sandwich arrangement and are disposed adjacent to the carrier plane; a handle for pulling the carrier base; and means for connecting said handle to said carrier base so as to enable movement of the handle between a first, operative position wherein the handle can be used to pull the carrier base and a second, stowed position wherein the handle is disposed in a position adjacent to the carrier plane.

Further features and advantages of the present invention will be set forth in, or apparent from, the detailed description of preferred embodiments thereof which follows.

BRIEF DESCRIPTION OF THE DRAWINGS

FIG. 1 is a side elevational view, partially in section and partially broken away, of a first preferred embodiment of the collapsible cart of the invention;

FIG. 2 is a front elevational view of a portion of the cart of FIG. 1;

FIG. 12 is a plan view of an alternative cart base construction;

FIGS. 12A and 12B show alternative embodiments of details of FIG. 12;

FIG. 13 is a side elevational view, partially broken away, of one embodiment of the wheel support structure;

FIG. 14 is a perspective view of the wheel support structure, showing a step in the disconnection thereof from the cart;

FIGS. 15A, 15B, 15C and 15D show details of the wheel support structure.

FIG. 21 is a top plan view of another cart embodiment;

FIGS. 22A, 22B and 22C show details of a further kickstand embodiment;

FIG. 26 is a perspective view of a kickstand embodiment;

FIGS. 27 and 28 show details of the embodiment of FIG. 26;

FIGS. 29A and 20B are a perspective view and cross sectional view, respectively, showing details of a cover plate construction;

FIG. 30 is a side elevation view, partially broken away, of a further four wheel cart embodiment;

FIG. 36 is a side elevational view of an alternative frame construction;

FIGS. 36A, 36B and 36C show details of the alternative frame construction of FIG. 36;

FIG. 56 is a side elevational view of a pivotable wheel support assembly of the embodiment of FIG. 43;

FIGS. 57, 58, 59, 60A, 60B and 61 are various views showing details of the wheel support assembly of FIG. 56;

FIGS. 96, 97, 98, 99 and 100 are, respectively, a side elevational view, a further side elevational view, a top plan view, yet another side elevational view and a bottom plan view of a "fun car" or like simulated vehicle for children, showing collapsed, partially erected and fully erected states thereof;

FIGS. 105, 106 and 107 are a first perspective view, a second perspective view (with parts added and removed) and a top plan view of a jogger-stroller or like device in accordance with an additional embodiment of the invention;

FIGS. 108 and 109 are top plan views showing alternative wheel support assemblies for the embodiment of FIGS. 105 to 107;

FIGS. 110, 111, 112, 113, 114, 115 and 116 are various views showing details of, or alternative embodiments of details of, the embodiment of FIGS. 105 to 107;

DESCRIPTION OF THE PREFERRED EMBODIMENTS

Figure 3:
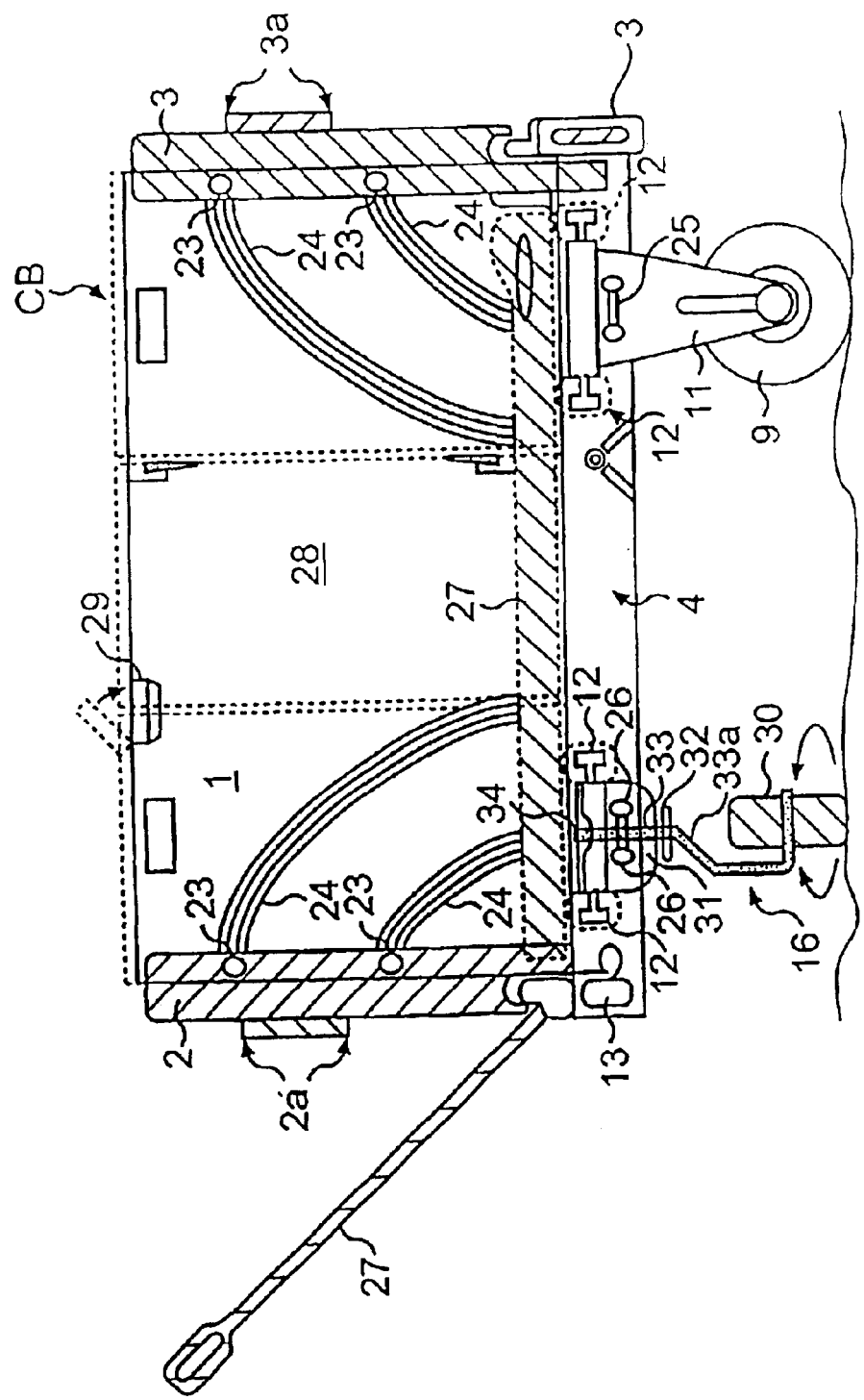
FIG. 3 is a side elevational view, partially in section and partially broken away, of a further preferred embodiment of the cart of the invention.

Referring to the drawings, FIG. 1 shows a two-wheeled cart, generally denoted CA, in a completely assembled or set-up state. The same cart CA, when folded, in the preferred embodiment, has a thickness of about the length of a credit card, and includes two side walls (one of which, denoted 1, is shown in FIG. 1) and front and rear walls 2 and 3. A base 4 has slightly elevated exterior base perimeter walls. A generally "U" shaped telescoping handle 5, constructed of extruded aluminum, another metal or any suitable plastic, is shown in solid lines in FIG. 1 in a final, upwardly secured, operative position of the handle 5 wherein handle 5 resiliently fits snugly into one or more sleeves or support sockets 6 molded into each side wall 1 of the cart. In operation, the recessed, nested handle 5 (shown in dashed lines at 5-A) is pulled forward so that the handle 5 telescopes until it reaches a telescoped locked position, shown in dashed lines at 5-B, handle 5 is further lifted, as shown in dashed lines at 5-C, and is ultimately secured into support sockets 6 provided on the side walls in the position shown in solid lines. This allows the "U" shaped handle 5 to serve as a lifting element for raising the cart up off of a kickstand 17, and thus enables the cart CA to be propelled forward on two wheels 9 and 10, mounted on cart CA in a manner described below.

Referring further to FIG. 1, which shows one of the two side wall sleeves or sockets 6 which resiliently secure the handle 5 in place in the telescoped state thereof, the sleeves 6 being preferably molded and incorporated into the side wall construction. It is contemplated that matching recesses, grooves or other matching structures (not shown) between the handle 5 and sleeves 6 will be used to further resiliently hold the handle 5 and sleeves 6 together. An end point 7, where the two telescoping handle sections of handle 5 meet when both are recessed, is secured into a recess 8 in the cart base wall 4. Protrusions or projections 23 provided in spaced relation along the outer edge of the front wall 2 and the outer edge of back wall 3 cooperate with cooperating curved grooves or recesses 24 in the cart side walls 1. After dropping each of the wheels 9 and 10 to the lowered, operative positions (as shown), the side walls 2 are raised, when then allows the nested front and rear walls, 2 and 3, to slide up along grooves 24 into raised positions through cooperation with both side walls 1, as is discussed in further detail in connection with other figures. The above-mentioned kickstand 17 is secured to both sides of the cart base 4 under the control of a handle 18. The structure of the kickstand 17 is designed to recess into the honeycomb wall structure of the cart base 4 so that it adds no further depth to the cart CA when folded, as indicated in dashed lines. The user may operate the kickstand 17 with the foot, or with a combination of the foot and hand. Other figures described below provide some additional detail as to cooperating structures built as part of the turn handle 18, which allow handle 18 to resiliently hold the kickstand 17 in the "down" position.

Two wheels 9 and 10 are connected to the cart base 4 via arm-like structures or support elements 11. The wheel support elements 11 can pivot 270° between a lowered, in use, position shown in FIG. 1, and a nested storage position shown in other figures. The wheels 9 and 10 and the associated support structures 11 can be secured to the cart base wall 4, through a variety of methods described hereinbelow in more detail. One side of the support portion of the wheel support element 11 is indicated in dashed lines at 11a, with this support portion 11a fitting into matching cavities 12 accessed through the interior wall of the cart base 4 as described below. A cavity or holder 13 extends along the rear wall 3, or base 4, of the cart CA with sufficient space to hold a tightly rolled mesh zippered bag (not shown), as well as a shoulder strap (not shown). In this preferred embodiment, the walls 1, 2, 3, and the cart base 4 are preferably made of a honeycomb plastic, as indicated at 14, but can also be made, for example, of any similar molded material construction which provides durability, but is lightweight.

A carry handle 15 is tapered and molded into the base side wall 4. Additionally, a gap 16 is molded into each side wall 1 so that, when the side walls are folded closed, gap 16 mates with a similar gap through the base structure 4, thereby providing a handlehold to enable carrying of the cart CA when folded closed.

A plurality of support arms 19 serve to retain the handle 5 in its recessed nested position. A side wall lifting/moving handle 20 is provided on each side wall 1. As explained in more detail below, the exterior of each wheel support element 11 has a longitudinal protrusion 21 which interfits with a corresponding recess 22 in each of the side walls 1 allowing the wheel support element 11 to resiliently nest into the side walls 1 when the cart CA is folded closed.

This wheel support elements 11 lock resiliently to the lower cart wall base 4 via two resilient finger like structures (not shown) although a separable insert element is indicated at 25 which houses same and is incorporated into the underside of the wheel support elements 11, which interfit into corresponding sockets (not shown) molded into the cart base 4, as described below. Finger hole openings 26 allow the consumer to release each of the finger-like structures to free the wheel support from the cart base wall 4 at such time as a consumer decides to fold the cart CA for storage.

Figure 3A:
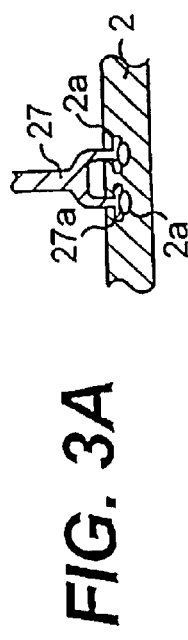
FIGS. 3A to 3F show details and alternative embodiments of parts of the cart of FIG. 3.

Referring to FIG. 3, there is shown a four wheel wagon or cart CB, with numerous attributes discussed elsewhere shared with the two wheeled cart design of FIG. 1. This four wheel wagon/cart embodiment uses a different handle structure than the two wheel cart, although either method may be employed in either embodiment. In the embodiment of FIG. 3 there is no external handle nested around the exterior base of the cart CB and instead there is a center pull handle 27 shown, in solid lines, in the operative position and shown, in dashed lines, nested into the cart base 4. Handle 27 cannot reach the nested position shown unless the front, rear and side walls are folded down. The handle 27 is resiliently maintained in the rested or stored position by a fit with projections (not shown) which are molded into either the inner aspect of the rear cart base wall 3, and/or protrusions or recesses 2a and 3a molded into the centermost portion of the front and rear folded walls 2 and 3. 2 and 3. Further detail of the arrangement whereby the handle connects to the front cart base wall support structure is shown in FIG. 3A. In FIG. 3A, the cart handle is provided with two protrusions 27a which are molded to interfit into grooves 3a in the front base wall 3 of the cart CB. This allows the handle 27 to pivot for use or storage as shown in FIG. 3.

Figure 3B:
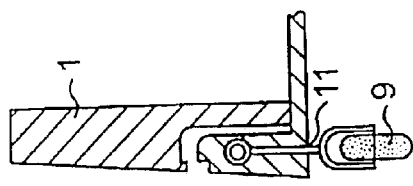
Figure 3C:
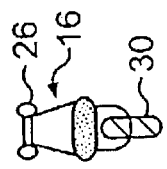
Figure 3D:
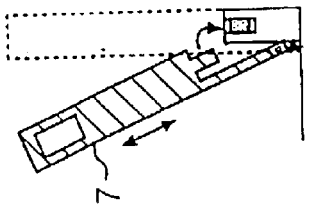

In FIG. 3, the side walls (one of which, denoted 1, shown), front and rear walls 2 and 3, fold down into the base 4 as previously discussed. A swing out door 28, which is formed from a portion of the entire side wall 1, is provided on one or both sides of the cart. Door 28 is hinged to a portion of the side wall, and any one of a number of conventional and well-known latch structures, indicated at 29, can be used to latch door 28. Front and rear walls 2 and 3 have projecting or protruding members 23 at each outer edge which fit into curved side wall slide paths or recesses as shown in dashed lines at 24. In the embodiments shown in FIGS. 3B, 3C and 3D, for front wall 2, the front and rear walls 2 and 3 are thicker along the uppermost portion of the walls than at the lower end of the walls, as shown, so as to provide an interfit into a raised portion 4a of the base wall 4. As shown in FIG. 3B wall 2 may include a hinged latch 2L, as shown, preferably made of plastic. Any alternate interfit arrangement with no latch is shown in FIG. 3C. In FIG. 3D another alternative resilient arrangement is used to secure the foldable or collapsible wall 2 to the fixed cart base wall 4, where the wall 2 is pressed down, once raised, to assist in providing the resilient interfit. Alternatively, a split wall and base construction may be employed as discussed below in connection with FIG. 6.

A thin, yet supportive cart base "seat" (not shown) or front or rear wall "pad" (not shown), can be provided which would attach to the base 4 or the walls 1, 2 or 3 with straps which interlace through the preferred honeycomb wall structure and would be secured around the outer facing of such walls or base with VELCO® (hooks and loops fastener) or snaps. These pad(s) would add comfort if children are seated in the wagon CB.

As indicated above for FIG. 1, a rolled up mesh bag 13 may be recessed along either a front or rear cavity in the base 4 in any suitable manner.

Figure 3E:
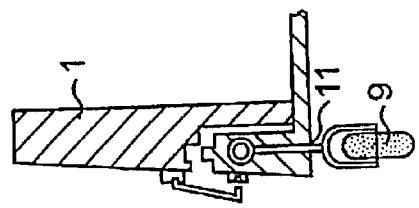
Figure 3F:
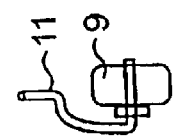
Figure 25:
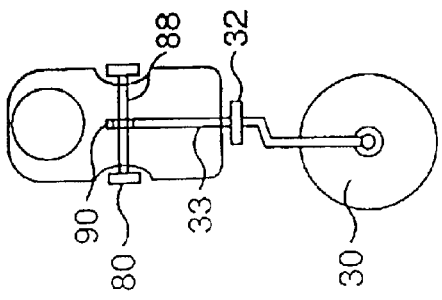
FIGS. 24 and 25 are end and side elevation views, respectively, of a wheel support construction.
Figure 24:
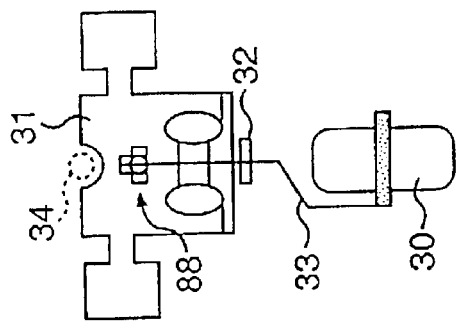

A "rotating" wheel structure support 16 is provided for a rotating wheel 30 which also allows a 270° pivot action that is facilitated through arms 12. Arms 12 are identical to these on the non-rotating wheel support structures of the rearmost wheel 9 described above in connection with FIG. 1. The front two wheels of the four wheel cart CB (one of which is shown at 30) can also be of a caster wheel type shown in FIG. 3E. It will be appreciated that each of the two rear wheels (one shown at 9) can be supported by structures surrounding the wheel 30 on both sides, i.e., a two-sided construction, or can be supported by a single sided arm support as shown in FIG. 3F. Again, rotating wheel 30 may rotate 360 degrees by virtue of a metal arm 33 which extends longitudinally up Into a wheel arm support 31 mounted in base 4. A washer 32 is resiliently held at the bottom of the wheel support, 31, by a crimped or widened portion 33a below the washer 32, and the upper part of the metal arm 33 extends through the center of the wheel arm support 31 to a grooved out and recessed area at the top of the wheel arm support 31 where support 31 is secured by an end cap or bolt 34. It is noted that an alternative securing arrangement is shown in FIGS. 24 and 25 described below.

The construction of FIG. 3 does not prevent the consumer from utilizing the finger holes or recesses, shown at 26, which allow release of the wheel structure 16 from the cart base 4. Arms 12, in cooperation with cavities shown in dashed lines, hold the entire wheel structure 16 in the cart base side wall 4a, while for wheels 9 portion, a central retention insert box portion 25, of the wheel arm structure 11 on the underside, includes two finger-like projections 25a, which resiliently interfit into matching areas in the cart base 4. An alternative embodiment of the four wheel cart is shown in FIG. 30 described below.

Figure 4:
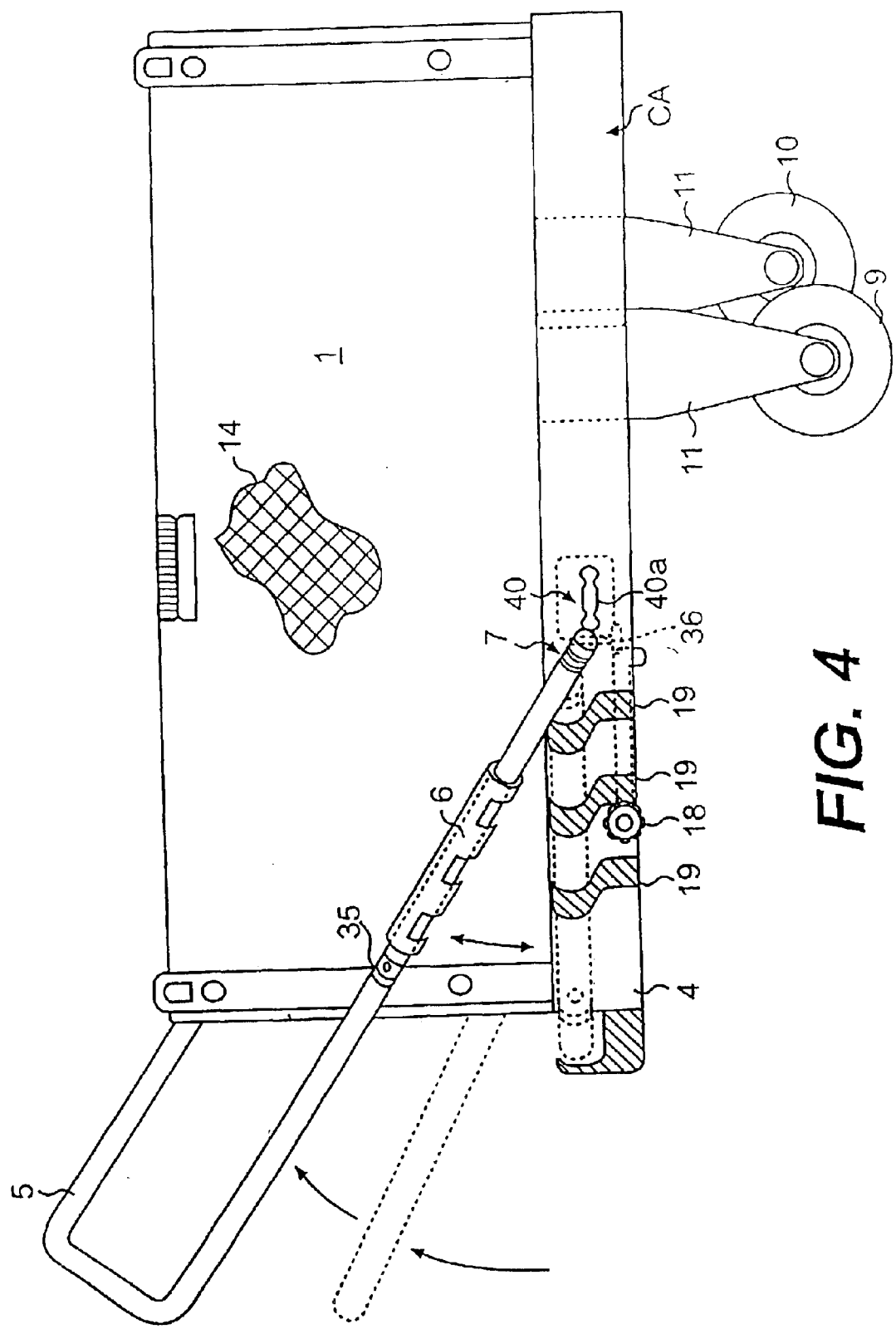
FIG. 4 is a side elevational view, partially broken away and partially in section, of a further preferred embodiment of the cart of the invention.

Referring to FIG. 4, further details of the telescoping U-shaped handle structure 5 of FIG. 1 are shown, particularly with respect to the manner of securement of same to the two wheel cart base 4. With handle 5 in the fully raised, fully telescoped out position shown in solid lines in FIG. 4 handle 5 is secured in side wall sleeve 6, which includes a spring maintained detent button 35. Detent button 35 is shown in more detail in FIG. 4A, which shows the detent button 35 and associated spring 35a as well as the innermost portion of the telescoping handles portions 5, and the outermost handle portion 5A. It will, of course, be understood that the portion of the telescoping handle which is the outermost sleeve may be reversed from that shown in FIG. 5A. The detent button 35 may either simply recess or retract in response to forceful contact, or, alternatively, may require the user to press firmly down on button 35 or even turn a hand dial (not shown) in order to inwardly telescope the handle structure 5. Also shown in FIG. 4 are the kickstand turn handle 18 described above as well as the cart handle support arms 19.

Figure 4A:
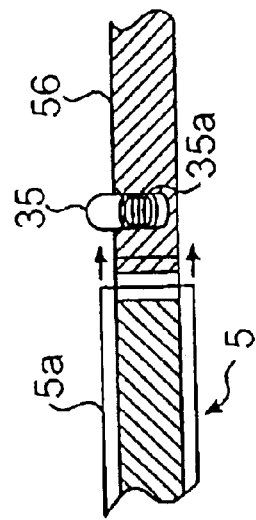
FIGS. 4A, 4B and 4C show details of the cart of FIG. 4.
Figure 4B:
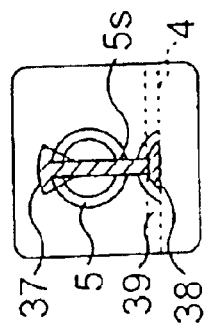

FIG. 4A also shows the end pin member 37 of the tubular handle 5 where the handles are secured through an opening to the cart base 4 or to side wall 1. A screw hole 55 extends completely through the handle 5 and pin 37 extends through the cart base wall 4 where a head 38 on the pin 37 screws or fits onto the pin. Alternatively, the pin structure may interfit through the cart base 4, through the handle 5 and then resiliently snap and hold the handle 5 through the holes just described. The pin 37 and associated head 38 may be designed to further interfit into a recessed, grooved out portion of base wall 4 indicated at 39 to fix the pin 37 or to otherwise retain the pin 37 in an immobile position.

Figure 4C:
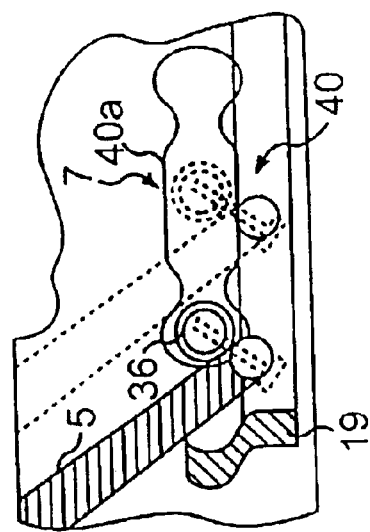

Referring again to FIG. 4, an alternative embodiment is shown wherein a slide path 40a is provided by slide element 40 (depending upon the size of the cart and nature of the handle 5. This slide path is shown in more detail in FIG. 4C. The pin structure 36 which travels through holes in the end of handle 5 are secured into the slide path defined by element 40. In FIG. 4C, handle 5 is shown as being affixed or secured in the slide 40 and, in dashed lines, shown as moving along the slide path with the pin structure 36 moving in the path. As illustrated, both ends of the slide path 40a are configured, i.e., are narrowed or necked down, so as to resiliently hold the handle 5 in the desired position.

Figure 5:
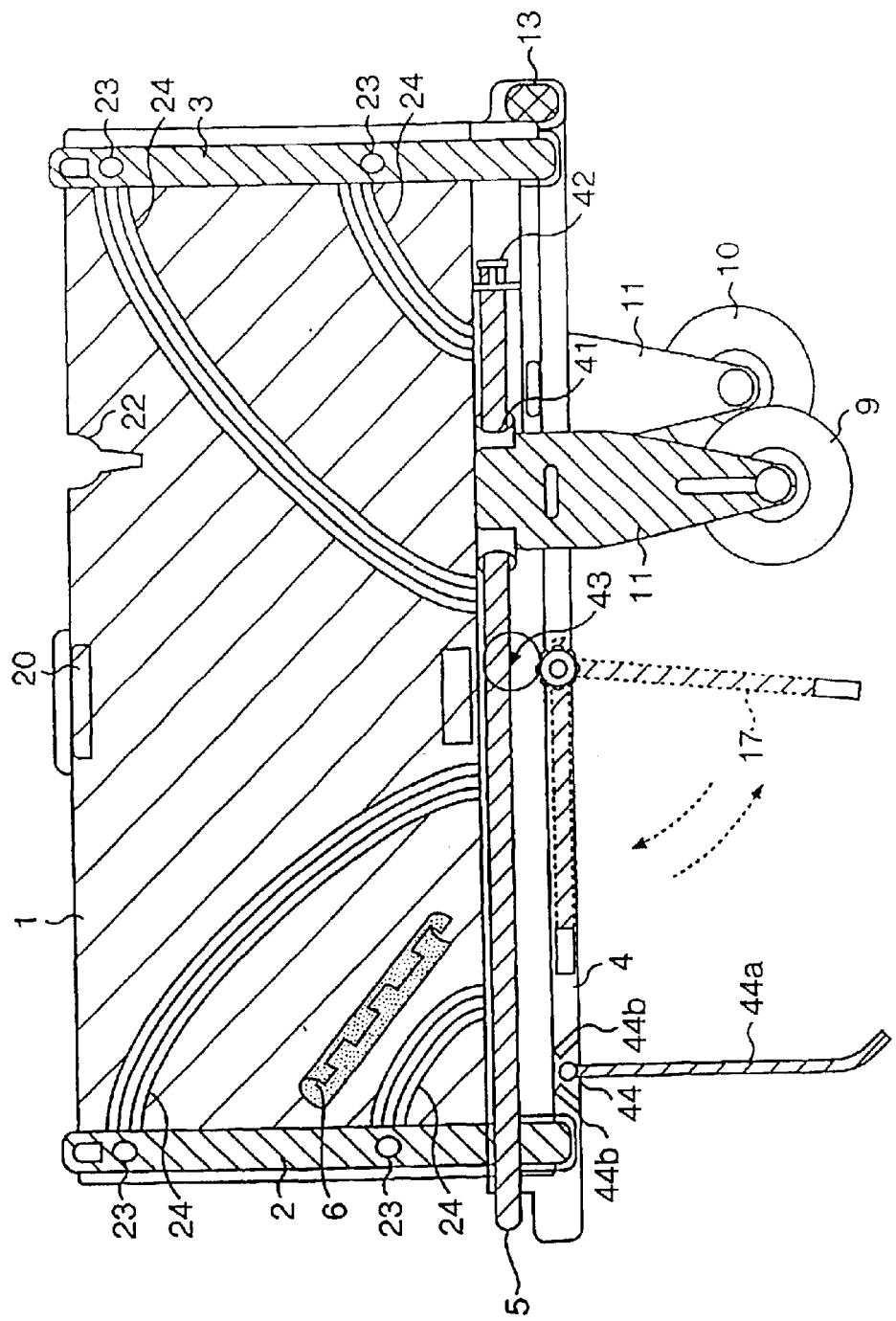
FIG. 5 is a side elevational view, partially in section, of a further embodiment of the invention.

Referring to FIG. 5, there is shown an alternative embodiment of the two wheel cart of FIG. 1, which utilizes a different securing arrangement for the cart handle 5 to the base. In this embodiment, the handle 5 is not telescoping, but rather travels into a recessed position completely through the hollow circular structure 4 of a wheel arm support 11, by using spring maintained detents 42 at the end of the handle 5. At a point indicated by the circle at 43, the handle 5 travels along a slide path to a termination point, where the handle 5 is then raised. Not shown is a slide path sleeve which would travel along the entire cart base wall, on both sides of the wheel arm support 11. This sleeve is partly open at the top to allow the handle 5 to be raised for use.

An opening 44 is molded in the cart base wall 4 to allow a suitable flexible cord 44a (such as a "Bungie" cord) to be tied-off and secured to the cart base wall 4. A series of open grooves 44b are provided to resiliently secure the cord 44a in place when the latter is stretched from the opposing side. It will be appreciated that a multiplicity of such areas may be molded into the cart base 4.

Figure 6:
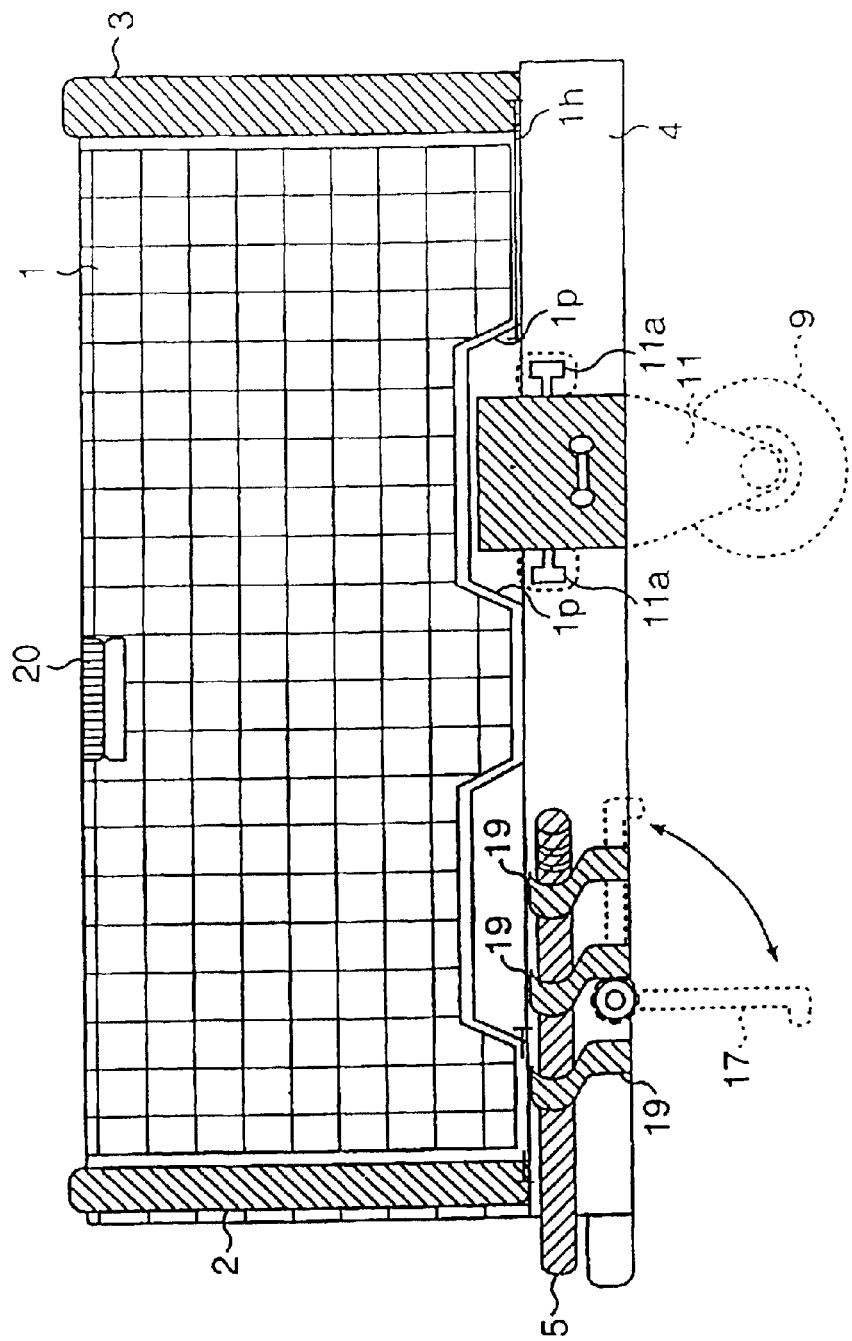
FIG. 6 is a side elevational view, partially in section, of yet another embodiment of the invention.

Referring to FIG. 6, there is shown another alternative wheel cart side wall embodiment. In this embodiment, the side wall is constructed of a honeycomb molded material and hinged to cart base 4 by a series of hinges, one of which is shown at 1h. The hinged structure 1h may include male protrusions molded into side wall 1 which resiliently fit into corresponding female recesses in the cart base 4, (not shown in FIG. 6) rather than an actual hinge traveling through the lower most edge of the side wall 1. Further, as shown at 44, the side wall 1 is molded so when raised it provides a flush single side wall profile 1p immediately above the wheel arm structure 11, as well as with other portions of the base wall 4. When side wall 1 is raised, the lower edge may also interfit resiliently with the uppermost facing edge of the base wall 4, in one of several alternative embodiments, as described below in connection with other figures.

Figure 7A:
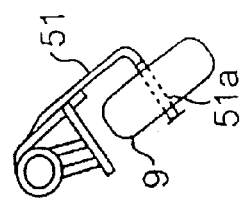
FIG. 7A is an alternative embodiment of the wheel support arm.
Figure 7:
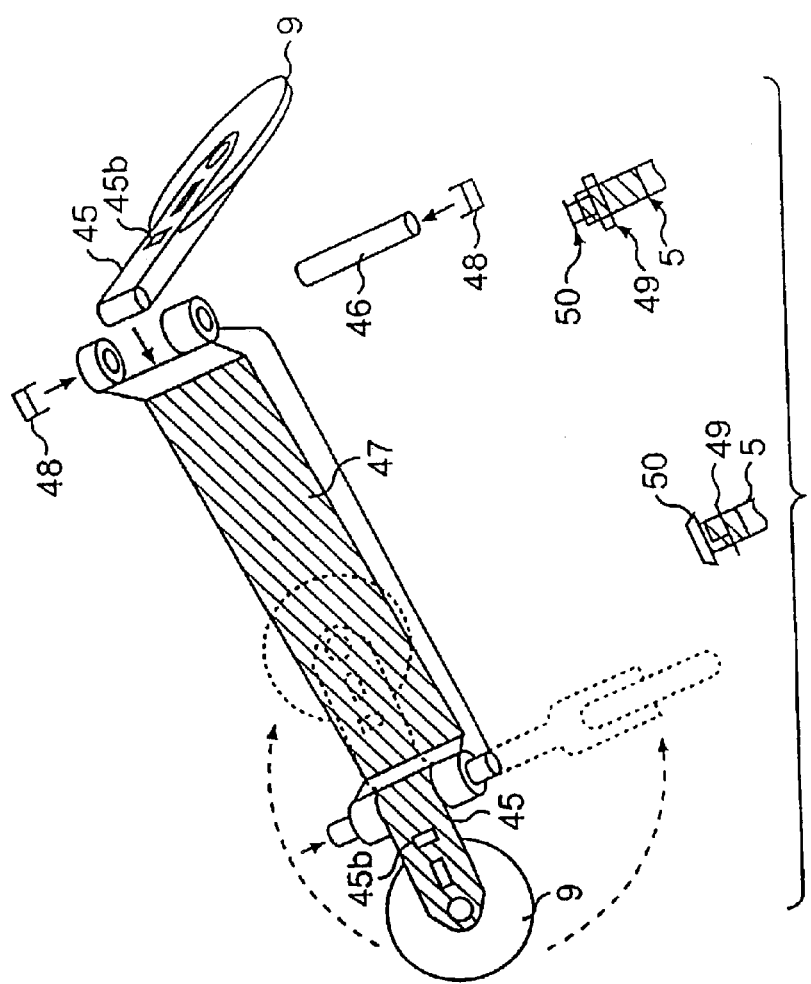
FIG. 7 is an exploded perspective view of a wheel support structure in accordance with a preferred embodiment.

Referring to FIG. 7, there is shown, in an exploded perspective view, an embodiment which provides an especially durable cart base and wheel arm support structure, formed from a series of separate wheel arm and housing parts, in contrast to the more unitary molded wheel support element 11 and an associated housing construction disclosed in the figures discussed above. Alternatively in other figures. A non-unitary wheel support 45 and associated fixed wheel 9 shown adjacent to a base and wheel structure shows the support member 47. A support sleeve 46a, which fits through spaced cylindrical holes or openings 47a formed by bracket arms 47b. Wheel support element 45 includes an upper cylindrical portion 45a which fits between bracket arms 47a so that the opening in cylindrical portion 45a aligns with openings 47a. Cylinder fits through the openings 47a in bracket arms 47b, and the hollow cylindrical portion 45a of wheel support 45. Hollow end caps 48 fit over cylindrical and help secure the wheel structure in place. Alternatively, end caps 48 may be elongated and have enlarged end structures which interfit into corresponding cavities molded within the cart base walls as disclosed below in connection with other figures.

When the wheel structure 45 is in place, and is folded down into the operable position, a "retention" element or recess 45b interfits resiliently with a corresponding projecting base and wheel support structure element 47c. Of course, the two may be reversed wherein a female recess (not shown) is provided at 47 and a male element (not shown) is provided at 45b. FIG. 7 shows, on the other side of the base support 47, the entire wheel support structure 45 and associated wheel 9 in a first, lowered position in dashed lines, and a further, stored position, also in dashed lines, wherein the wheel is disposed in its storage position atop base and wheel support member 47. Essentially, the wheel pivots 270° between its operative and storage portions.

Figure 8:
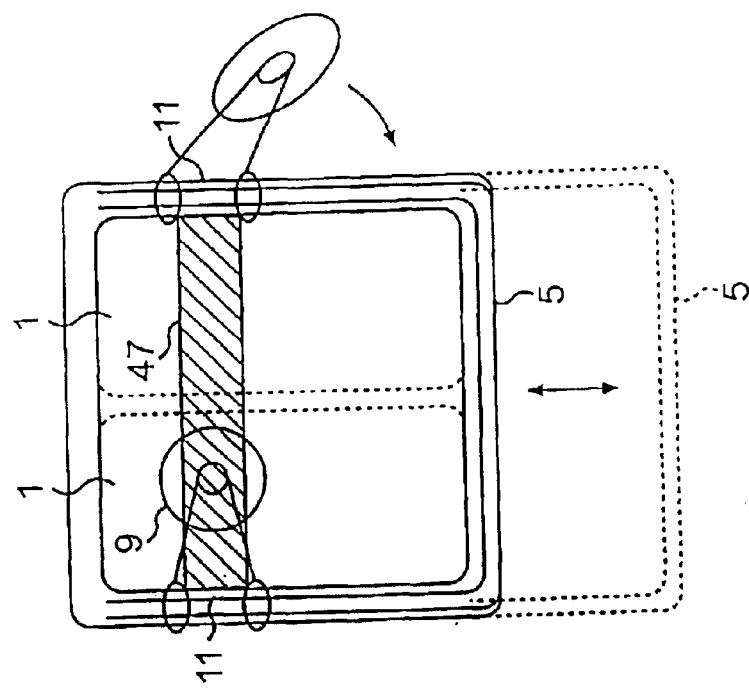
FIG. 8 is a schematic top plan view showing folding of the wheels.

For purposes of further illustration in FIG. 7, the two sides of the U-shaped handle 5 are shown and 7, and, as illustrated, detent is provided at 49 which is held on through an end cap 50. This allows the entire handle structure 5 to travel through the hollow sections of cylinder 46, opening 45a, openings 47a and openings (not shown) in end caps 48. In the latter regard, end caps 48 have a hollowed out central section or opening to allow for interior passage of the cart handle 5. Referring to FIG. 7A, an alternative wheel support 51, is shown for wheel 9 wherein the lowermost axle portion 51a passes through only one side of the central rim or hub of the wheel 9. FIG. 8 illustrates, in a schematic manner, the wheel and support structure 11 (both (1) in the stored position, as shown to the left, and (2) in the pivoting position, as shown to the right, with the folded down side walls 2 being indicated in dashed lines.

Figure 9B:
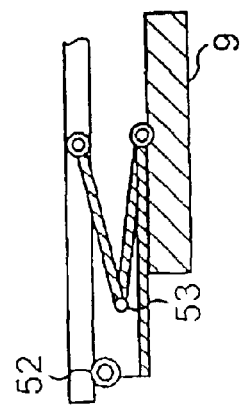
FIGS. 9A and 9B are side elevational views of an alternative wheel support arrangement.
Figure 9A:
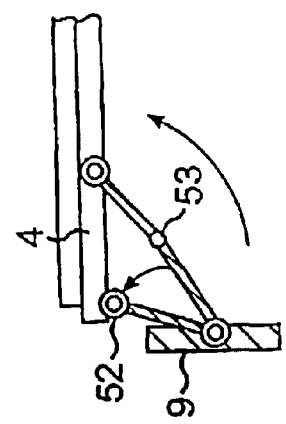

Referring to FIGS. 9A and 9B, an alternative embodiment of the wheel support structures is shown. The embodiment is a 90° wheel support structure rather than a 270° pivoting structure as described above. The wheel 9 is mounted to the underside edge of the cart base 4 with a hinged member 52 and an associated hinged or articulating arm 53 with a central hinge. The wheel structure may be folded up under the cart (as shown in FIG. 9B), with the wheel 9 folded under the base 4 and hinge of arm 53 folded up as illustrated in FIG. 9B. Thus, although the 270° pivoting embodiment is preferred, an alternative embodiment of the cart or wagon of the invention could include some or all other elements of the cart/wagon disclosed herein, but use the type 90° folding wheel rather than the pivoting wheel structure disclosed elsewhere. Hinge 53 can incorporate a suitable "locking" hinge, which releases via forceful pressure or via pressure on a release button (not shown).

Figure 10:
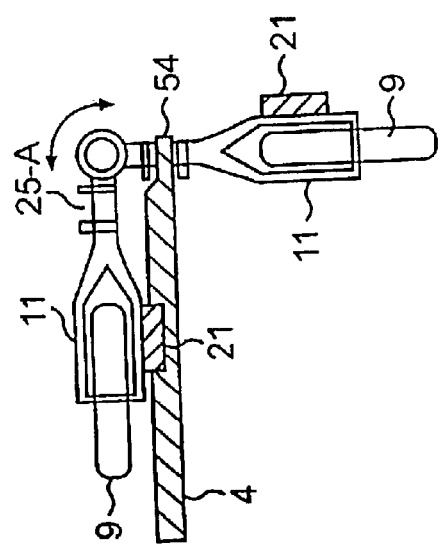
FIG. 10 is an end elevation, partially in section, showing folding of a wheel.

FIG. 10 shows further detail of the wheel construction described with ale and female retention arrangements to allow for support or stabilization of the construction in its operable, folded down position. The wheel 9 and support structure 11 are shown nested atop the cart base 4 (side and front walls are omitted for purposes of clarity view), and the same wheel 9 and support structure 11 in the lowered, operable position. Longitudinal protrusions 21 are provided along the exterior of the wheel structure 11 which are designed to loosely, yet resiliently interfit with corresponding grooves (not shown) molded into the side wall when nested (side wall not shown). The wheel 9 pivots 270° as shown and cooperating male finger-like protrusions, 25A, on the wheel support 11 are designed to resiliently hold the wheel support structure in the lowered, operable position, via an interfit with grooves or other receptors 54 the cart base wall wheel structure receiving area of base 4.

Figure 11:
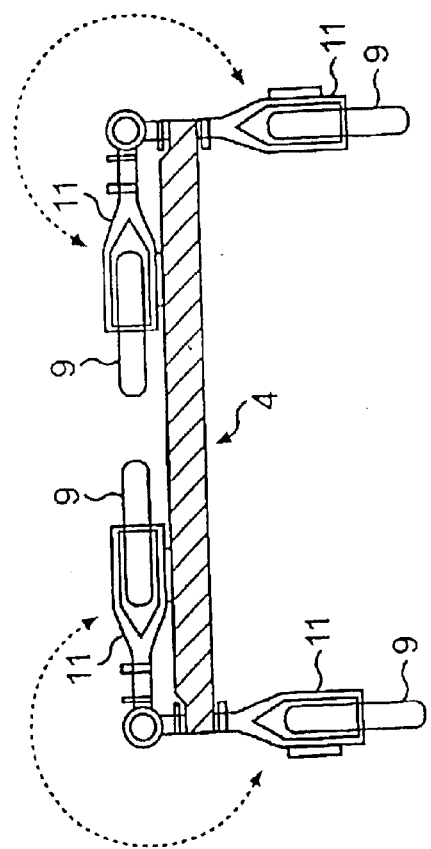
FIG. 11 is an end elevation, partially in section, showing folding of two wheels.

FIG. 11 simply shows both wheel wheels 9 and associated structures 11 nested above the cart base 4 and in the operable positions thereof. As indicated above, the cart walls (not shown) must be folded down to allow the pivoting wheel structures 11 to nest.

Referring to FIG. 12, an embodiment is shown wherein the cart base and wheel structure support 47 is made of single or multiple cross members or "joists" 55, constructed of a suitable metal or plastic. Cross members 55 interfit with one or more corresponding grooves 56, thereby providing resiliently interfitting with the members 55. Members 55 are molded through a passthrough slot in the bottom of the cart base 4 as indicated in FIG. 12 or, alternatively, as shown in FIG. 12A, comprise members which, resiliently snap in from under the base 4 and resiliently interfit into grooves that correspond with the base support 47. In this embodiments, ridges or protrusions 56 are molded into the underside of the cart base 4. FIG. 12A shows a side view of such a resilient base and wheel support 47 fit with the cart base 4 where underside support 47 snaps under the base 4, and detachable supports 56 each extend upwardly from each end of the base 4, to form a support structure for the wheels 9 and 10. The cylindrical support members 56 may thus either be manufactured as a unitary structure with the support base and wheel structure 47, or may be resiliently interfitted onto the base support member 47, depending upon desired strength for the base of the structure and for the wheels themselves. The wheel support arms 57 are constructed in a "U" shape, rather than cylindrical manner, allowing a unitary wheel support structure to mount thereon, and be retained into cart base wall cavities described below which are designed to hold the wheel support arm and allow the same to pivot 270°.

FIG. 13 shows one arrangement for providing the retention of the pivoting wheel support structure 11. FIG. 13 shows a portion of the exterior side of the base wall 4 as will the exterior lower portion of the upright side wall 1 and part of the wheel support 11. Base wall cavities 12 are shown which support the cylindrical ends of one arm of the unitary wheel support structure arms 11A. These ends are each held in the corresponding cavity 12 which is molded into the base wall 4, but accessed through the interior side of the base wall as disclosed in other figures. The uppermost portions 57 of the optional "U" shaped arms of the wheel structure support members 11, which support arms 11A and may be unitarily constructed as a part of the cart base wall 4, as a standalone structure which resiliently attaches to a separate cart base support 47 (shown in FIG. 12), or as a structure which is constructed as part of a separable base support member. User finger holes 26 allow detachment of the wheel structure 11 from the cart base side wall 4 in order to release and nest the wheel structure 11 and associated wheels 9 as described in more detail below. Any suitable alternative quick connect or resilient "button release" arrangement may be employed (e.g. in central retention section 25) to provide quick release and/or for automatic resilient interfit of the wheel structure to the cart base.

FIG. 14 shows a preferred arrangement whereby the wheel support structure 11 resiliently interfits into the cart base 4. In this arrangement, the user places the fingers into recesses 26 on each side of central retention section 25, and presses inward on resiliently movable finger-like elements or structures 25A which, as shown in FIG. 14, are then freed from slots 58 which are molded as a part of the overall cart base, 4. The finger-like structures 25A are constructed with outwardly facing clip like portions, which extend or "secure" past the corresponding openings 58 in cart base 4. Once the structures 25A are freed from cart base 4 by being squeezed inward, the wheel support structure 11 can be pivoted 270° to ultimately nest the associated wheel 9. Further multiple retention means can also be employed. Secondary male attachment elements 59 are molded into the wheel support structure 11 closest to the cart base 4 on either side of the central retention section 25, and these affix or attach to secondary female cart base attachment recesses or grooves 60 which interfit resiliently element 59, but this attachment can be readily overcome when the user detaches the central section 25 and its finger-like projections 25A by a finger squeeze on the latter and pulls forcefully on the wheel structure 11 in a direction away from the cart base 4. Of course, any of male and female connectors can be reversed. In addition, male connector elements or protrusions 61 are incorporated in the inwardly attaching central insert section 25, which mate with female connector elements or recesses 62 formed in molded portions of base 4. In addition a series of matching female recesses 64 are also molded into the side walls of the cart base 4 to interfit with male protrusions 63 on each side of the wheel support structure 11. In general, the retention for wheel support structure is chosen to provide firm holding but should be releasable when finger-like control elements are depressed and released.

FIGS. 15A, 15B, 15C and 15D shown in more detail the central wheel structure retention section 25 described above in connection with FIG. 14. In FIG. 15A, a view is provided from the outwardly facing external side of the wheel support 11, and the central retention member 25 is shown as resiliently interfit into the wheel support, with the recesses for finger access shown again at 26. FIG. 15B shows the central support member 25 as including a perimeter exterior lip 65 which provides a resilient interfit with an opening (not shown) on the wheel support structure 11. The finger-like members 25A are shown in FIG. 15B as well as FIG. 15D which shows a side view of one preferred finger configuration. In FIG. 15B, further male resilient attachment elements, shown in dashed lines at 61, are adapted to mate with recesses 62, shown in FIG. 15C which are molded into the cart base wall 4. FIG. 15C also shows the open receiving areas 58 molded into the cart base wall 4, which, as described above capture and return the finger-like structures 25A shown in FIG. 15B. FIG. 15C also shows another view of the adjacent secondary retention recess 60 in the cart base side wall 4, which, as described above, is adapted to receive a secondary male retention element 59 of the wheel support structure 11 (not shown in FIG. 15C).

Figure 16:
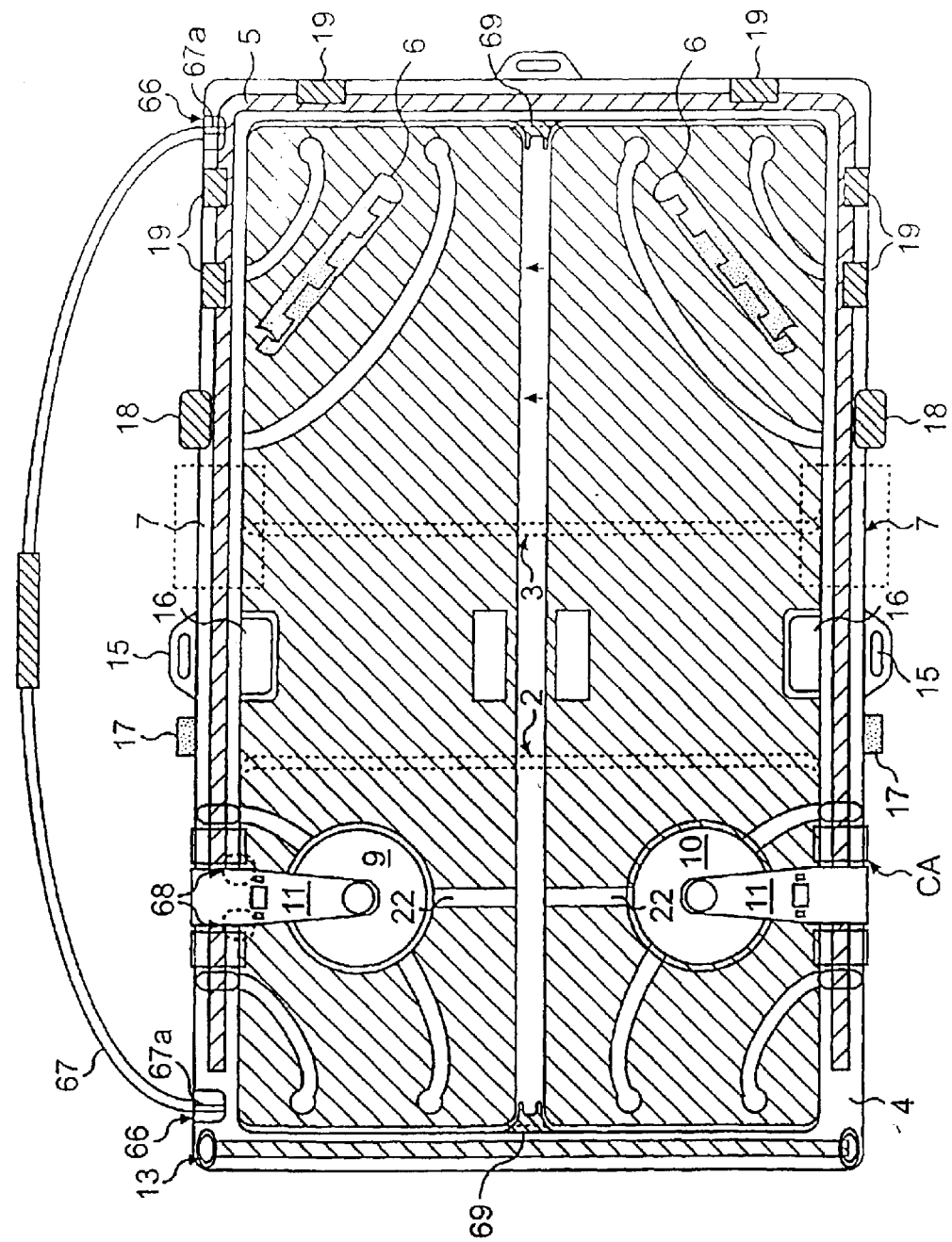
FIG. 16 is a top plan view of a further embodiment of the two-wheeled cart.

FIG. 16 is a top plan view of the two wheel cart "CA" with all parts completely folded and nested. In this view, the side walls 1 lie atop the rear and front walls 2 and 3 which are shown in dashed lines, with the base 5 therebeneath and the generally "U" shaped handle 5 nested shown. While this U-shape for handle 5 is preferred, two straight handles (not shown) may be employed which would extend along the sides of both side walls 1, although, among other advantages the "U" shaped handle 5 provides more inherent support to the side walls 1 when the latter are raised. Recessed cavities 66 are molded into the cart base wall 4 to receive any suitable arrangement for mounting a shoulder strap 67. Strap 67 includes suitable hooks 67a which are retained at 66 so as to enable carrying of the device when nested and closed. The cavity 13 for holding the plastic or mesh bag described above, is located at one end of the cart CA, and can be used when the cart CA is nested and fully closed. The cavity may zip or use VELCO® (hooks and loops fastener), for example. The two wheels 9 and 10 are shown in their nested, stored position, and as described above these wheels may be retained in this nested position by one or ore means. For example, as described in connection with FIG. 1, wheels 9 and 10 can be resiliently held in corresponding side wall grooves 22 which interfit with corresponding protrusions 21 (see FIG. 1) molded as part of the exterior wall of the wheel structure, or alternatively, or in addition, the upper section of the inner cart base wall can be provided with a ledge, indicated schematically at 68, which resiliently interfits with a corresponding male/female protrusion, recess or groove (not shown) molded as a part of either wheel support structure 11.

As indicated above, an opening, 16, may be molded all the way through side walls 1 as well as the cart base 4 itself to present a handhold for the user to lift the closed, folded cart from either side. In addition, exterior molded handles 15 may be made as part of the exterior side wall of the base 4.

FIG. 16 also shows the kickstand handle structure 18, and a plurality of support arms 19 for the cart handle 5.

Molded elements 69 on the inner base walls 4 are used to resiliently hold each of the side walls 1 when they are folded and nested as discussed above. Sleeves 6 are molded as a part of the side walls 1 and receive the handle 5 when the latter is raised up. In this embodiment, the handle 5 is shown extending through the cylindrical wheel support 11 as described above. In the alternative embodiment described above, a telescoping handle 5 such as shown in FIG. 1, can be secured to the base wall 4.

Figure 17A:
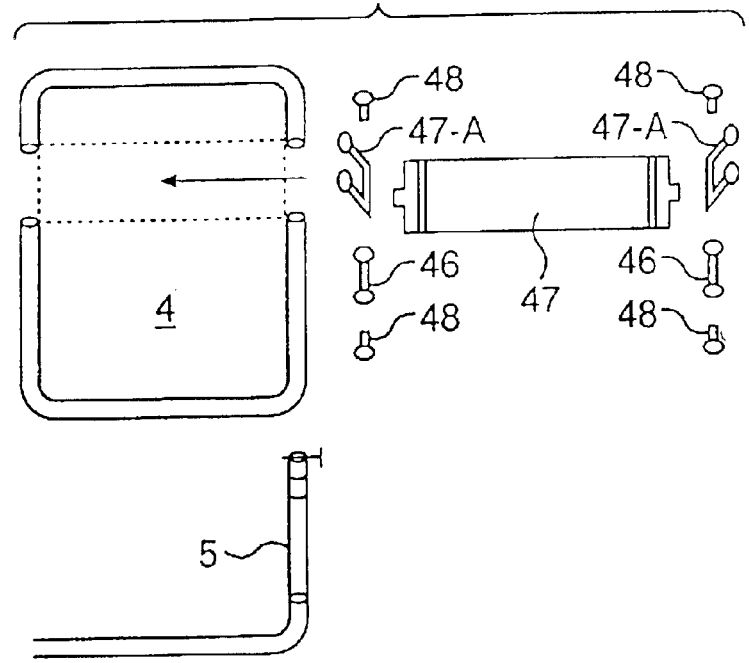
FIGS. 17A, 17B, 17C, 17D, 17E, 17F and 17G show components of a further embodiment of the invention.
Figure 17B:
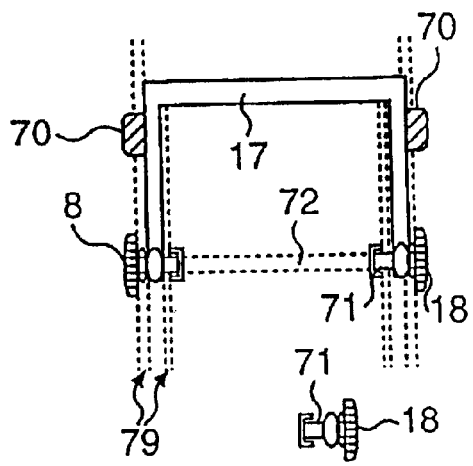
Figure 17C:
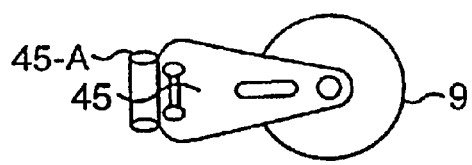

FIG. 17A shows separated parts of the two wheel cart CA and includes a top plan view of the base 4, as well as the wheel structure support parts described above in connection with FIG. 7. It is noted that most of these of which are optional since many of these structures may be instead molded into a unitary wheel structure 11 as indicated in FIG. 17C. FIG. 17B shows details of the "kick stand" unit 17 which was generally described above and which can be constructed of metal, extruded aluminum or suitable plastic and includes outwardly protruding kickstand elements 60 which clear the exterior perimeter of the cart base wall 4 to serve as the kickstand. Two detachable turn handles 18 are employed which interfit into each of two handle arms 71 through holes (not shown) in the exterior walls of the cart base 4. As indicated in dashed lines each end of the kickstand arm structures can alternatively be connected by a connection element 72 extending under the cart base 4, and the turn handles 71 may extend through another hole through corresponding underside cross members 79, also shown in dashed lines, on either end of the base underside, thereby securing the kickstand 17 and the turn handles 18 by resilient fit between the end of a turn handle arm 71 and corresponding cross member 79.

Figure 17D:
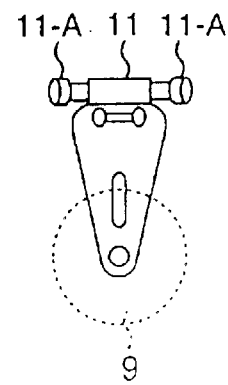

FIGS. 17C and 17D show two alternative wheel structures, wherein structure 45 of FIG. 17C requires a separate cylindrical sleeve (not shown), and wherein structure 11 of FIG. 17D is a more unitary wheel support structure incorporating arms 11A which interfit in matching cavities (not shown) in the cart base wall.

Figure 17E:
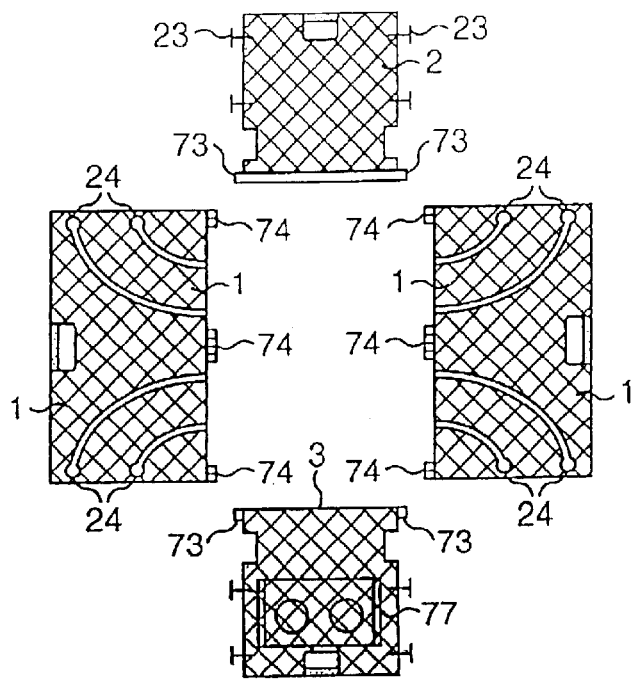
Figure 17F:
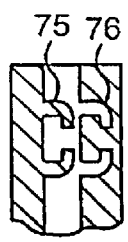
Figure 17G:
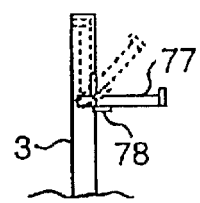

FIG. 17E shows some details of the side walls 1, rear wall 2, front wall 3, particularly as to how the various walls actually interfit. Integrated hinges 74 are built into the base of the side walls 1 which are designed to interfit with portions of the base wall 4 itself, or with lowest edge of the interior side of the base wall 4. When front and rear walls 2 and 3 are completely lowered, the protruding members 23 that fit into the side walls are released somewhat from the bottom of each of the side walls 1 because the side walls 1 are tiered slightly higher on the base 4 than the front and rear walls 2 and 3. The front and rear walls 2 and 3, which are supported at a slightly lower tier on the cart base 4 are hinged by hinges 73 on each end to the cart base 4. FIG. 17F shows one alternative interfit design between the front and rear walls 2 and 3, protrusions 23, and the side wall slide paths 24 wherein protrusions 23 and slide path 24 are replaced by alternative shaped protrusions 75 molded to the end walls 2 and 3 and alternative matching protrusions and recesses 76 are molded in side walls 1. As shown in FIG. 17E the rear wall 3 (or the front or side walls) may include a drop-down hinged member 77, shown further in FIG. 17G, which serves as a tray to hold implements, or to hold beverage containers. A "stop" 78 is molded into the wall or drop down portion.

Figure 18:
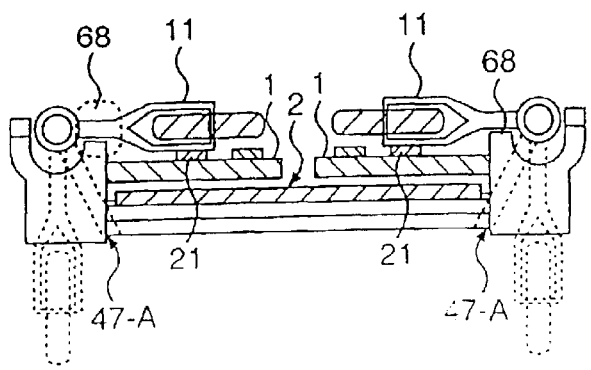
FIG. 18 is an end elevation view, partially in cross section, showing the folded wheels.
Figure 19:
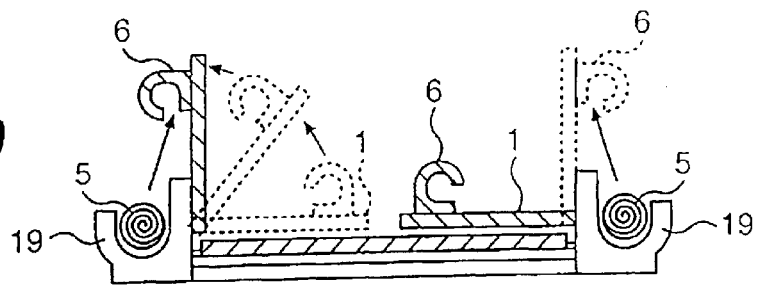
FIG. 19 is an end elevation view, partially in cross section, showing details of the side wall construction.
Figure 20B:
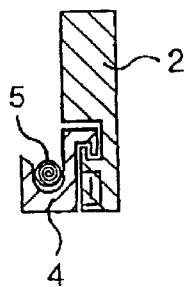
FIGS. 20A and 20B show details of the end walls.
Figures 20, 20A:
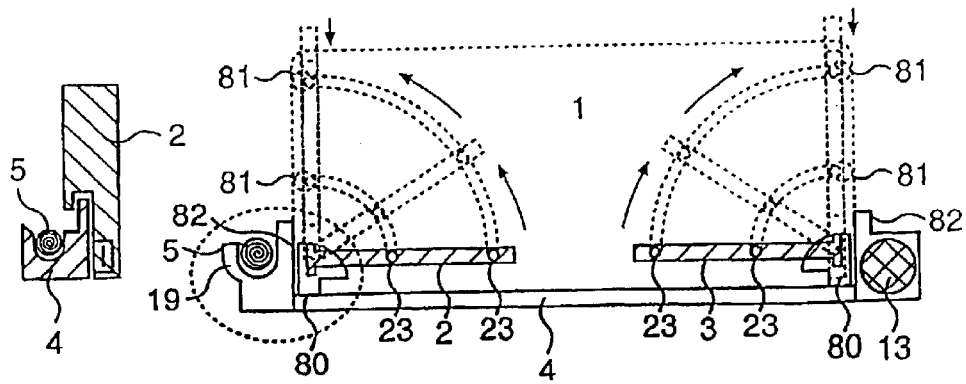
FIG. 20 is a fragmentary side elevational view showing folding of the end walls.

FIGS. 18, 19 and 20 show further details of the two wheel cart wall structure CA. FIG. 18 shows, in solid lines, the cart walls completely folded down and with the wheels 9 and 10 stowed away, i.e., in the nested, inoperable position. The optional wheel support arms 47 are also shown in dashed lines. A resilient interfit is provided, as indicated at 21, between each wheel in its nested position and a portion of the nested left and right side walls 1. The wheels 9 and 10 in the nested position thereof, may resiliently interfit into a fixed base wall ledge 68 as indicated schematically.

FIG. 19 shows details of the left and right exterior side walls 1 including, molded therein, the handle sleeve 6 for the handle 5 which as is also shown, then is lifted to the position shown in dashed lines so as to resiliently snap into the corresponding receptacle sleeves 6.

FIG. 20 shows the movement of the front and rear walls 2 and 3 relative to a side wall 1, shown in dashed lines, wherein protrusions 23 formed along the side edges of the front and rear walls 2 and 3 fit into a respective slide path 24 along each of the side walls as described above. The walls 2 and 3 are shown in dashed lines in their upright wall positions. The front and rear walls 2 and 3 may be pressed or pushed down in front and rear floor channels 80 in the floor of base 4 via sloping terminating grooves 81 at the path upper end points of the slide paths 24. There is a channel and recess 80 along the front and rear of the base 4 of the cart to receive and to allow the front and rear walls 2 and 3 to be pressed down slightly into a locked down position, and all the walls are further retained and stabilized due to the protrusions 23 being pressed into the sloping slide path end points 81. FIGS. 20A and 20B also show alternative methods of supporting the front wall 2 (which is equally applicable to any of the side walls, whether front, rear or side) and although what is shown is for the two wheel cart, these approaches are equally applicable to the four wheel cart. FIG. 20 shows that each front and rear wall 2 or 3 (or the side walls 1) include protrusions 82 which provide a resilient interfit with corresponding recesses molded into the cart base wall 4.

FIG. 21 is a top rear view of the upright rear and front walls 2 and 3, respectively, upright side walls 1, two of the multiple protrusions 23 shown in the upright position in solid lines, and nested down in dashed lines. The handle 5 is shown nested to the exterior of the front and rear walls 2, 3 and side walls 7, and, in this embodiment, extends through a cylindrical sleeve 46 which also supports the wheel support structure 11.

FIGS. 22A, 22B and 22C show details of the underside of the cart base 4 and the kickstand unit 17. (The directional relationship of the kickstand unit to the cart underside may be reversed from that shown here.) In FIG. 22B the kickstand structure 17 includes outwardly projecting protrusions 70 which clear the base wall 4 of the cart, and arm structures 83 (one of which is shown) are provided at the point where a hollow section receives the turn handle arm 18 which extends through an opening (not shown) in the exterior base wall 4.

As shown in FIG. 22A the cart CA has cross members or joints 79 which include respective recesses that enable the kickstand 17 to nest into the underside of base 4. The turn handle 18 has ridges 18a to allow a positive hand grip. FIG. 22C shows an underside cross member 79 (or, alternatively, the outermost wall portion of the base), with a hole 84 that allows the handle arm 71 to extend through the hole 84 to secure the kickstand arm, and to extend further through another "joist" structure 79 where it resiliently holds the kickstand 17 between the underside of support members or joints 79. In FIG. 22C, one cart base underside "joist" member, 79 is shown which includes a number of protrusions or recesses 85 (one of which is shown). The latter correspond with protrusions or recesses in either the underside of the handle 18 and/or via a claw-like portion 86 of the turn handle arm 71 furthest from the handle itself, as more is fully shown in FIGS. 26 and 27. In an alternative embodiment, element 72 shown in dashed lines in FIG. 22A is a portion of kickstand 17 which extends across the underside of the cart base 4 between the kickstand handle portions.

Figure 23:
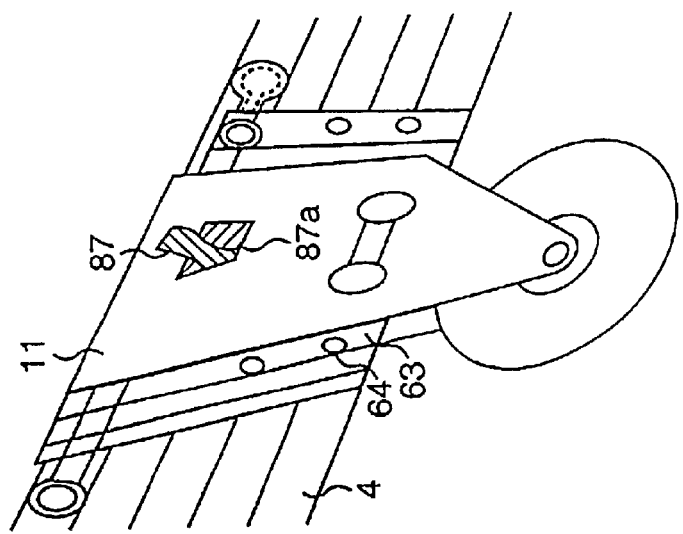
FIG. 23 is a perspective view showing details of a wheel support construction.

FIG. 23 is a perspective side view from the exterior of the cart base 4 of the wheel support structure 11, and illustrates an embodiment wherein a wheel structure support arm 87 extends through the central upper portion of the wheel support structure 11. Support arm 87 can be molded into the cart base wall 4 or be a part of a separate structure, which extends down and interfits with the cart base 4. The wheel structure 11 itself would be constructed with a gap or groove 87a to allow the support arm 82 to pass through the center of the structure. In addition, a plurality 4 of male/female resilient contact points 63 and 64 are provided between the wheel support structure 11 and the cart base wall 4.

FIGS. 24 and 25 show alternative embodiments of the wheel support construction of the invention which include a 360° rotating wheel 30 a wheel support structure 31, a retaining washer 32 and a support arm 33. Referring to FIG. 24 the central longitudinal metal support arm 33 can extend all the way through structure 31 to be capped by a cap indicated on dashed lines at 34 or the wheel can alternately be constructed with a pass through gap or groove from front to read and an end cap 88 provided for the longitudinal portion of the wheel support arm 33. FIG. 25 shows the view of the same wheel structure from the side, including a screw and bolt assembly 89 which passes through the wheel support in the longitudinal pass through in opening 88 which also passes through an eye or opening 90 in the distal end portion of wheel arm 33.

FIG. 26 shows some details of the kickstand gripping handle 18 described above. Protrusions 93 (and/or recesses) extending from the underside of the handle 18 cooperate with matching recesses 93a (and/or protrusions) molded into the exterior cart base wall 85. Each of the two kickstand arms 17 has a hole 17h through which a handle portion 71 extends. The distal kickstand handle arm end or "claw" end, i.e., the end most distant from the turn handle 18 resiliently clips or holds onto a support member joint 79 molded into the underside of base 4 and also engages matching grooves 85 (or protrusions) in the underside wall joist 79. This kickstand may be alternatively designed with a support member 72 that extends all the way through between the handles. Protrusions or grooves 91 on the free end or "head" of the kickstand arm 17 interfit into corresponding molded areas in the underside of cart base 4 at the point where the arm is in its lowered position (with the "head" portion 91 face up) to further support the kickstand 17 from movement while it is in such recess, locked position.

FIG. 27 shows an alternative kickstand turn handle 18 including arms 92.

FIG. 28 is another view of the kickstand assembly of FIG. 26 including the kickstand arm 17 and the gripping handle 18 which resiliently attaches to the gripping handle arm 71. The latter extends through the kickstand arm 17 and terminates at the claw area 86. As described above, the arm 71 extends through a base underside support joist 79 then resiliently attaches to the same support joint 79, which is molded as part of the underside of the cart base 4. One of the two kickstand arms is shown at 17 and this arm is molded with a slot 94 therethrough. Slot 94 is cylindrical at its center, but may have four cross members as shown, so that when the handle arm 71 is passed therethrough, the slot 94 allows the kickstand arm 17 to be turned to a lowered or raised position. As indicated above, connector 72, shown in dashed lines, is used in the alternative embodiment wherein the kickstand arm 17 extends between the two sides of the cart.

FIG. 29A is a view looking down from inside the well of the cart base 4 toward the space where the wheel support structure interfits into each of the cart base wall cavities 12. This view is a cut-away view of the base wall 95 (indicated by arrows), and for purposes of illustration, omits a portion of the cart base wall in the area extending from the base floor, up to just below the cavity openings 12. The cavities 12 which hold the wheel support structure 11 (shown in dashed lines), have shaped openings 12A which permit the wheel structure arms 11A to be received in the cavity 12 only from the interior side of the cart base wall 4. However, once placed in the cavities 12, the wheel structure 11 is constructed such that the wheel support structure 11 can still then pivot 270° through this opening between the cart walls to a lowered, operable position, as described above. Another phantom view of the wheel structure 11 is shown at the upper right as pivoting outwardly and the central retention insert box 25 is shown in solid lines so as to indicate that when the corresponding wheel 9 is lowered and operable, the central retention insert box 25 interfits resiliently with an engaging means shown at 54 provided in the base wall wheel structure receiving area which is actually just below the cart base area shown. When the wheel support structure 11 is in the lowered and in the "locked" position, the structure 11 forms a flush profile in the base wall 4 between cavities 12. As indicated above, protrusions or recesses 64 can be provided along the side of each cart base wall 4, which interfit and further resiliently hold the wheel support structure 11 in the lowered position.

In the areas of the cart base wall (or along the omitted cart wall between the cavities 12), just beside each cavity opening, a stop element in the form of a molded ledge or protrusion 68 is provided which serves to resiliently connect to a corresponding protrusion or molded portion of the wheel support structure 11 so that when the wheel structure 11 is nested into the cart base 4, the wheel structure 11 cannot move or close further. Thus, element 68 serves as a stop, and also resiliently holds the nested wheel structure 11 in place.

Two resiliently interfitting small wheel arm cavity covers 96 are employed and include protrusions 97 for securing each of the covers 596 into each cavity 12. The covers 96 slide into slide grooves 99 and the protrusion 96 retains the wheel structure arms 11A inside each cavity 12 in the base wall 4.

Alternatively, rather than the two separate covers 96, there can be a single unitary access cover 98 as shown in FIG. 29B which slides in the grooved openings 99 (or resiliently snaps therein) formed in the cart base walls 4 at a low enough profile on the base wall so as to allow the required pivoting of wheel support structure 11, i.e., so that structure 11 can still pivot 270° above same.

FIG. 29B shows another embodiment cavity cover, wherein 11A is the wheel support arm and an access cover 98A, shown in dashed lines and including an inner shaped portion 986 and outwardly extending, flexible locking legs 98C is placed as shown in solid lines, into the base wall area surrounding the cavity 12. The preferred embodiment shown in FIG. 29B avoids the use of screws but it will however, be appreciated that metal screws, or suitable resiliently held "pins", may be used to secure any cavity cover components in place.

FIG. 30 is a side elevation view of an alternative embodiment of the four-wheel folding cart construction wherein the generally "U" shaped handle 5 is employed rather than a center pull handle. The telescoping handle 5, which is shown in the raised position in solid lines and in an even higher position in dashed lines recessed to the exterior of the cart base as shown in the lowest dashed lines, retained by the support arms 19. The telescoping handle is attached at point 8 to the cart base and/or wall by a pin 36 or small arm traveling through the handle to the cart base. The front wheel 9 furthest from the handle is provided with a 360° turning caster wheel structure 100. While this embodiment of the handle and base structure has advantageous features that the handle folds and nests into a relatively flush and thin profile, the U-shaped handle 5 must be raised higher than in the other embodiments in order to allow the rear wheels 9 to pivot 270° back up and onto the cart base 4.

Figure 31:
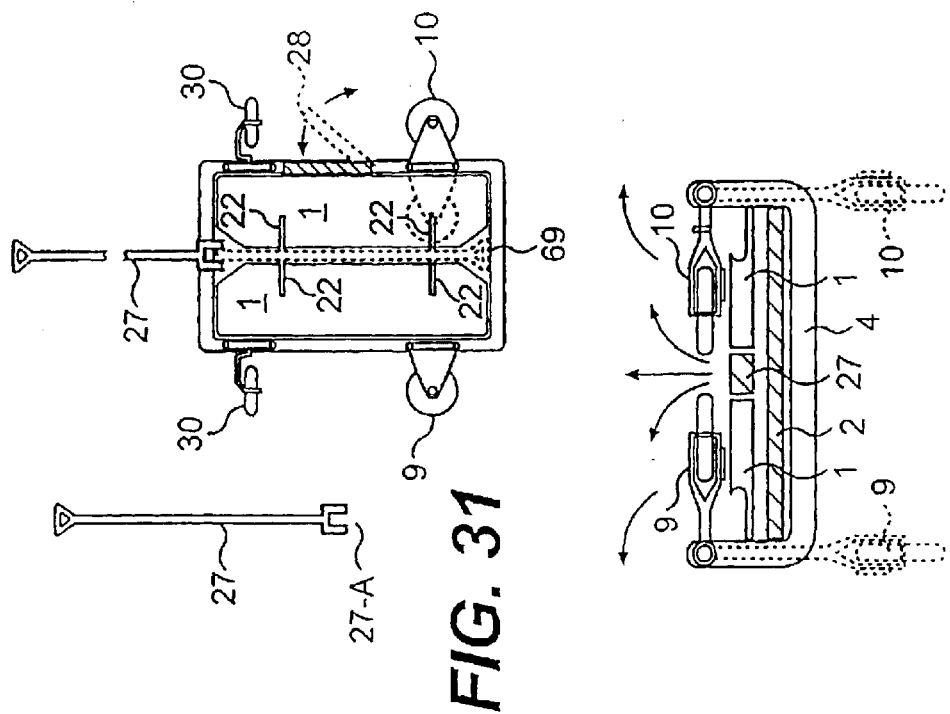
FIG. 31 is a top plan view showing details of one handle embodiment.

FIG. 31 is a top plan view of the four wheel cart CB and shows center pull handle 27 and all four wheel structures, i.e., the two rotating front wheels 30 and the two rear fixed wheels 9 and 10, extending laterally. Recesses 22 provide a loose interfit with the wheels in their nested position, as shown in the lower right in dashed lines. The handle 27 is shown in dashed lines in the recessed position thereof where the handle 27 is resiliently affixed to a portion 69 of the base at the point closest to the outer edge of the handle 27. The swing out side door 28 is also shown. FIG. 31A shows one embodiment of the handle 27 wherein protrusions 27A are provided to resiliently hold the handle in matching recesses of the front cart base wall.

Figure 32:
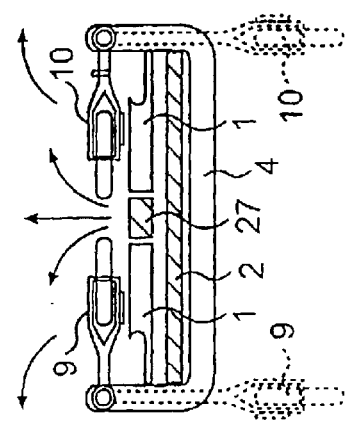
FIG. 32 is an end elevation view of the embodiment of FIG. 31, showing the handle nested and walls folded.

FIG. 32 shows the closed, nested position of a four wheel cart CB and the manner in which the parts are opened out. The center pull handle 27 shown nested between side walls 1 above the front or rear wall 2 or 3 which is the last part folded upward.

Figure 33:
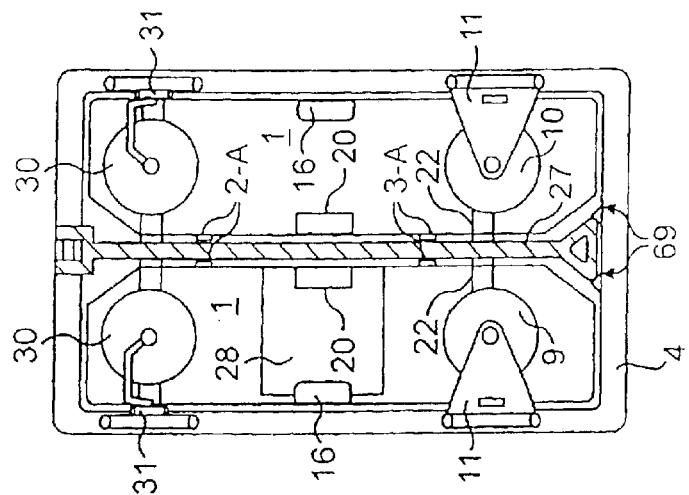
FIG. 33 is a top plan view of the embodiment of FIG. 31, showing further details.

FIG. 33 is a top plan view of the components of the four wheel cart CB in the folded, closed position or state. Grooves 22 provide resilient fit with the respect rotating I support structure 31 and wheels 30 and further grooves 22 provide a similar fit with wheels 9, 10 and corresponding wheel support structures 11. When the user lifts side doors 1 from the base 4 of the cart CB, all four wheels automatically break out of their loose resilient fit with grooves 22, and the user then pivots them and "snaps" them into their stable operable (retained) position as indicated above. An opening 16 through the side wall (and base) provides a hand hold for the user. Gaps 20 extend through the side walls 1 and serve as hand pulls while cart base wall protrusions 69 hold the nested handle 27 (as well as the side walls 1), 2A and 3A are protrusions (or recesses) on the nested front and rear walls which cooperate with corresponding structures on the handle 27 to resiliently hold the handle 27 in its nested position. The swing out door 28 hinged onto one of the side walls 1 is also shown.

Figure 35:
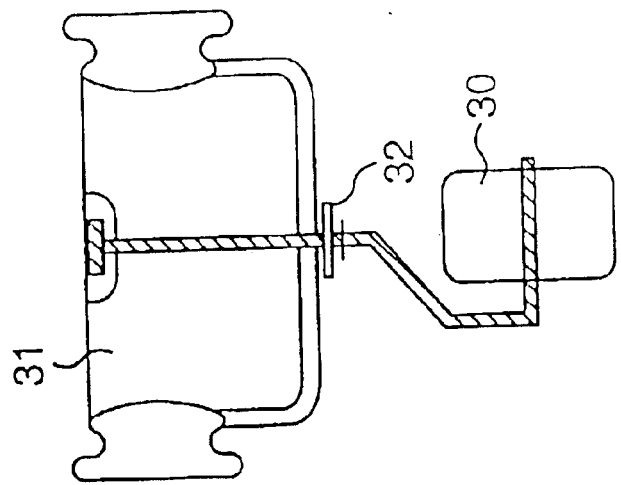
FIGS. 34 and 35 show embodiments of the rotatable wheel construction.
Figure 34:
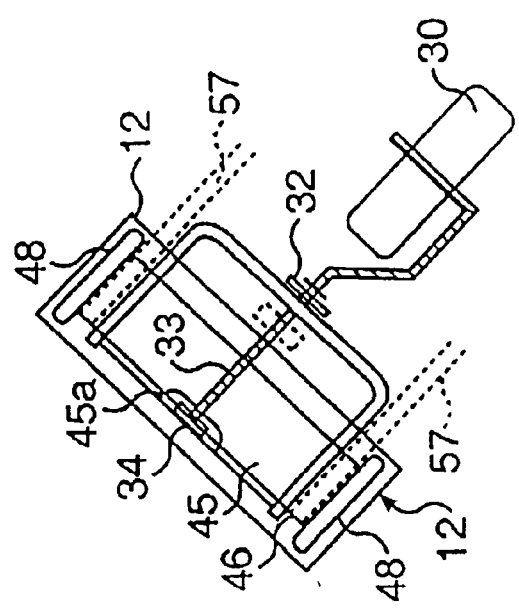

FIGS. 34 and 35 show two embodiments of the front wheel support structure for the four wheel cart, which allow 360° turning of the respective wheels 30. FIG. 34 shows a construction where a non-unitary wheel support structure is employed, and an end cap 34 is secured after placement of a washer (not shown) in a recessed area 45a of the top of the wheel support 45 and a longitudinal metal wheel arm 33 extends down to a further washer 32. End caps 48 close off the support sleeve or cylinder 46 which extends through the hollow upper area of the non-unitary wheel support structure 45 as described above. As was also described previously, the entire wheel support structure interfits into a matching cavity 12 molded out of the base wall itself and indicated in dashed lines The wheel support arms 57 are shown in dashed lines and as described above can be constructed in several ways as indicated previously using elements 47A or elements 56 which were described above, and which are not shown here. The separate wheel support arm structures 46 and 48 can be eliminated entirely, if desired, in an alternative unitary, one piece embodiment of the wheel support arm structure shown in FIG. 35.

FIG. 36 shows an alternative two wheel cart embodiment, commonly referred to as a hand cart and denoted DC. The embodiment shown includes a tubular (or similar) "lower" frame structure made of aluminum, or other suitable metal or plastic generally indicated at 101. Wheel support arms 102 include uppermost spaced elements 102a which are hollow and cylindrical and which slide on to the "upper" frame at 103. Elements 102a are preferably retained in position by suitable sleeves (not shown) which are held in place with pin screws (not shown) which extend into the frame 103. Multiple protrusions or clamp like extensions 104 on the wheel support arms 102 extend inwardly toward the frame structure 101 and provide a retention means between the wheel support arms 102 and the lower section of the frame 101 at such time as the wheel is pivoted 270° from the axis point along upper frame 103 to the lowered, operable position.

FIG. 36A shows the wheel structure arm pivot point or pivot axis 105, as well as the lower frame structure 101, and the retention clamps 104. The cart wheel structure may employ either a two sided support for the wheel 9, as shown in FIG. 36A, or a single sided support for the wheel (see FIG. 3F above), with the single sided support either closest to the frame or cart side of the wheel or vice-versa.

FIG. 36 also shows the generally "U" shaped handle 5 which nests inside of the lower portion of the frame section 101. The handle 5 may be telescoped or extended out to the dashed line position shown. A cargo tray 106 of the hand cart HC, is adapted to pivot and nest down into the lower section of the frame 101, as indicated in dashed lines. The cargo tray 106*a* pivots along an axis 107. As shown in FIG. 36B, the cargo carrier or tray 106 meets a stop 108 which is formed by a portion of the lower frame member 101. Alternatively, stop 108 can be separate part 109 retained in place on the frame via a screw pin, 10 or as shown in FIG. 36C.

Figure 37:
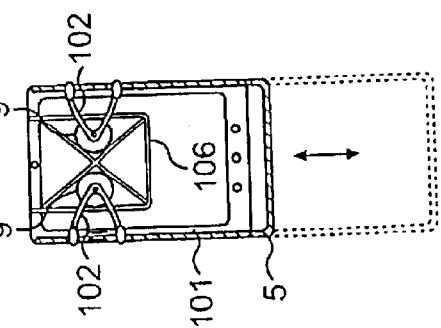
FIG. 37 is a top plan view of the embodiment of FIG. 36.

FIG. 37 is a top plan view which shows the cargo carrier or tray 106 in the nested state, the 270° pivoting wheel supports 102 in their nested position, and the handle 5 also nested as shown in solid lines with the extended handle shown in dashed lines. The handle 5 actually nests inside the tubular (or similar) lower frame structure 101.

Figure 38:
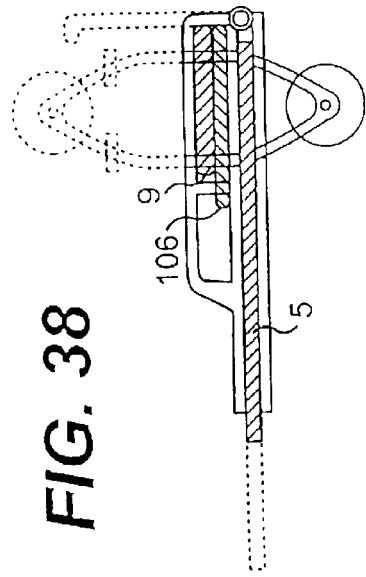
FIG. 38 shows a further embodiment of FIG. 36.

FIG. 38 shows the nested position of a wheel 9, the foot of tray 106, and of the handle 5. In dashed lines, the wheel structure 102 is shown pivoting from the operative position of the wheel structure. FIG. 38 also indicates the retention means for securing the wheel support structure 102 to the lower frame 101.

Figure 39:
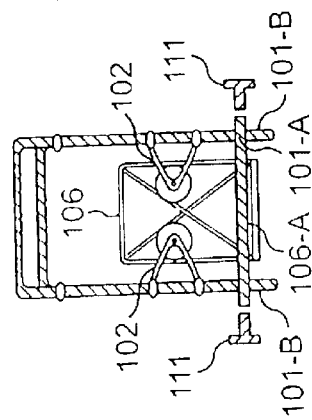
FIG. 39 shows further details of the embodiment of FIG. 38.

FIG. 39 is a top plan view showing the cargo carrier or tray 106 which includes a cylindrical or hollow portion 106A, to allow a lower frame cross member or arm 101A to extend through the tray cylinder 106A, as well as through two pass-through openings 101B in the lower frame 101, whereby end caps or screw-in pieces 111 close off the cross members 101A. The wheel support structures are indicated at 102 wherein, for illustration purposes, the wheels are omitted.

Figure 40:
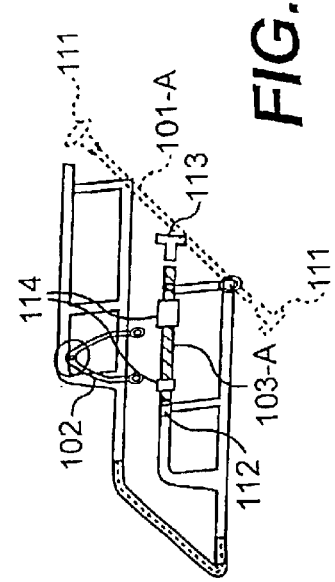
FIG. 40 is an exploded side elevational view showing further details.

FIG. 40 shows the wheel structures 102 are mounted on one upper frame arm 103A and the manner of assembly of some components. The wheel structure 102 is slid on to upper frame arm 103A before the same is recessed into an upper frame socket 112 and after these parts are secured, an end cap 113 is inserted in position in the end arm 103A. In this embodiment suitable stability sleeves 114 are placed on either side of the wheel structure 102 in order to retain the pivoting when structure 102 in place should a tubular frame be used. As indicated in dashed lines, the cross member 103A around which the foot or tray sleeve (not shown) is slid and is then secured in place with any suitable end cap configuration indicated by end caps 111. The preferred hand cart embodiment described above uses a frame-like upper and lower structure, although each "side" of the frame may alternatively be constructed of solid plastic or metallic materials without any separate upper and lower frame structure, yet still provide the same basic two wheeled hand cart construction compatible with the basic features disclosed herein.

Figure 42:
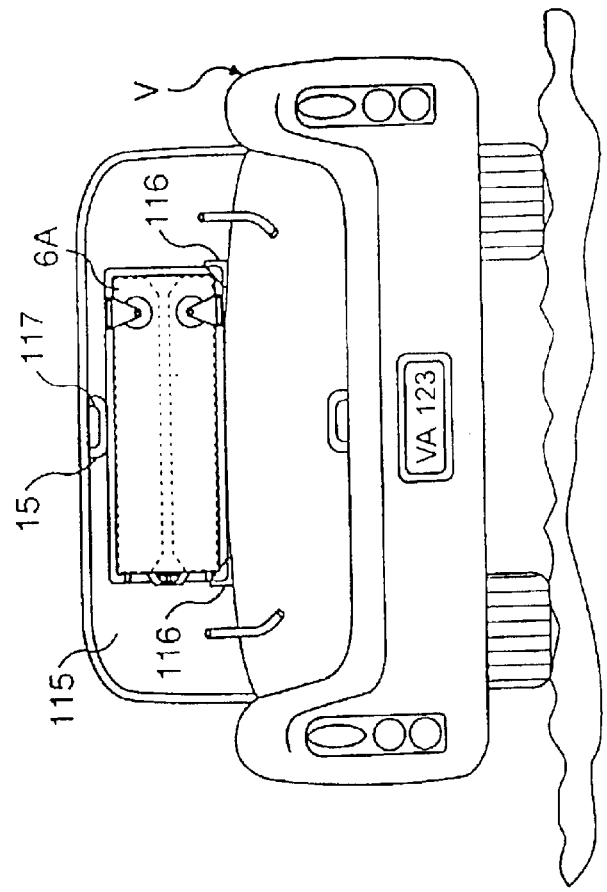
FIG. 42 is a schematic representation of an alternative method of cart storage.
Figure 41:
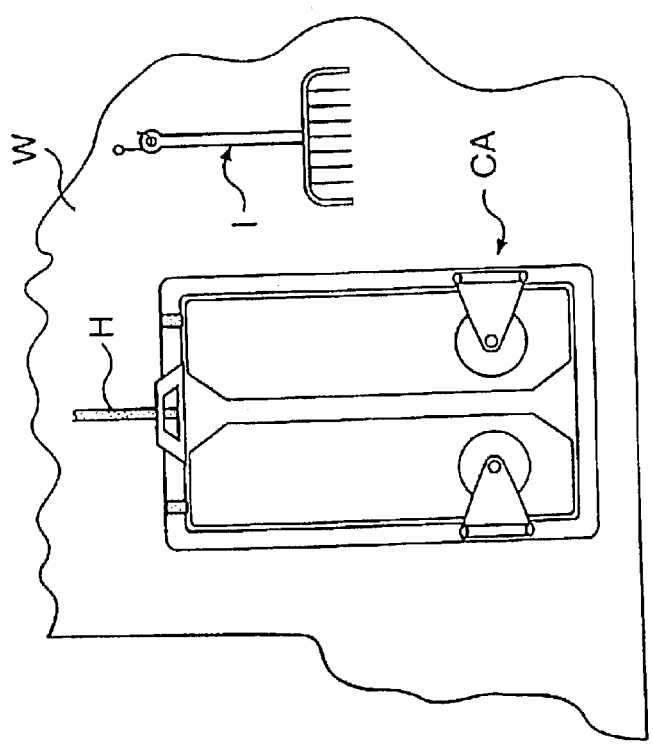
FIG. 41 is a schematic representation of a stored cart.

FIGS. 41 and 42 show storage methods or techniques for the folding cart. FIG. 41 shows one of numerous potential wall storage methods using a hook H mounted on a wall W with another implement indicated at I. FIG. 42 shows the cart CA (or any of the other carts discussed above) retained in the underside of an open vehicle trunk lid 115 a vehicle V wherein a series of retaining arms or elements 116 hold the corners of the carts CA, and one of the tapered carry handles 15 is resiliently held to the lid via resilient cooperation with any portion of the trunk lid 115. Given that one of the main objects of this invention is to create a thin profile folding cart, it is apparent that any of the folded, nested carts described above can be fitted to be stored and nested along any flat surface, such as a vehicle trunk lid, hatch or door, whether similar or different to that disclosed in FIG. 42, or even inside a custom created slot or groove manufactured inside the vehicle lid or door or other accessible structure.

Figure 43:
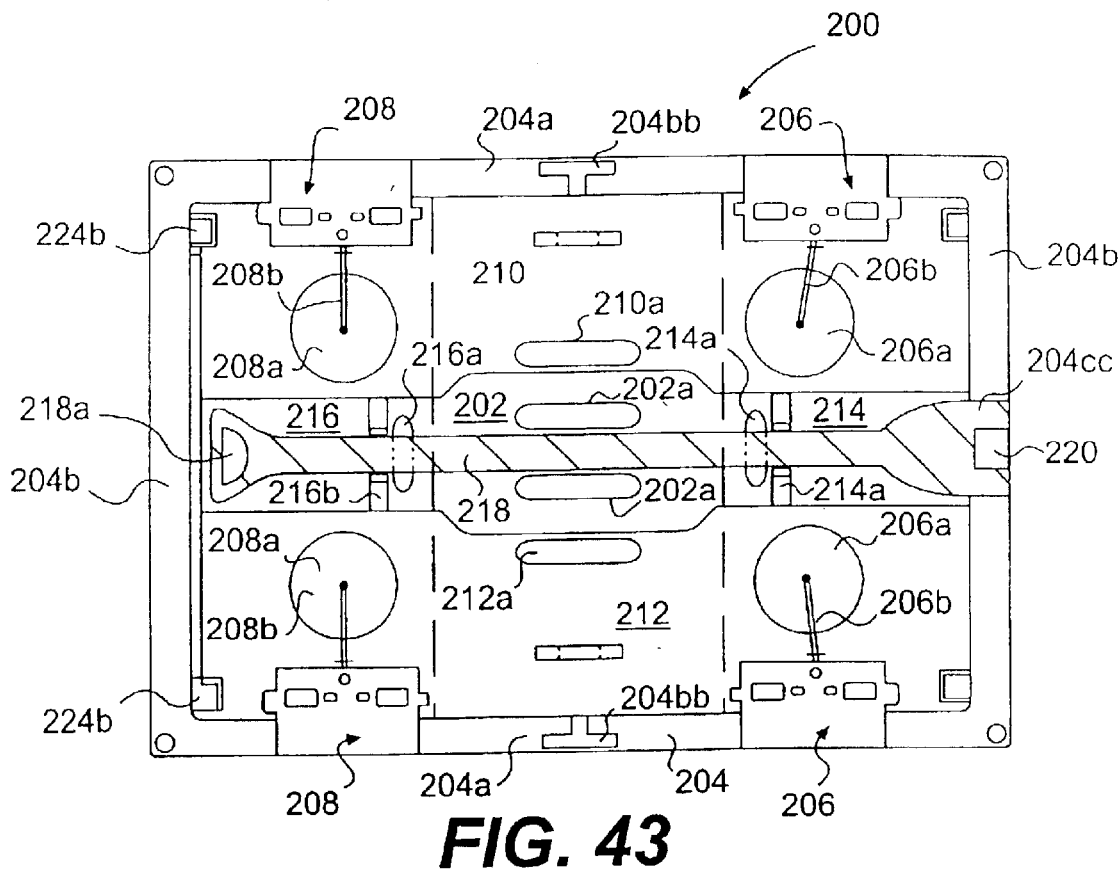
FIG. 43 is a top plan view of a carrier device in accordance with yet another embodiment of the invention.
Figure 44:
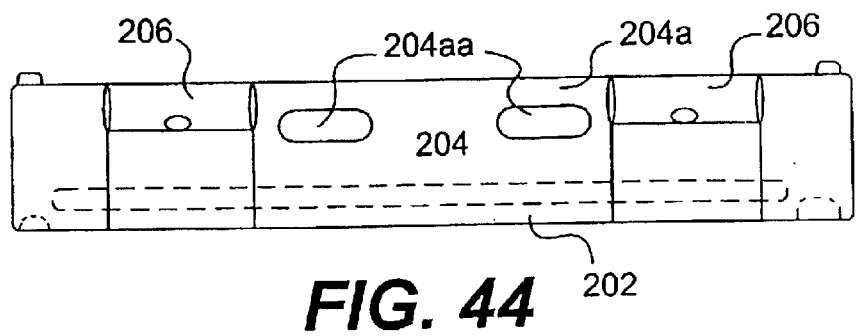
FIG. 44 is a side elevational view of the carrier device of FIG. 43.

Referring to FIGS. 43 and 44, there is shown a plan view and side elevational, respectively, of a further embodiment of the invention, in the collapsed state thereof. The cart, which is generally denoted 200, includes a base or bottom wall member 202 supporting a rectangular side or stub wall 204 comprising side walls 204*a* and end walls 204*b*. Walls 204*a*, 204*b* are relatively short in height (less than the length of a credit card, in a preferred embodiment) and are located around the rectangular perimeter of base member 202. As shown in FIG. 43, bottom wall 202 includes a pair of central hand openings or hand holes 202*a* while, as shown at 204*aa* in FIG. 44, for one of the side walls 204*b*, the stub walls 204*a*, 204*b* also includes one or more spaced hand holes. Front and rear pairs of wheel mounting assemblies 206 and 208 include respective wheels 206*a* and 208*a* and wheel support axles 206*b* and 208*b*.

Wheel assemblies 206 and 208 pivot around axes (not shown in FIGS. 43 and 44) through 270°, in a manner generally similar to that described above, from the stowed position shown in FIGS. 43 and 44 to an erected position (not shown) in which the front wheels 206*a* and rear wheels 208*a* support the cart 200. Wheel assemblies 206 and 208 and the associated locking and release mechanisms therefor are described in more detail below.

In the collapsed state illustrated in FIG. 43, wheels 206*a* and 208*b* lay above erectable or pivotable side walls 210 and 212 which, in turn, lay above erectable end walls 214 and 216 which, in turn, lay above bottom wall 202. The manner in which the erectable walls are lowered and erected is discussed in more detail below. As illustrated, erectable side walls 210 and 212 include, in an area adjacent to a central indented portion of the respective free edges thereof, respective hand holes 210*a* and 210*b*, while erectable end walls 214 and 216 include respective hand holes 214*a* and 216*a* disposed adjacent to the respective free edges thereof. Erectable side walls 210 and 212 also include respective T-shaped engagement members 210*b* and 212*b*, which, when the corresponding walls are erected, are received in respective T-shaped slots 204*bb* in the fixed side walls 204*a* as described below.

A handle member 218 including a hand grip 216*a* at one end thereof is pivoted at the other end thereof about a stub shaft (not shown) supported for rotation in a shaft support member 220 positioned centrally of fixed front wall 204*b* in a central opening or gap 204*cc* in that wall. In the stowed or collapsed state illustrated in FIG. 43, handle 218 lies flat and is retained in this state on top on erectable end walls 214 and 216 and bottom wall 202 so as to extend between erectable side walls 212 and 214 by resilient gripping elements 214*b* and 216*b* formed on or recessed to erectable end walls 214 and 216, respectively.

Figure 45:
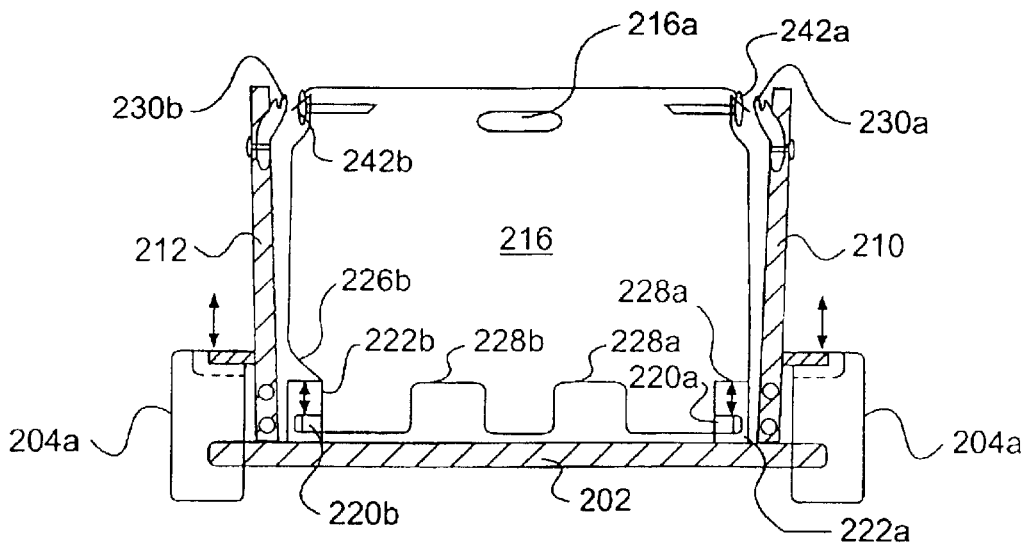
FIG. 45 is an end view of the carrier device of FIG. 43 with portions omitted.

Referring to FIGS. 45, there is shown the mechanism or arrangement by which the end walls 214 and 216 are erected and collapsed. As shown in FIG. 45 for end wall 216 (and end wall 214 is similar), end wall 216 includes a pair of oppositely extending hinge shaft or hinge elements 220a and 220b on opposite sides at the bottom thereof which are respectively received in hinge support members or hinge bracket boxes 222a and 222b mounted at spaced locations on base or bottom wall 202. Although this embodiment is not illustrated, the identical hinge support member/bracket boxes 222a and 222b can be formed as separable components, as discussed above, or for ease of manufacture, may be unitarily molded as a component of either bottom wall 202 or stub walls 204b.

Figure 46:
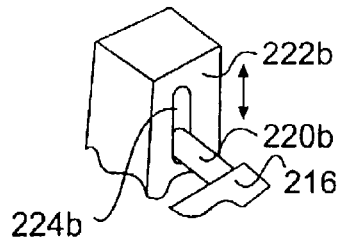
FIG. 46 is a perspective view of a detail of the embodiment of FIG. 43.

As shown in FIG. 46 for support member 222b, a vertically extending, elongate slot or cavity 224b is provided member 222b in which hinge shaft or pivot element 220b is received so that element 220b can pivot relative to member 222b and can also be raised and lowered in slot 224b.

Cut out areas or cutouts 226a and 226b at the lower edges of end wall 216 on opposite sides thereof, permit end wall 216 to pivot around hinge or support members 224a and 224b. Further spaced cutouts 228a and 228b in the bottom edge of end wall 216 accommodate outwardly projecting male securing elements 230a and 230b, which are affixed to side walls 210 and 212 and are described in more detail below, in the collapsed state of the walls. As a consequence, the side walls 210 and 212, when collapsed onto end walls 214 and 216, lay perfectly flat on base member 202, as shown in FIG. 43.

Figure 47:
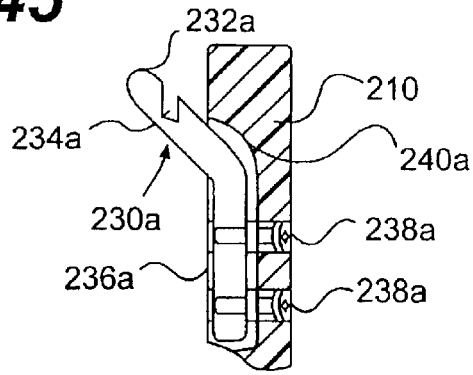
FIG. 47 is a cross-sectional view of a further detail of the embodiment of FIG. 43.

As shown in FIG. 47 for securing element 230a (and securing element 230b is similar), securing element 230a comprises an inwardly angled securing portion 232a which projects from side wall 210 and includes a small groove or slot 234a in the upper surface, and a support portion 236a which is affixed in place on side wall 210 by screws 238a and is accommodated in a recess or cavity 240a in sidewall 210 so that only angled portion 232a projects therefrom.

Figure 48:
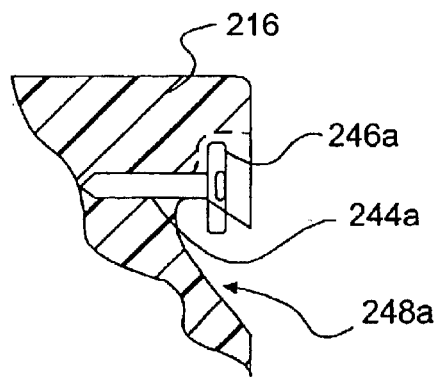
FIGS. 48 and 49 are longitudinal and transverse cross-sectional views, respectively, of a further detail of the embodiment of FIG. 43.
Figure 49:
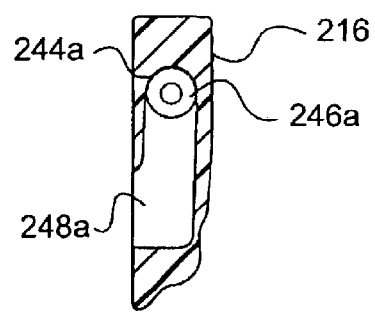

Securing elements 230a and 230b cooperate with respective securing elements 242a and 242b provided at the upper side opposite edges of end wall 216. As shown in FIGS. 48 and 49 for securing member 242a (and securing member 242b is similar), member 242a comprises a screw element 244a which has a modified Allen wrench head 246a and which is received in cavity or recess 248a formed in the top side edge and adjacent side wall surface of end wall 216. As illustrated, screw element 244a is screwed into the side edge of the portion of end wall 216 forming cavity 248a and is positioned such that access can be gained to the lower edge of screw head 246a through cavity 248a.

To engage securing elements 230a and 242a and securing elements 230b and 242b, a user places his or her hand into hand hold opening 216a and lifts end wall 216 slightly so that, considering securing members 230a and 242b (and members 230b and 242b cooperate in a similar manner), the lower edge of screw head 246a of screw element 244a can be fit into the transverse groove or channel 234a in securing member 230a, thereby securing wall 216 to wall 210. Alternatively, for ease of manufacture, members 230a and 230b as well as members 242a and 242b, can be partly or wholly eliminated as separate components by incorporating their functions, as described above, into unitary molded parts of end walls 216 and side walls 210 and 212.

Referring to FIGS. 50 to 55, details are shown of the hinge arrangement which serves both to pivotally mount the side walls 210 and 212 and to guide the movement of side walls 210 and 212 so as to permit these walls to lay completely flat in relation to base member 202 in a collapsed state, just above, extending parallel to, and overlying the end walls 214 and 216.

As described above in connection with FIG. 43, the side stub walls 204a of the cart 200 include respective T-shaped recesses or cavities 204bb formed therein. Cavities 204bb are open at the top and receive, in the erected states of side walls 210 and 212 shown in FIG. 50, correspondingly shaped (e.g., T-shaped) projections 250a and 250b formed on side walls 210 and 212, respectively, centrally thereof at height corresponding to that of the side stub walls 204a. To collapse the side walls 210 and 212, the projections 250a and 250b are lifted out of respective cavities 204bb as indicated in FIG. 51 so that the walls 210 and 212 can be pivoted to the collapsed, rest state shown in FIG. 52.

Figure 50:
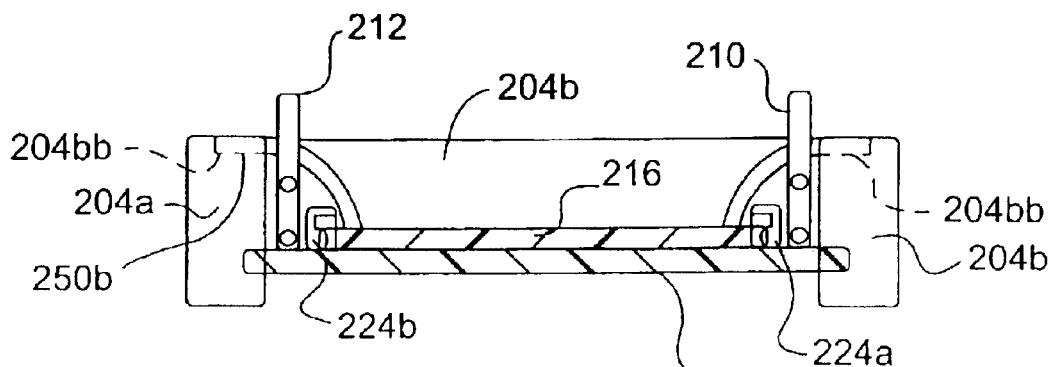
FIGS. 50 to 52 are simplified end elevational views showing various steps in collapsing of the erectable walls of the carrier device of FIG. 43.
Figure 51:
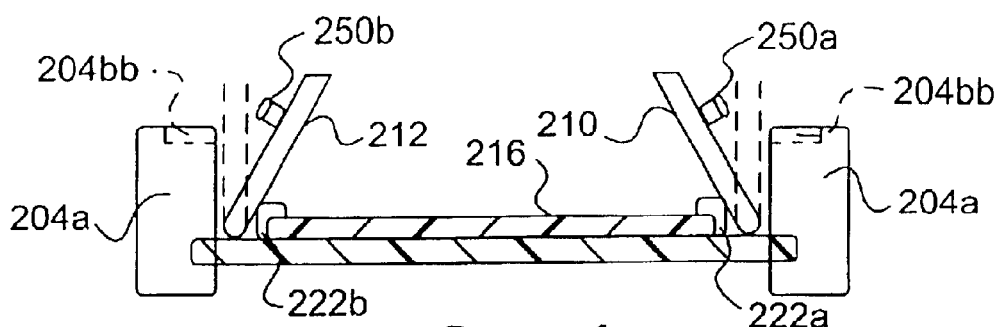
Figure 52:
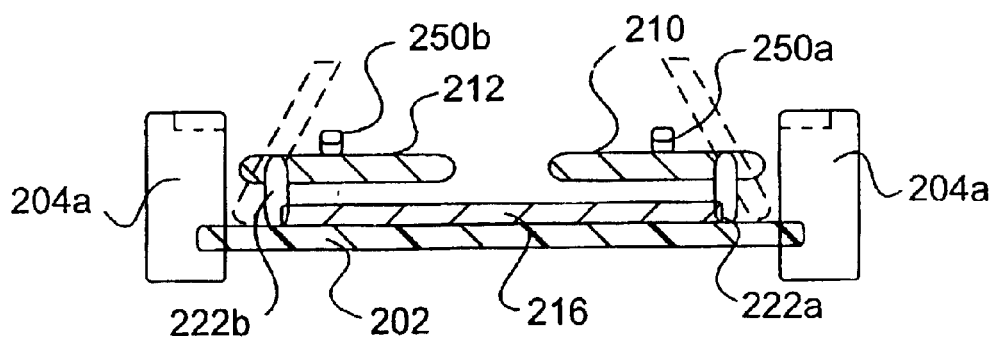
Figure 53:
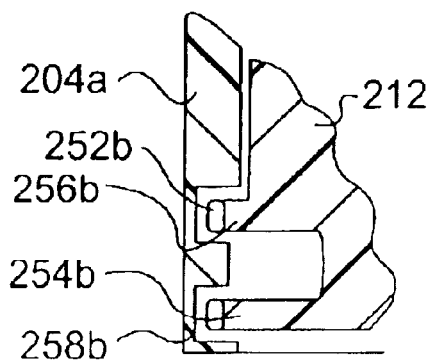
FIGS. 53 to 55 are views showing details of the cooperating erectable walls and fixed walls of the carrier device of FIG. 43.
Figure 54:
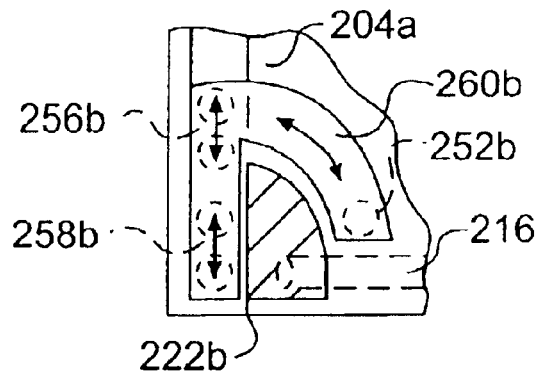
Figure 55:
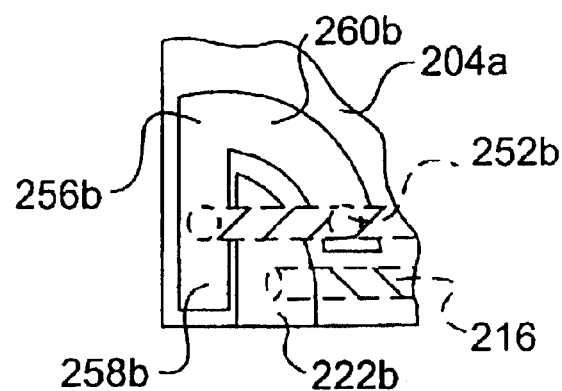

This pivoting movement of side walls 210 and 212 is enabled by arrangement indicated in FIG. 50 as well as in FIGS. 53 to 55. As shown in FIG. 53 for side wall 212 (and, again, the construction of side wall 210 is similar), side wall 212 includes a double hinge construction comprising a pair of hinge element or hinge shafts 252b and 254b which are received in cavities 256b and 258b in stub wall 204a. The cavities 256a and 258b are of a vertical extent such as to permit lifting of side wall 212 as indicated in FIG. 54 (and in FIG. 50). The upper cavity 256b includes an inwardly extending arcuate portion 260b that defines a guide path for hinge element 252b so as to enable pivoting of wall 212 to the collapsed position thereof, as shown in FIGS. 54 and 55. Thus, by lifting on wall 212 so that T-shaped element 250b is released from T-shaped recess 204bb in stub wall 204a and hinge element 256b is brought up to the entrance of arcuate cavity 260b, wall 212 can be pivoted to the collapsed state thereof.

Referring to FIG. 56 there are shown further details of one of the wheel mounting assembly 206. It will be understood that wheel mounting assemblies 208 are similar although the assemblies differ in a manner described below. Assembly 206 includes a mounting member 270 which is located in a gap 272 in stub wall 204a and is pivotably connected to adjacent portions 274 and 276 of stub wall 204a which are disposed on opposite sides of gap 272 and which are joined by an intermediate recessed portion 278 (see FIG. 57) of stub wall 204a in which member 270 is received in the erected state of wheel assembly 206 shown in FIG. 56.

Member 270 is pivotably mounted by a pivot shaft member or dowel 208 which may be hollow. As shown in FIGS. 57 and 58, wall portion 274 includes a substantially cylindrical cavity 274a in the end wall surface thereof and wall portion 276 includes a similar, longer opposed cavity 276a. Dowel 280 extends through an opening 282 at the top of wheel mounting member 270 between cavities 274a and 276a. Dowel 280 includes a curved recess or indentation 280a in one side thereof disposed centrally of the gap 278 in which the upper portion or part 284a of an elongate wheel support element 284 is received. As shown in FIGS. 56 and 59, this upper portion 284a extends the full height of member 270 and terminates in a cranked portion 284b which corresponds to wheel support axle 206b of FIG. 43, and which includes a stub shaft or axle 284c on which wheel 206a is mounted. The cooperation between wheel support element 284 and cavity 280a serves to hold dowel or support shaft 280 in place so as to prevent lateral movement thereof without the use of a locking nut or bolt.

Referring to FIGS. 56 and 59, wheel support element 284 includes an enlarged end portion 284d at the top thereof, i.e., the end remote from wheel 206a, which can be forced by a simple nut screwed on to element 284 and which is received in a corresponding recess in member 260 so as to permit 360° rotation of element 284 and thus of wheel 206a. Suitable washers, circlips or the like indicated at 286 and 288 in FIG. 56 help secure the support 284 to member 270 and to wheel 206a.

As indicated above, the wheel mounting assemblies 208 for the rear wheels 208a is similar but differs in one important regard, viz, the rear wheels 208a are prevented from rotation, i.e., the normal free spinning of the wheels 280a is precluded. This is effected in FIG. 59 by a locking pin or set screw 290 extending into member 270 and through a corresponding hole in element 284 so as to prevent rotation of the latter, although, instead, a push or pull pin or latch can be employed which is manipulated in and out of an opening (not shown) through axle 284. Alternatively, this fixation of the rear wheels 508a can be effected by a push-on cap or nut 292 (see also FIG. 59A) provided at the top of element 284 which is shaped to fit tightly into a mating recess 294 in the top of member 270. In the exemplary embodiment shown in FIG. 59A nut 292 is a hex "pal" nut and would be received in a hexagon shaped cavity 294. Thus, using any of these techniques or using the spring loaded fixation approach discussed hereinbelow, the 360° rotational mounting of the wheel support axle 284 provided for front wheels 206a is readily converted to a non-rotatable mounting. Accordingly, for ease of manufacture, the wheel mounting assemblies 206 and 208 are made in substantially the same way apart from additional provision of the locking elements just described. Any of these techniques, in cooperation with the overall wheel mounting arrangement provide a simple way to prevent axial rotation of any vertically extending wheel support axle. This contrasts with the prior art wherein different techniques are used which generally employ a transverse axle interconnecting the fixed (e.g. rear) wheels or a fixed downwardly depending support element and a transverse bolt or shaft structure extending through the center of the wheel or the tire and journaled for simple rotation in the fixed support element.

The wheel mounting assemblies 206 and 208 also include a releasable latching mechanism which is generally denoted 294 and which serves to latch support member 270 in the erected vertical or upright position shown in FIG. 56 between adjacent wall portions 274 and 276 flush with the surfaces of these wall portions. As shown in FIG. 56, support member 270 includes first and second spaced apertures 296 and 298 which provide access to finger grip holes 300a and 302a of respective sliding latches or locking members 300 and 302. Latches 300 and 302 are received in respective blind or closed end cavities 304 and 306 in support member 270 and, in the latched state, enter into respective cavities 308 and 310 in corresponding stub wall portions 274 and 276.

Referring to FIG. 56, the latches 300 and 302 (shown best in FIGS. 60a and 60b) are biased into the latched states thereof by respective longitudinally extending coil springs 312 and 314 which affixed to the inner ends of latches 300 and 302 and which also engage the respective closed ends of cavities 304 and 306. Preferably, the spring-loaded latches 300 and 302 are inserted into the respective cavities 304 and 306 after the placement of the respective springs 312 and 314. Small set screws 315 and 318 are screwed into the corresponding latches 300 and 302 to secure the respective springs 312 and 314 in place. Alternatively, for ease of manufacture, the projection or protrusion created by the set screws 315 and 318 can be wholly eliminated by incorporating the same projection/protrusion into the associated latches 300 and 302 so as to create latches that would be forced into permanent placement.

Figure 60A:
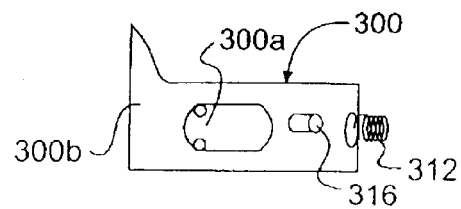
Figure 61:
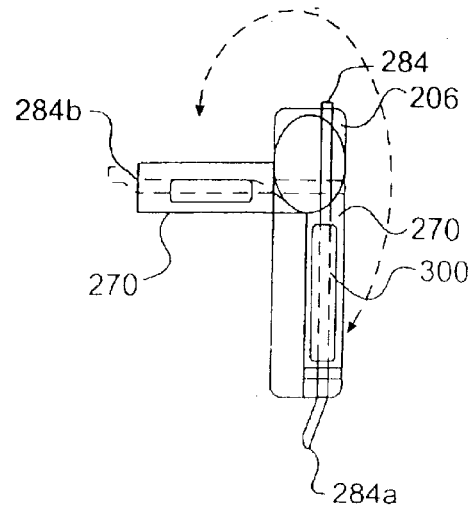
Figure 60B:
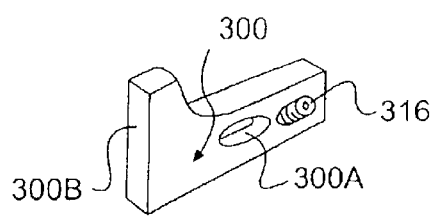

As shown in FIG. 56, and is perhaps best seen in FIGS. 60A and 60B, latch or locking member 300 includes an enlarged distal end shoulder portion or foot 300b. Portion 300b is intended to engage in a matching cavity of a facing portion of the stub wall 204b (or press against this stub wall) in the collapsed state of wheel assembly 206, as indicated generally in FIG. 43, in a manner that prevents the assembly 206 from being rotated. Portion 300b will automatically assume this second latching state under the biasing force exerted on latch 300 by spring 312 when the wheel assembly 206 is rotated through 270° as shown in FIG. 61.

Of course, the purpose of this feature is to provide positive retention of the respective wheel assemblies 206 and 208 in the collapsed states thereof and can be omitted if such positive latching of the assemblies is not desired.

In operation, to unlock the wheel assembly 206 (or 208), a user sticks a finger and thumb through the holes 296 and 298 into finger grips 300a and 302a and squeezes so as to move the latches 300 towards each other against the biasing forces exerted by the respective springs 312 and 314. This squeezing action frees latches 300 and 302 from the respective cavities 308 and 310 and thus permits the user to rotate the wheel assembly 206 through 270° as shown in FIG. 61 to storage position thereof on cart 200. This is, of course, repeated for the other wheel assemblies until all are collapsed and stored on top of cart 200. Similarly, to erect the wheel assemblies 206 and 208, the latch 300 is released from its locking position in a similar manner, i.e., retracted by squeezing the finger holes 300a and 302a together and upon such release, the assemblies are simply rotated through 270° to the upright position with the wheels 206a and 208a supporting the cart 200.

Figure 62:
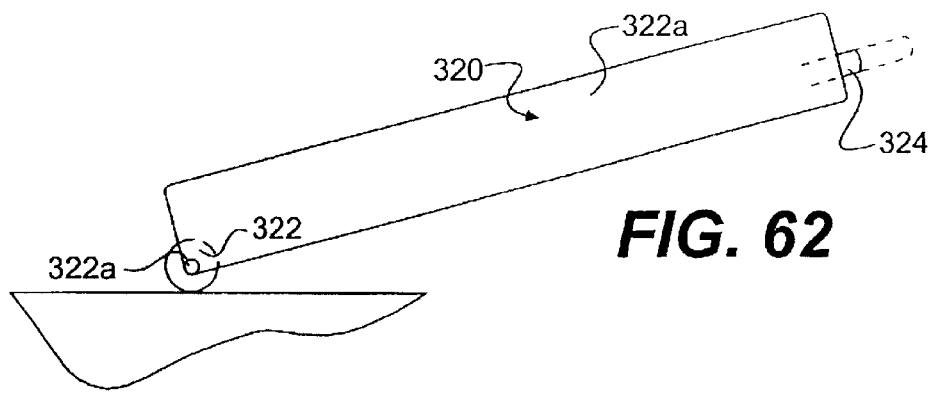
FIGS. 62 and 63 are a side elevational view and an end elevational view, respectively, of a further aspect of the invention which is applicable to other embodiments of the invention described previously and about to be described.
Figure 63:
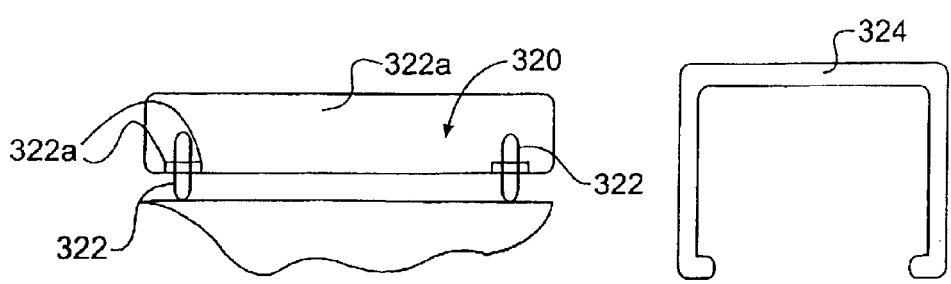

Referring to FIGS. 62 and 63, an alternative embodiment of the invention is shown, which is particularly adapted to two wheel implementations but is applicable to, e.g., three and four wheel implementations as well.

In this embodiment, a cart 320 corresponding, for example, to cart 20b described above or to other collapsible carts or the like including those described hereinbefore, is additionally supported by two small diameter wheels 322 which are of a size, and which are mounted such that, the wheels 322 extend just beyond the confines of the stub walls 320a of cart 322, i.e., such that only a small portion of the wheels 322 is exposed for contact with a surface over which the cart 320 is to be pulled. Separate stub axles 322a can be used to journal the wheels for rotation at corresponding locations on cart 320. This embodiment enables a user to briefly tote or pull the cart 320 after extracting the cart from a trunk of a car or within another area, before the cart is actually erected from the collapsed state thereof.

Figure 64:
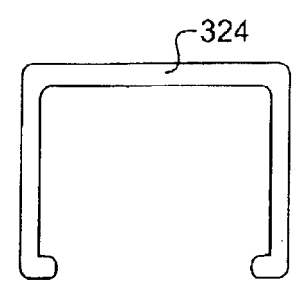
FIGS. 64, 65 and 66 are various views of details of the embodiment of FIGS. 62 and 63 or variants thereof.
Figure 65:
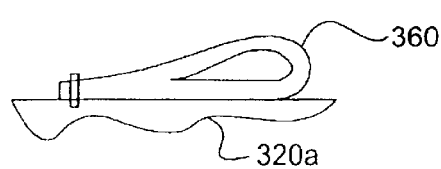
Figure 66:
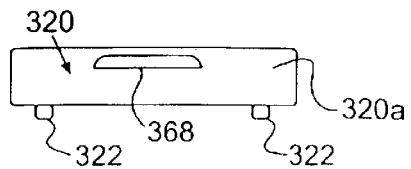

A simple U-shaped pull-out handle 324, shown in FIG. 64, is provided which is pulled out from the stub wall 320a at the end of cart 320 opposite to wheels 322. Alternatively, as shown in FIG. 65, a flexible loop or "bow" shaped pull handle 366 is used which is affixed to end stub wall 320a opposite to wheels 322. In yet another embodiment shown in FIG. 66, a simple hand hole or gripping opening 368 is provided in the stub wall 320a opposite to wheels 322.

Figure 67:
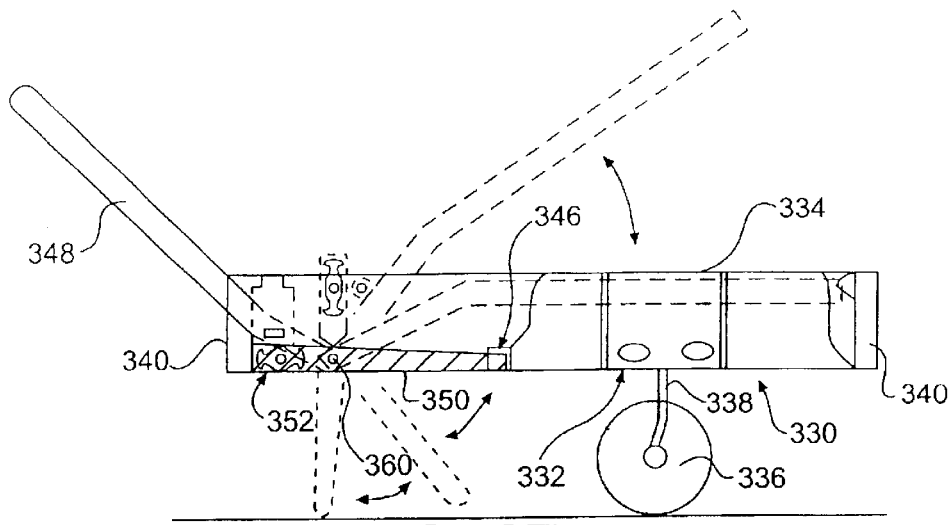
FIG. 67 is a side elevational view of a two wheel carrier device in accordance with still another embodiment of the invention.
Figure 68:
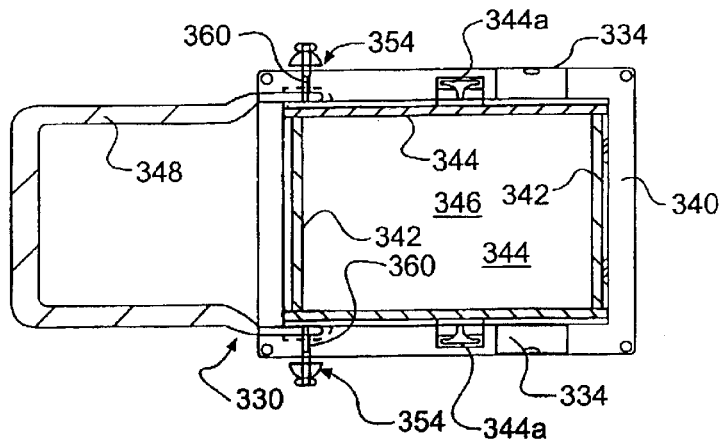
FIGS. 68 and 69 are top plan views of the device of FIG. 67, showing the operative and stowed or collapsed states, respectively.

Referring to FIGS. 67 to 71, a further embodiment is shown of the two wheel cart of the invention. The cart, which is generally denoted 330, is similar in its overall construction to four wheel cart of FIG. 43 apart from its handle and support stand construction. Accordingly, cart 330 will only be briefly described apart from this handle and support construction. The cart 330 includes a pair of wheel assemblies 332 which are similar to wheel assemblies 206 and which each comprise a wheel support member 334, a wheel 336 and a support axle 338. The cart 330 further includes stub walls 340 extending around the perimeter thereof, as well as erectable end walls 342 and side walls 344, as shown in FIG. 68 (with side walls 348 including T-shaped elements 344a that fit into corresponding matching slots in side stub walls 340 as in the embodiment of FIG. 43) and a bottom wall 346.

Figure 69:
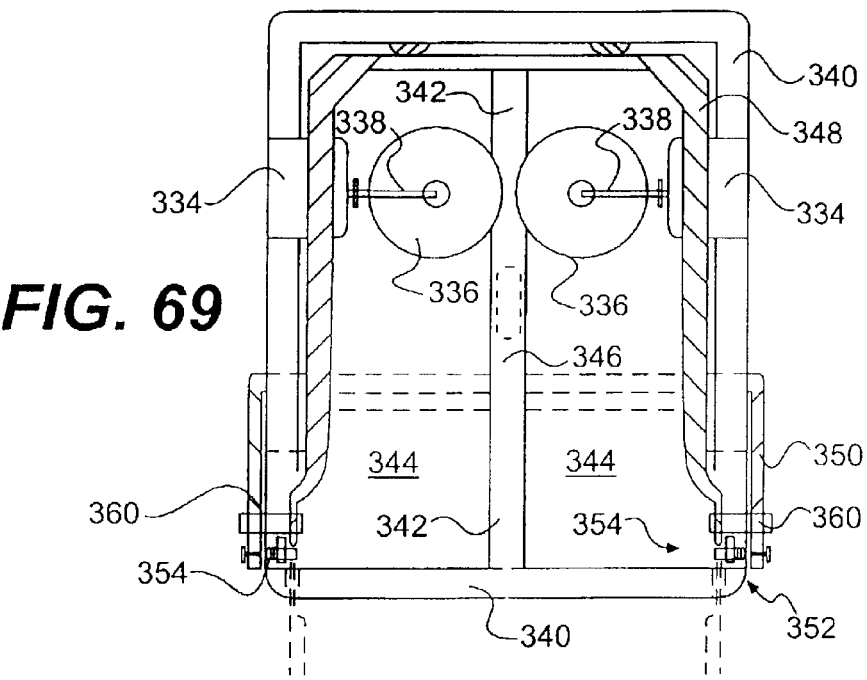
Figure 70:
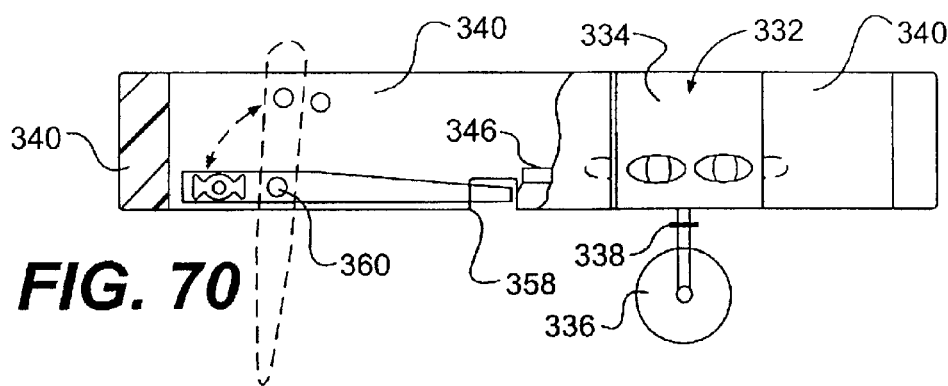
FIG. 70 is a side elevational view of the device of FIG. 67 showing details of the support stand.
Figure 71:
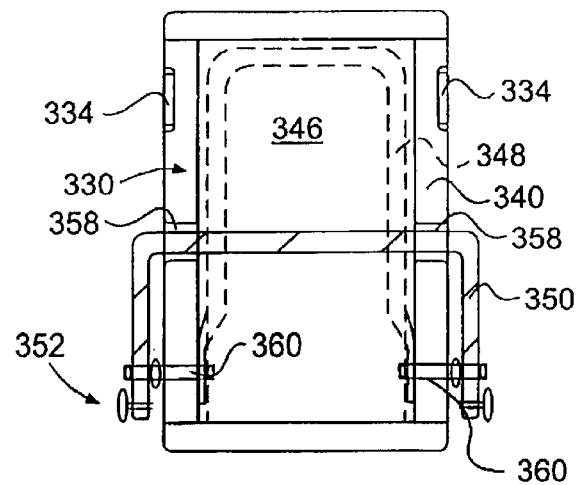
FIG. 71 is a bottom plan view of the device of FIG. 67.

The embodiment of FIGS. 67 to 71 features a dual purpose pivot bolt arrangement which serves to support, or function as, the pivot axis for both a folding handle 348 (see FIGS. 67, 68 and 69) and a support stand 350 (see FIGS. 67, 70 and 71). Handle 348 is generally U-shaped and includes flat proximal ends 348 at which the handle is pivoted. Deployment and latching of the support stand 300 is effected under the control of a retention "dial" mechanism 352 best seen in FIGS. 72 to 74. The handle 348 is locked or latched in the operative position shown in solid lines in FIGS. 67 and 68 by a spring loaded latch mechanism 354 best seen in FIGS. 75 and 76.

As shown in FIGS. 67 to 69, a pair of spaced resilient projections or protrusions 356 provided on the end stub wall 340 opposite to the pivot axis of the U-shaped handle 348 serve to releasably retain handle 348 in its collapsed or stored position (best seen in FIG. 69). FIGS. 69 shows cart 330 in its fully collapsed state, with the handle 348 secured in place under projections 356. It will, of course, be appreciated that handle 348 must be pivoted up into the operative position thereof before the other elements of the cart 330 can be set up, as with the similar four wheel embodiment of FIG. 43, apart from the support stand 350 which can be set up independently.

As shown in FIG. 69, the arms of U-shaped support stand 350 extend outwardly beyond the side stub walls 340, although it will be appreciated that depending on such factors as the materials used and the weight capacity for which the cart is designed, the arms of support stand 350 can be disposed so as to be generally flush with the exterior surface of the side stub walls 340, or, alternatively, in a more flush profile than in FIG. 60, rather than extending along this exterior surface as shown in FIG. 69. As shown in FIGS. 67, 60, 70 and 71, support stand 350 nests under bottom wall 346 and the cross arm of support stand 350 is received in corresponding slots or gaps 358 in the portion of the side stub walls 340 which extend below bottom wall 346. Thus, the support stand 350 adds no further depth or thickness to the profile of cart 330 in the collapsed state thereof. In addition, as indicated above, the support stand 348 can also be constructed such that the lateral extent of support stand 350 is within the confines of the side stub walls 340, or in closer proximity to these walls, than in the illustrated embodiment.

Figure 73:
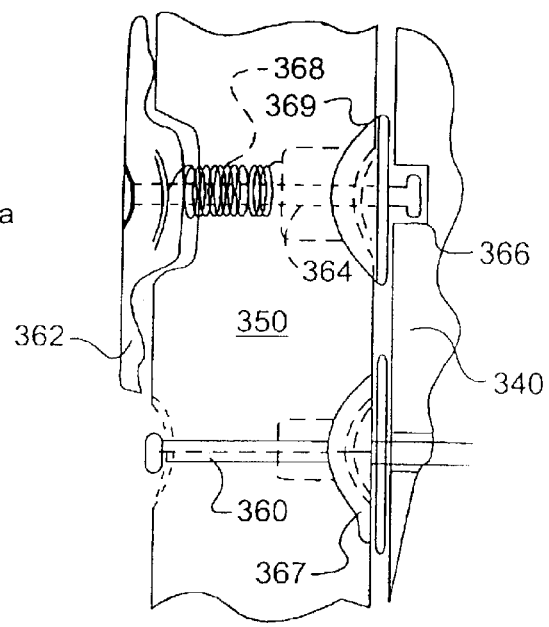

As indicated above, both handle 348 and support stand 350 pivot about the same axis and this axis is defined by a spaced pair of pivot bolts or shafts 360. As shown in FIG. 73 (and in FIG. 75) support stand 350 is retained or latched in the stored position by a latching mechanism 352 which includes a "dial" (rotatable) retention element 362 connected to one end of a latching pin 364 which is received in a slot or cavity 366 in an adjacent side stub wall 340. A coil spring 368 exerts a bearing force on element 362 in a direction away from cavity 366. Finishing washer sets for bolts 360 and 364 are indicated at 367 and 369.

Figure 72:
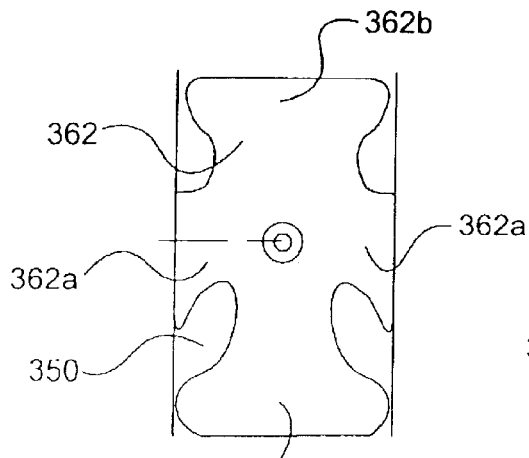
FIGS. 72 to 76 are various views showing details of the retention and latching mechanisms used in the embodiment of FIG. 67.
Figure 74:
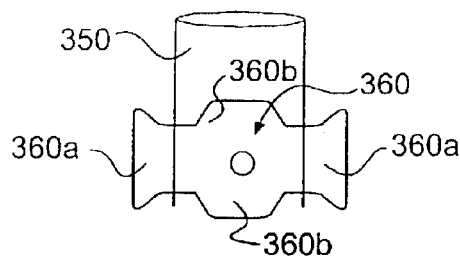

As indicated in FIGS. 72 and 73, retention element 362 is generally cross-shaped with a first set of opposed arms 362a having a deeper curvature than the second set of opposed arms 362b. In other words, as shown in FIG. 73, arms 362a curve around a greater portion of the circumference of the hollow tubing forming the arms of support stand 350 than do arms 362b, which can lay substantially flat against the corresponding support stand arm 350, as illustrated in FIG. 73. By turning the retention element 362 through a quarter turn, i.e., through 90°, as shown in FIG. 74, the arms 362a of retention element 362 ride upon the surface of support stand 350 and pin 364 is retracted from cavity 366 in adjacent side stub wall 340. With pin 364 thus retracted, the support stand 350 can be pivoted into the erected position thereof shown, e.g., in FIG. 67. At this point, in order to lock support stand 350 in place, the user can rotate the retention element 362 back through 90° so as to compress spring 368 so that the pin 364 engages in a further recess or cavity (not shown) near the top of the adjacent side stub wall 340 to thereby lock or secure support stand 350 in the erected position thereof.

Figure 75:
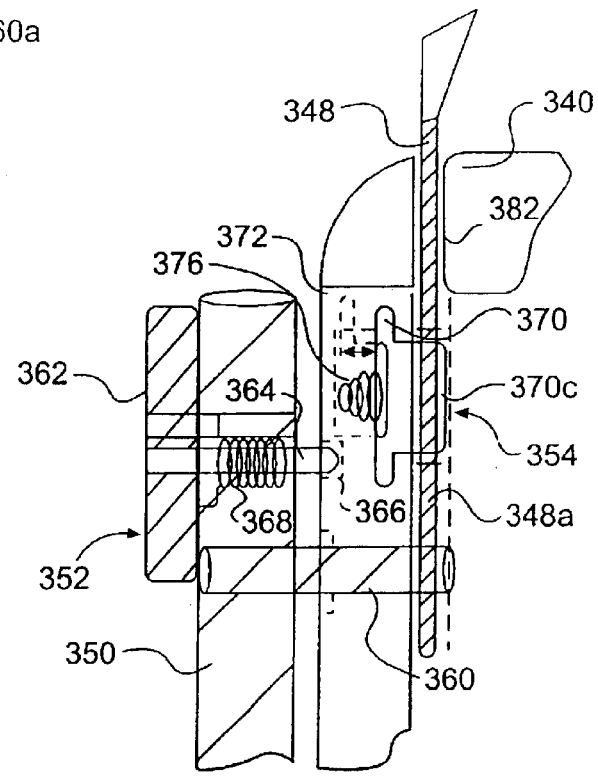
Figure 76:
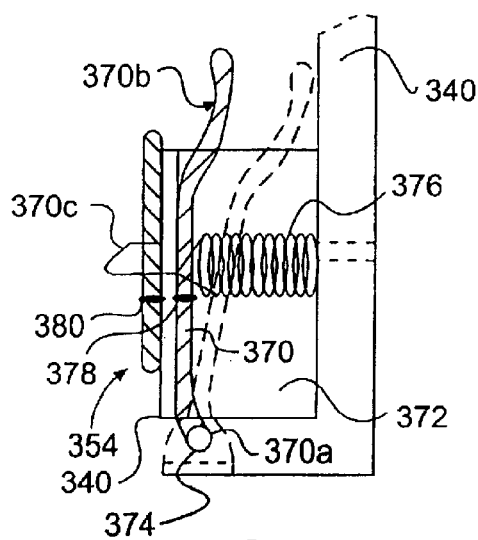

Referring to FIGS. 75 and 76, there is shown the latching mechanism 354 for the lift or pull handle 348. (As indicated, e.g., in FIG. 69, two such latching mechanism 354 are provided, one on each side of cart 330.) The latching mechanism 354 is located or disposed adjacent a flat end portion 348a of handle 348 and comprises latch member 360 disposed in a cavity 372 in a side stub wall 340. As can be best seen in FIG. 76, latch member 370 includes a base portion 370a which is pivotably mounted in a slot 374 formed at the bottom of cavity 372, as well as a finger tab portion 370b which is used to effect pivoting of latch member against the biasing force produced by a coil spring 376 disposed between the latch member 370 and a portion of side stub wall 340 that forms cavity 372. Latch member 370 also includes an outwardly projecting latching portion 370c which, in the latching position thereof, projects or extends through a hole 378 in a further portion of side stub wall 340 defining cavity 372 into a matching hole 380 in handle 348. As shown in FIG. 75, a gap 382 in end stub wall 340 receives therein the flat portion 348a of handle 348 in the erected state thereof wherein the handle 348 projects forwardly of the cart 330 as shown, e.g., in FIG. 67.

By pressing on the finger tab portion 360b at the top of latch member 370 to disengage latching projection 370c from hole 308 and using the other fingers of the same hand to pivot the handle 348 past the latching projection 370c toward the collapsed position, the user can release handle 348 from latching mechanism 354 and can continue to simply pivot handle 348 to the fully collapsed or stowed position inside the cart 330.

Alternatively, this "automatic" latch 370, with spring loading, can be eliminated entirely, in favor of solid push and pull sliding pins (not shown) extending through both side stub walls (or frame walls if no base is employed) wherein the pins are manually pressed inwardly by the user from the exterior of the side walls, and wherein the sliding pins are depressed inwardly after passing through the hole 380 (see FIG. 76) provided in handle 348. Essentially, these sliding pins would serve the same function as the outwardly projecting latching portion 370c, but would require inward and outward manipulation by the user.

Figure 77:
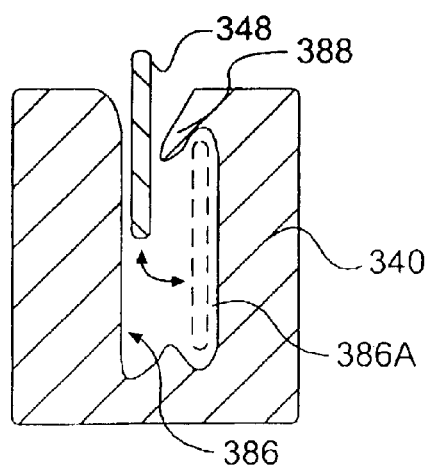
FIG. 77 is a cross-sectional view of an alternative embodiment for latching the lift handle.

Referring to FIG. 77, another alternative arrangement for latching the lift handle 348 is shown, wherein handle 348 is latched along an end stub wall 340 (rather than along the side stub wall). A cavity 386 is formed in wall 340 including a portion 386a which is defined in part by a resilient lip 388 and into which the handle 348 is moved laterally so that the latter is snap fit therein after dropping into the main cavity 386. This embodiment has the advantage of having no moving parts.

Figure 78:
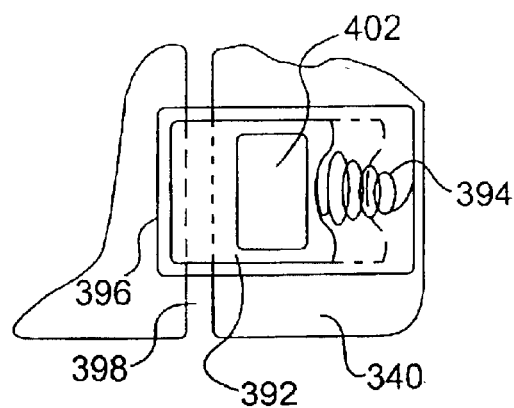
FIGS. 78 and 79 are two views of an alternative embodiment of the handle latching arrangement.
Figure 79:
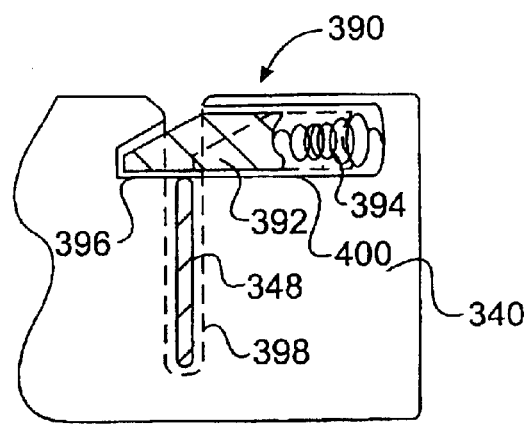

Referring to FIGS. 78 and 79, yet another embodiment of the handle latching arrangement is shown. In this embodiment, a latching mechanism 390 of a door handle type is used which is similar to those used in the wheel support assemblies described above. Latching mechanism 390 includes a latch member 392 biased by a spring 394 into a cavity 396 formed in an opposed wall of a recess 398 in which handle 348 is received. Latch member 392 and spring 394 are disposed in an opposed cavity 400 against the force of spring 394 to permit handle 348 to be received in recess 398. Latch member 392 is then released to latch or secure handle 348 in place in recess 398.

Figure 80:
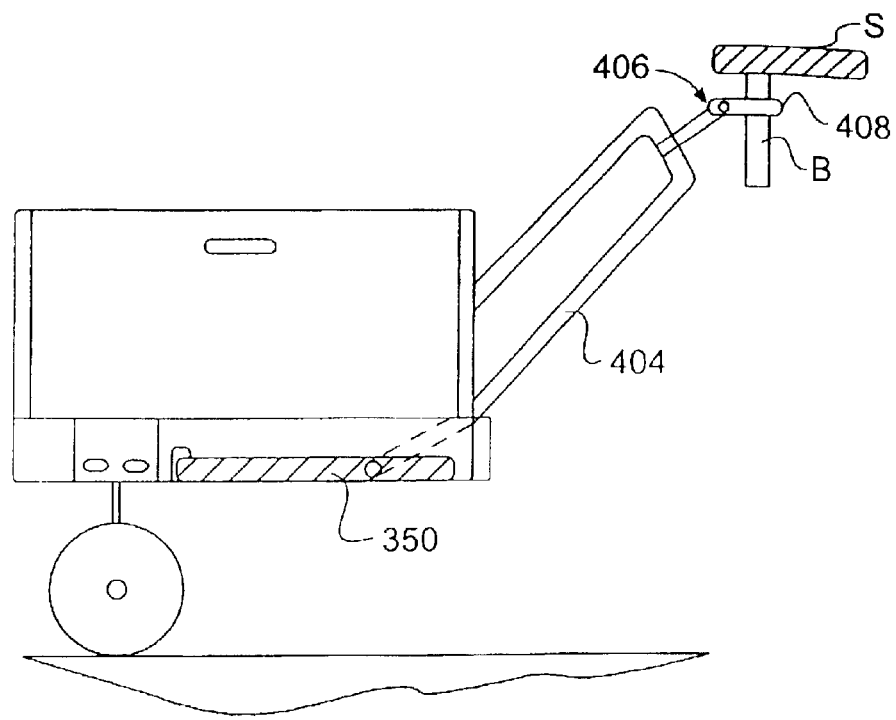
FIG. 80 is a side elevational view of a further aspect of the invention which can be incorporated in previously described, and about to be described, embodiments.

The various embodiments of the collapsible carrier device described above, including those having two wheels and those having more than two wheels, can be readily modified to provide fixing of at least one pair of the wheels to permit the cart to be trailed behind any type of vehicle or other wheeled device. Referring to FIG. 80, handle 404 (which could be similar to the U-shaped lift handle or the center pull handle described above) includes an attachment device 406 which is connectable, for example, to bracket B under the seat S of a bicycle or the like. Attachment device 406 can be permanently or detachably affixed to handle 404 and can comprise flexible snap-on collar portion 408 which fits around bracket B. Of course, attachment device 404 can be adapted to be connected to any kind of fixing or anchor point on a vehicle to provide connection of handle 404 to that vehicle.

Figure 81:
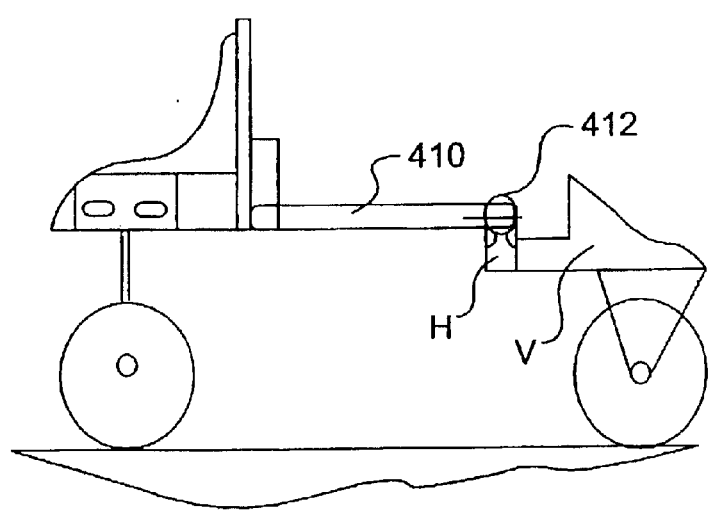
FIG. 81 is a side elevational view of yet another aspect of the invention which can be incorporated in previously described, and about to be described, embodiments.

Referring to FIG. 81, a center pull handle 410 is modified to include a permanent or detachable hitch device 412. This device 412 may simply comprise an outermost portion of the cross arm of the U-shaped handle 410 modified so as to define an opening in which a ball hitch H of a vehicle V is received. Of course, other devices can be employed as device 412 for making a connection to different types of trailer hitches for motorized vehicles, motorcycles, bicycles and other wheeled vehicles.

It will be appreciated that the invention is not limited to the embodiments described above nor to specific variations in these embodiments that have been previously described. Moreover, the various features of the specific embodiments need not necessarily be combined, and different features can be used with different basic embodiments or with completely different carrier devices, or like rolling devices. For example, the wheel mounting means and handle arrangement can be used with an embodiment that does not include collapsible walls.

Figure 82:
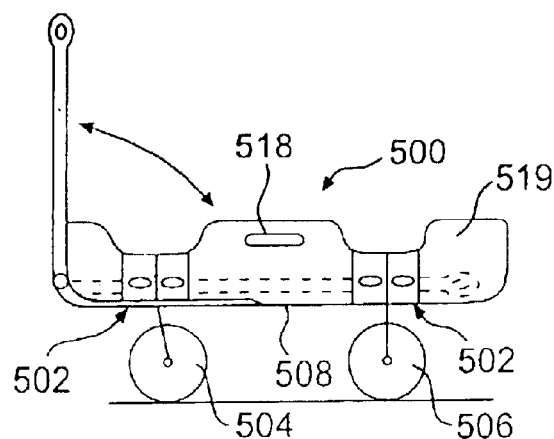
FIGS. 82, 83 and 84 are a side elevational view, a top plan view and a transverse cross-sectional view, respectively, of a four wheel carrier device in accordance with yet another embodiment of the invention.
Figure 83:
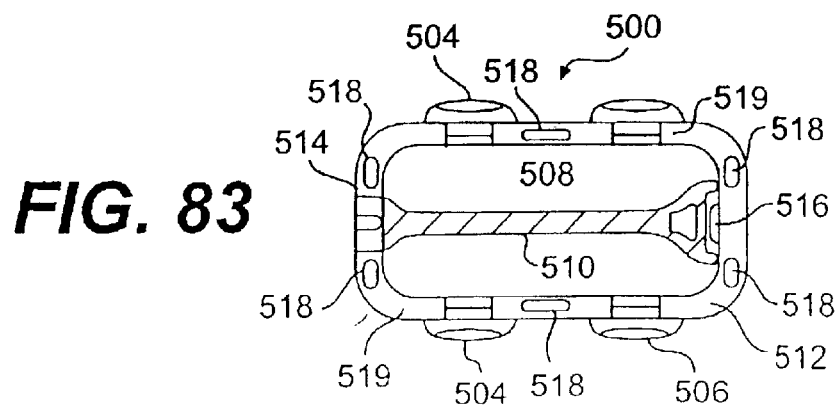

Referring to FIGS. 82 to 87, there is shown a further embodiment of the four wheel carrier device of the invention which uses a 270° pivoting wheel assembly. This embodiment is perhaps most analogous to what consumers think of as the familiar "little red wagon" that is popular with children. Referring first to FIGS. 82 and 83, the carrier device, which is generally denoted 500, includes wheel assemblies 502 which are similar to those described above and thus will not be described in any detail. Wheel assemblies 502 are shown with the front wheels 504 and rear wheels 506 in the erected or operative state, having been pivoted from a flat, stowed state in the bed 508 of carrier device 500. A pivoting handle 510 is shown, in solid lines, in an inoperative, non-stowed state in FIG. 82, and in a stowed state, folded within the bed 508 of carder device 500, in FIG. 83. Within an opposing end wall 512, opposite the end wall 514 at which the proximal end of handle 510 is pivotably mounted, is a latch or retaining protrusion 516 which engages handle 510 in the stowed position thereof so as to retain handle 510 in that stowed position. A series of suitable hand holds 518 are provided in the end walls 512 and 514 as well as the side stub walls 519.

Figure 84:
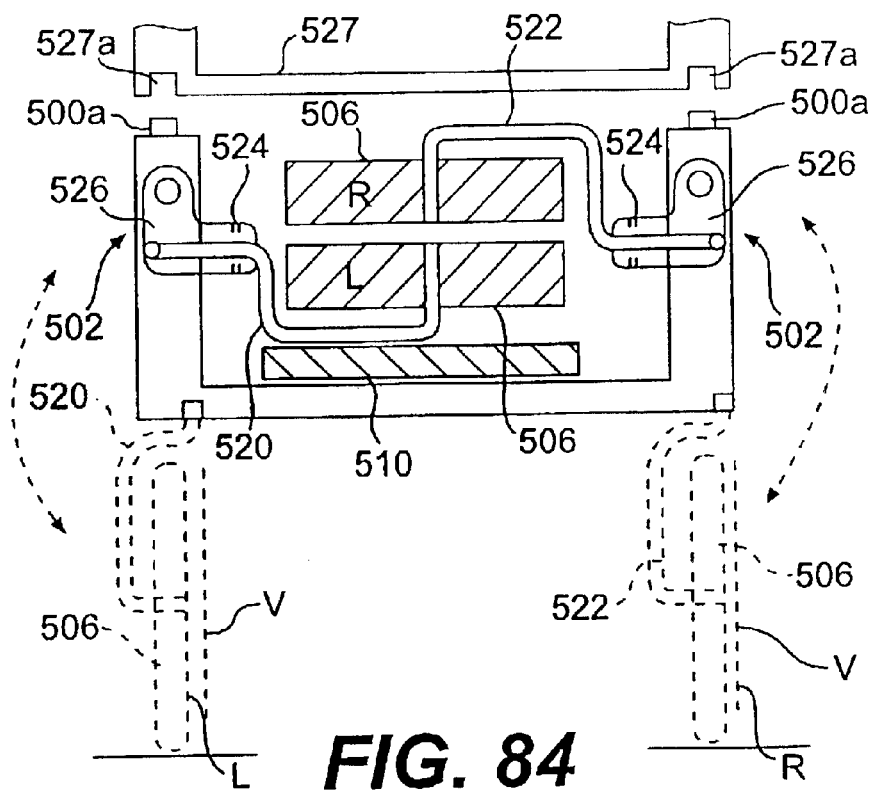

Referring to FIG. 84, the chief distinguishing feature of this embodiment is perhaps best shown in this figure, i.e., the provision of an arrangement wherein opposing wheel assemblies 502 are stacked within the carrier bed 508, i.e., wherein one of the assemblies 502 overlies the other. As illustrated, the wheel assemblies 502 include wheel support axles 520 and 522, respectively, which support respective wheels 506. As illustrated, support axles 520 and 522 are of offset U-shape which provides that the respective wheels 506, when erected as shown in dashed lines, are offset from the vertical, i.e., from a vertical dashed line, denoted V, drawn through the connection to corresponding wheel assembly 502. The wheel assemblies 502 are stowed into carrier bed 508 in a predetermined sequence, viz., first, axle 520 and then axle 522, and the offset in axles 520 and 522 enables the wheel 506 associated with support axle 520, which is also denoted L for left (as viewed in FIG. 84), to be stowed beneath the other wheel 506 associated with support axle 522, which is also denoted R for right, as illustrated. In the embodiment shown, wheels 506 are fixed, i.e., prevented from a rotation about vertical axis, by, e.g., a respective pin 524 in a corresponding support member 526, as discussed above in connection with previous embodiments. When the user desires to fold or collapse the wheels 506 from the operative position shown in dashed lines in FIG. 84, to the stowed position shown in solid lines, the user first pivots or folds the left non-rotating wheel 506 (i.e., wheel L) followed by the right non-rotating wheel 506 (i.e., wheel R) so that the latter overlies the former. It is noted that, as shown in FIG. 84, the wheels 504 both are stowed above the handle 510, but the handle may instead be stowed above the stowed wheels. Alternatively, rather than create an offset through the accentuated "U" shape bend in the axles 520 and 522 of each wheel 506 (as shown in FIG. 84), the "sandwiching" of opposing wheels 506 may be accomplished by providing that one side stub wall (or frame side member should no base be used) extends to a higher plane than the opposing side wall so that the offset needed for the sandwiching of the wheels 506 in the stowed state is achieved. FIG. 84 also shows a second carrier device 527 adapted to be nested on carrier device 500, by means of recesses 527a in the underside of carrier device 527 which receive protrusions or projections on the side walls of carrier device 500.

Figure 85:
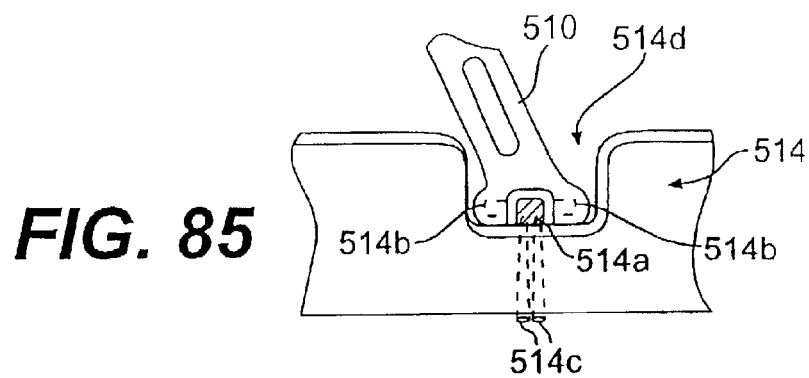
FIG. 85 is a perspective view of a detail of the embodiment of FIGS. 82 to 84.
Figure 87:
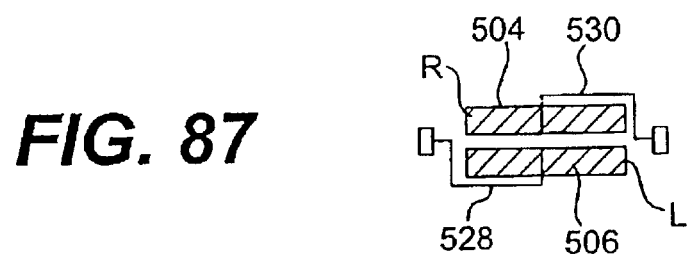
FIG. 87 describes a detail of the stowed wheels of FIG. 86.

FIG. 85 illustrates one approach to pivotably mounting the distal end of handle 510 on end wall 514. In this embodiment, a pivot member 514a including oppositely extending lugs or ears 415b, is secured to wall 514 by suitable fasteners 514c. Lugs 514b are received in corresponding recesses in the proximal end of handle 510. As shown, the proximal end of handle 510 is being received in a cutout 514d in end wall 514.

Figure 86:
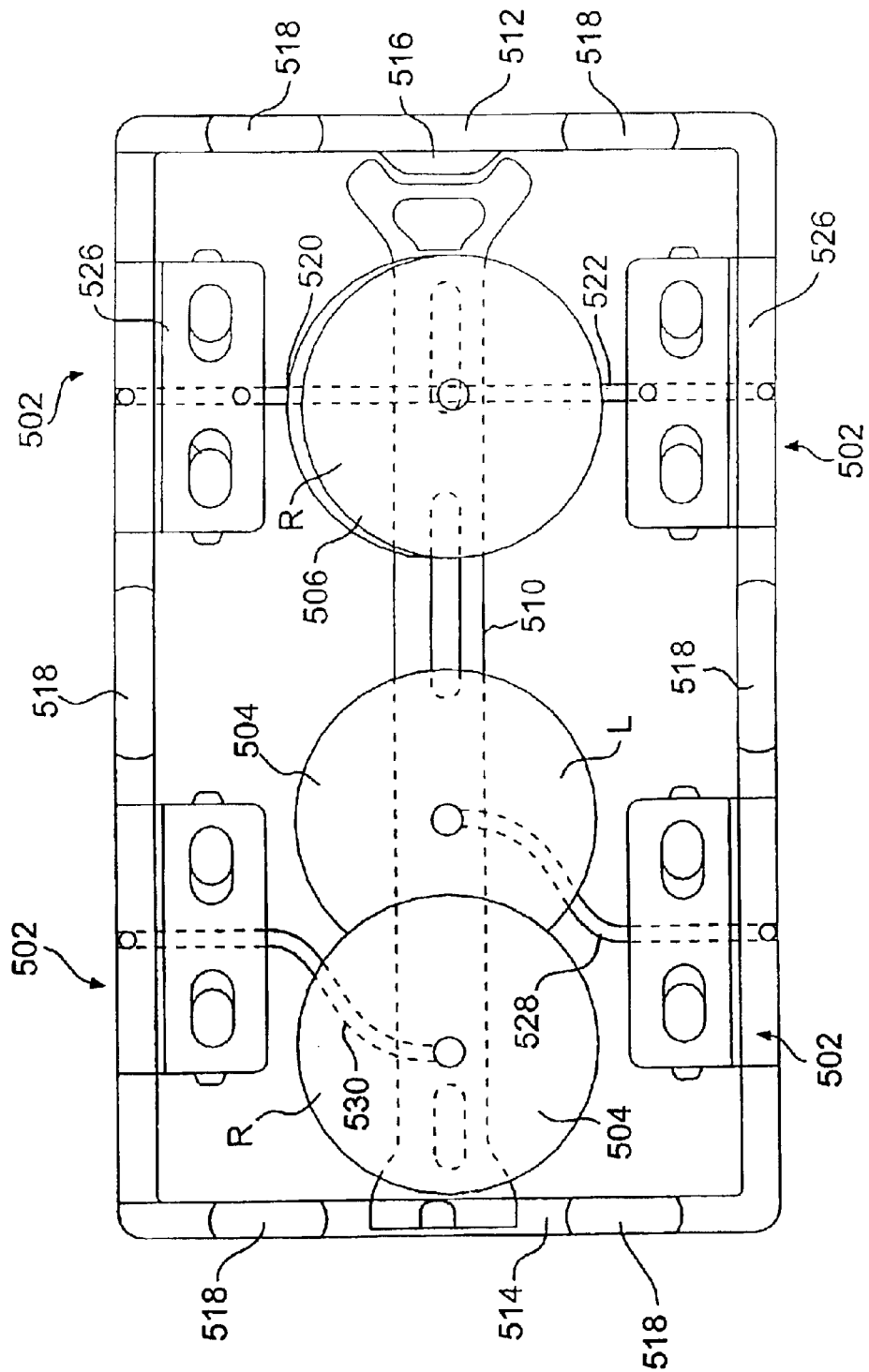
FIG. 86 is a top plan view of the embodiment of FIGS. 82 to 84, showing the collapsed state thereof.

This stacked arrangement of the rear wheels 506 and handle is also illustrated in FIG. 86, which also shows that front wheels 504, while arranged in a stacked relation, are not in full registration, i.e., the top wheel R does not completely overlie the bottom wheel L. As in earlier embodiments described herein before, the front wheels 504 are able to rotate through a full 360°. Front wheels 504 include support axles 528 and 530, respectively, which are offset as to permit stacking of the wheels, i.e., axles 528 and 530 are offset similarly to axles 520 and 522. It is noted that, in contrast to rear wheels 506, either of the front wheels 504 can be folded or pivoted into the carrier device 500 first. However, to stack the wheels 504, the user must rotate the wheel 504 that is first folded into the carrier device 500 so that the corresponding support axle (e.g., axle 528 or 530) faces downwardly into carrier bed 508 and the other wheel 504 is then folded into the stowed position thereof with the support axle (e.g., axle 530 or 528) facing upwardly. This is shown in FIG. 85 for the situation wherein the right wheel 504 (R) partially overlies the left wheel 504 (L).

Figure 88:
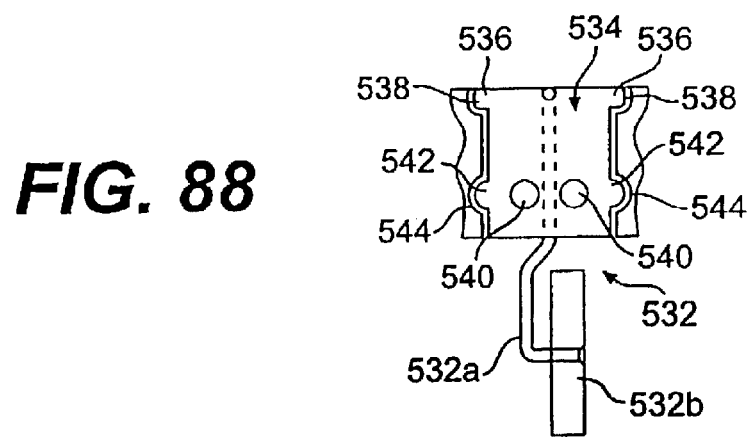
FIG. 88 is a side elevational view of the support assembly wheel in accordance with an alternative embodiment of the invention which is applicable to other embodiments of the invention.

Referring to FIG. 88, there is shown an alternative, simplified pivoting wheel assembly, generally denoted 532. In this embodiment, the assembly 532 includes, in addition to a support shaft 532a and a wheel 532b, a unitary wheel support member 534 including oppositely extending stub shafts or ears 536 (which replace the cylindrical dowel-receiving construction described above). This arrangement permits ears 536 of member 534 to be snapped into corresponding recesses 538 in adjacent portions of the side wall. Simple finger grips or gripping holes 540 are provided in member 534 (rather than the spring-loaded latches described above) and projections or protrusions 542 molded into unitary member 534 are adapted to fit snugly into corresponding recesses 544 in the adjacent stub walls. The resilient holding forces between projections 542 and recesses 544 are such that a user can overcome these forces with suitable effort and, in this regard, can either snap the wheel assembly 532 into the operative position thereof or can release the resilient holding forces so as to enable pivoting of the assembly 532 from this operative position to a stowed position inside of the bed 508 of carrier device 500. By providing a multiple number of slight protrusions along the outer facing surfaces of the ears 536 which match a series of slight depressions within the recesses 538 of each adjacent side wall, a ratchet-like effect can be achieved as a wheel assembly 532 is pivoting to a stowed position. This also serves to positively retain each wheel assembly 532 in the stowed and inoperative position within the carrier profile. It will, of course, be understood that this simple unitary wheel support structure can be used in any of the carrier devices previously described above.

Figure 89:
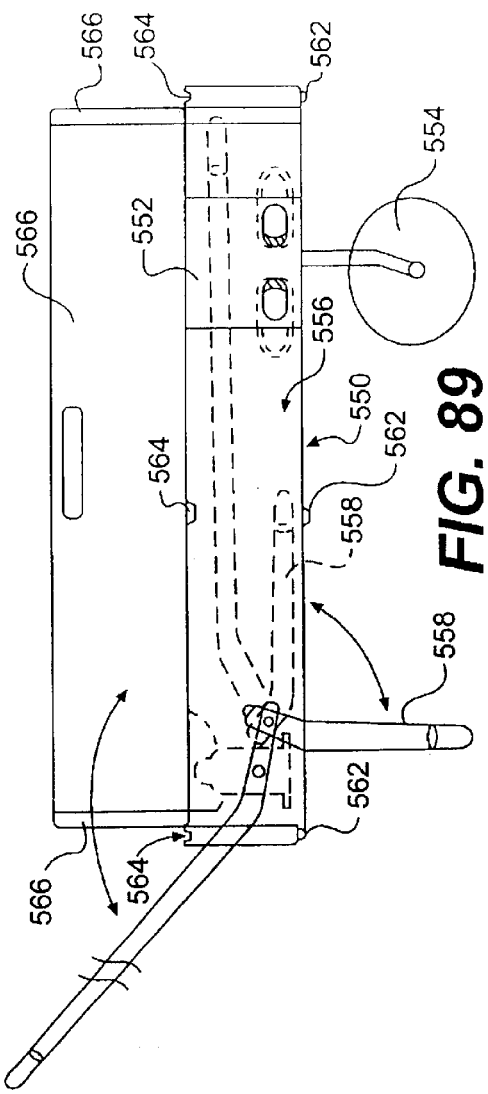
FIG. 89 is a side elevational view of a two wheel carrier device in accordance with a further embodiment of the invention.
Figure 90:
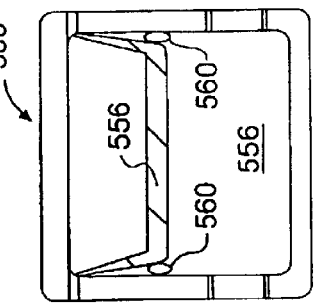
FIG. 90 is a simplified top plan view of the embodiment of FIG. 89.

Referring to FIG. 89, yet another embodiment of the above-described two wheeled cart or carrier device is shown. This embodiment includes a support stand different from those described previously, and the overall device, which is generally denoted 550 and which will only be described briefly, includes a wheel assembly 552 including a wheel 554, and a carrier bed 556. In this embodiment, as in the other two wheel cart embodiments described above, the support stand 558 pivots through about 90° between an erected or operative position shown in solid lines in FIG. 89, and a stowed or stored position, shown in dashed lines in FIG. 89, wherein stand 558 is disposed generally flush with the base of carrier bed 556. As indicated in FIG. 90, which is a bottom plan view showing the underside of cart 550 with the wheels 554 stowed, the support stand is of a generally U-shaped construction. Protrusions or projections 560 molded into the side walls or the base of carrier bed 556 otherwise affixed thereto, e.g., by screw threaded fasteners, serve to secure support stand 558 in the stowed position thereof, although other simple resilient retaining method or schemes can also be used.

As shown in FIG. 89, there is provided a series or plurality of nesting protrusions 562 extending downwardly from the base of carrier bed 556. These protrusions 562 match, and are intended to mate with, respective recesses of a further cart corresponding to recesses 564 provided in the upwardly faces surfaces of the end and side walls of cart 550, so as to enable stacking of the carts. It will, of course, be understood that the locations of recesses 564 and projections 562 can be the reverse of that shown, i.e., the recesses 564, rather than the projections 562, can, e.g., be provided in the base of carrier bed 556.

Figure 91:
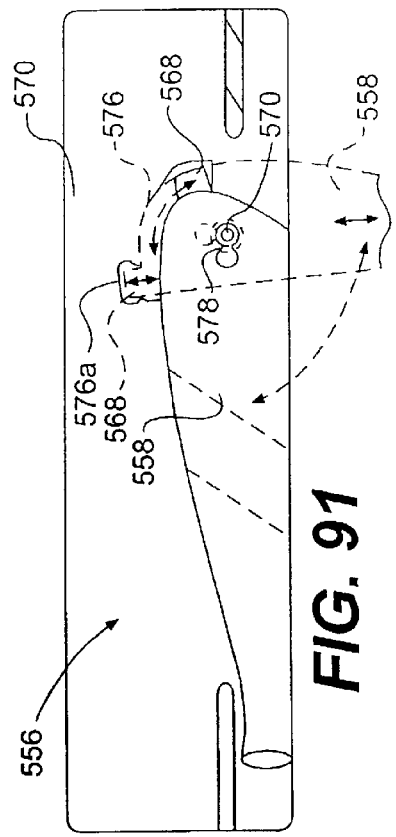
FIGS. 91, 92, 93, 94 and 95 are various views of details of locking or latching mechanisms used in, or useful in, the embodiment of FIG. 90.
Figure 92:
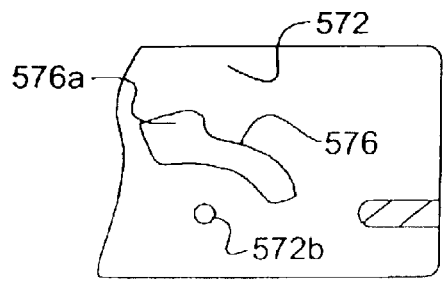
Figure 93:
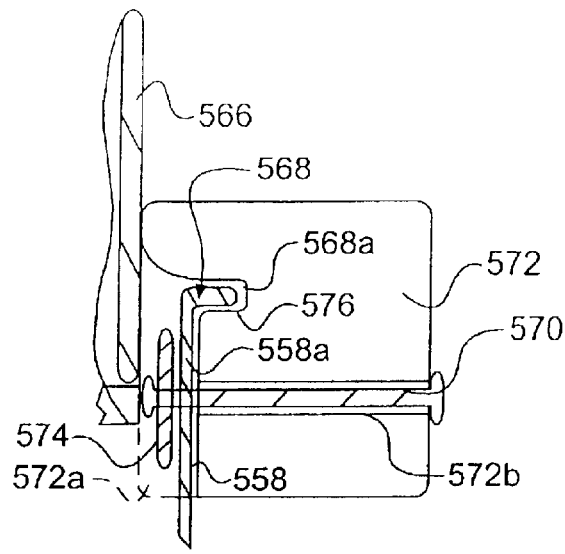

Referring to FIGS. 91 to 93, further details are shown of the support stand arrangement of FIGS. 89 and 90. As can be best seen in FIGS. 91 and 93, a short bent or U-shaped lug or leg 568 is provided at the proximal end 558a of support stand 558 which includes a portion 568 that extends at 90° to the plane of support stand 558. As shown in FIG. 93, this proximal end portion 558a of support stand 558 is flattened, i.e., of a narrow, flat profile, and a bolt 570 extends through the corresponding side wall 572 to provide an axis of rotation for both support stand 558 as well as a pull handle 574 described in more detail below. The side wall 572 is recessed in this area, as indicated at 572a so as to accommodate support stand 558 and handle 574 with interfering with a folding side wall 565.

As shown in FIG. 92, as well as in FIGS. 91 and 93 a generally arcuate recess or cavity 576 is molded or otherwise created in side wall 572 in which lug 568 is received and which thus provides a guide path for the movement of lug 568 and thus of support stand 558. Cavity 576 includes an enlarged portion 576a at the upper end thereof in which lug 568 is received in the "locking" or erected position of support stand 558. An elongated opening or hole 578 best seen in FIG. 91 helps facilitate this. To explain, the support stand 558, once pivoted to the erected position thereof, is pressed upwardly into the locking position 576a of cavity 576 because of an oppositely acting force exerted by pressure on the bed 556 (e.g., due to downwardly acting loading provided by weight added to the cart) or by a similar force exerted manually by the user on the carrier device 500 itself. The lug 568 is enabled to move upwardly into locking portion 578a as the support stand 557 moves upwardly into the upper end of the elongated opening 578 in support stand 558 through which bolt 570 passes. Bolt 570 extends through an opening 572b in wall 572 and handle 558 can be moved a limited amount relatively thereto because of elongated opening 578. Conversely, when the user wishes to collapse the support stand 558, a slight downwardly acting force is exerted on stand 558 to move lug 568 out of locking portion 576a of cavity 576 and to drop the stand 558 into the lower end of opening 578, so that stand 558 can then simply be pivoted to the stowed position thereof generally flush with the base of the carrier device 500.

Figure 94:
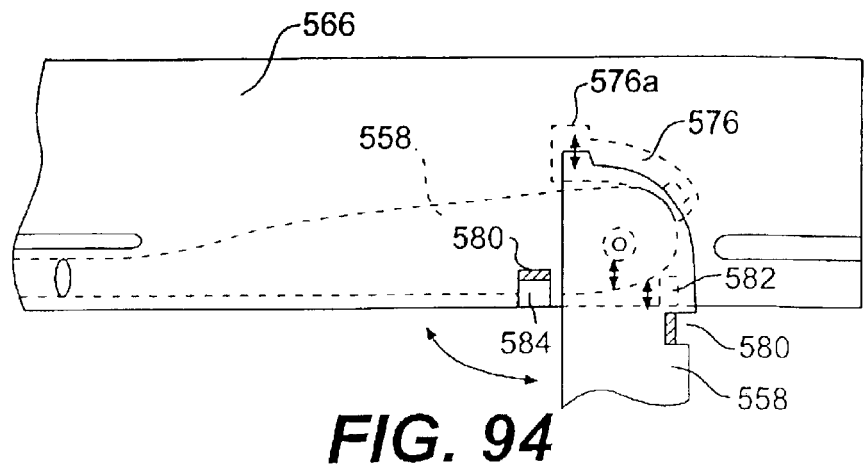

Referring to FIG. 94, there is shown an alternative embodiment of the support stand just described wherein corresponding elements have been given the same reference numerals. In the embodiment of FIG. 94, a second, stop lug 580 is molded into, bent 90° out of, or otherwise provided along a side leg of support stand 558. Lug 580 acts as a stop when the support stand 558 is pivoted from the stowed position indicated in dashed lines to the operative position shown in solid lines, by abutting against a fixed portion of the cart 440 and thus prevent overpivoting of the stand 558. The elongated slot 578 enables upward movement of support stand 558 and, in a further alternative implementation of this embodiment, lug 580 can be pressed upwardly into a notch or recess 582 provided in an adjacent fixed portion (e.g., stub wall 566) of cart 550 to ensure proper locking thereof in the operative position. As shown, a suitable notch or recess 584 can also be located in a lower area of stub wall 566 for cooperating with lug 580 to secure the support stand 558 In the stowed position thereof.

It will be appreciated that an alternative support stand "operative position" locking or retention technique may be employed which differs from the various techniques shown at FIGS. 67 to 75 and 89 to 94. In this embodiment, a spring loaded pin or bolt (not shown) can be provided which extends through the side wall corresponding, e.g., to side wall 566 of FIG. 94 so as to automatically pass into a corresponding opening/hole (not shown) through the flattened "head" area of the support stand 558 when the stand is pivoted to the operative position. The user would pull this spring loaded pin outwardly from the exterior of the side wall, while pivoting the stand to the stowed position, in order to "unlock" the stand and recess the same.

Figure 95:
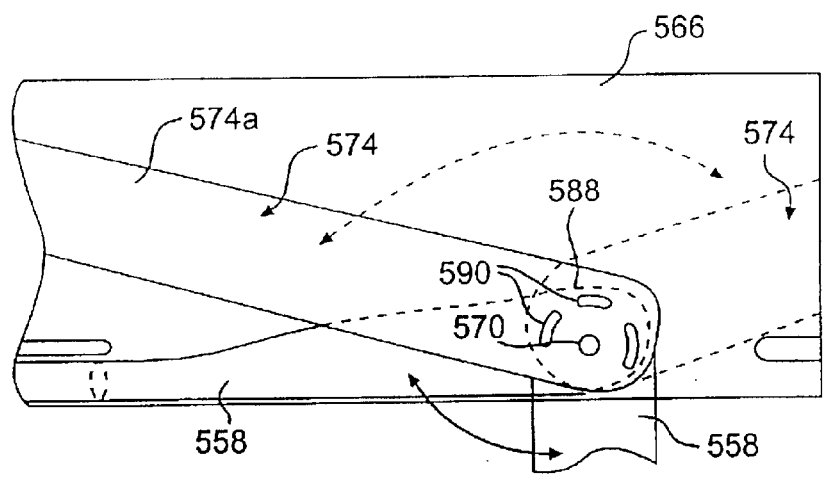

Referring to FIG. 95, yet another embodiment of the support stand is shown. In this embodiment, the support stand 558 still pivots or rotates around the pivot bolt 570, as does a flattened portion 574a of the support handle 574. However, in this embodiment, a washer-like cam member 588 is disposed between, and interconnects, handle 574 and support stand 558. More specifically, member 588 interconnects handle 574 and stand 558 such that when the user pivots handle 574 between the stowed position indicated in solid lines and the operative position shown in dashed lines, member 588 interacts, through a series of interlocking protrusions and recesses indicated generally at 590, with support stand 558 to cause the latter to pivot automatically to the stowed, inoperative position thereof. Similarly, when the user pivots the handle 574 to the inoperative position thereof, stand 558 is caused to pivot to the operative position thereof.

Referring to FIGS. 96 to 99, there is shown a convertible four wheel carrier device in accordance with a further embodiment of the invention. Generally speaking, this embodiment includes a "hide-away" or concealed pivoting pull handle construction as well as a series of features which allow the device to be converted into a different form or configuration for different applications. One application of particular interest concerns a simulated child's "fun car," e.g., a full child size car adapted to be "driven" by a child, and, in keeping with the embodiments discussed above, the invention enables the "car" to be collapsed into a very compact form for easy handling and storage.

Figure 98:
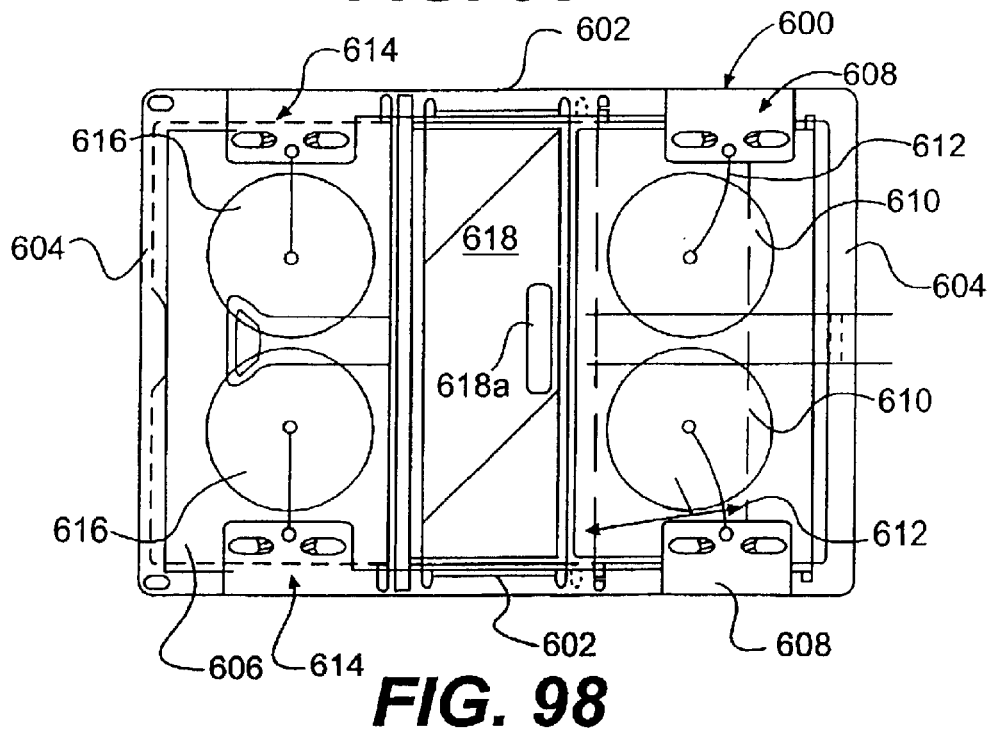

As perhaps can be best seen in FIG. 98, the carrier device, which is generally denoted 600, includes opposed side walls 602, opposed end walls 604 and a generally flat base 606, all of which can be molded together into a single integral construction. In this embodiment, carrier device 600 further includes two wheel assemblies 608 including respective wheels 610 which are rotatable about their respective support axes 612 through 360° and two further wheel assemblies 614 including respective "fixed" wheels 616, i.e., wheels which do not so rotate.

Figure 99:
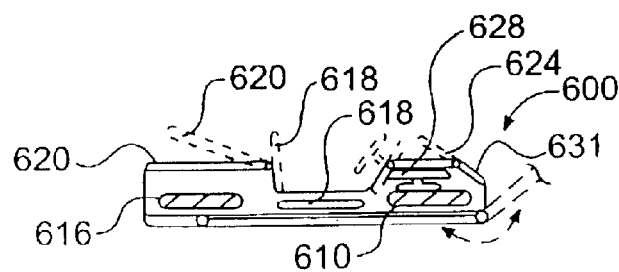

A pivoting seat member 618 is pivotably mounted centrally of carrier or "car" device 600 so as to be pivotable upwardly through 90° to create a seat back against which occupants of the "car" device 600 can lean while sitting in the car, as is perhaps best seen in FIG. 97 and is also shown in FIG. 99. A "trunk" lid or rear cover member 620 serves to provide cover or lid for a compartment 622 (see FIG. 96) at the rear of car 96. Lid 620 can be designed to pivot 180° but need only pivot or open enough to provide access to compartment 622 hidden therebeneath. A front lid or "hood" member 624 is also provided which is adapted to pivot 90° or more and which is described in more detail below.

Figure 101:
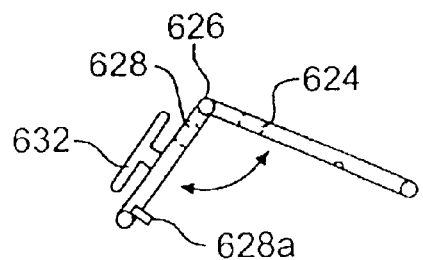
FIGS. 101 to 104 are various views of details of the embodiment of FIGS. 96 to 100.
Figure 102:
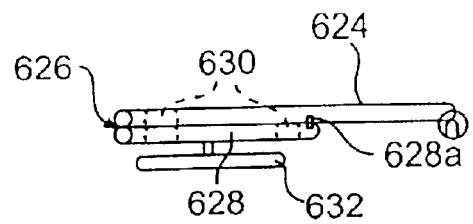
Figure 103:
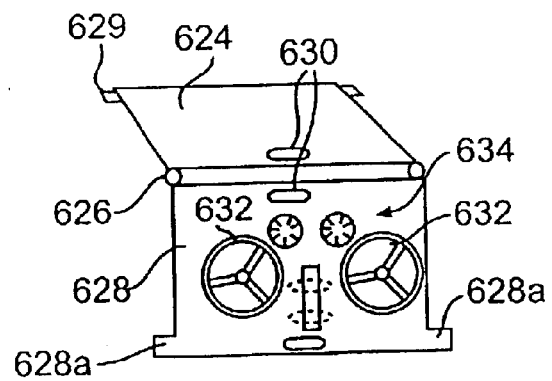

As is shown in FIGS. 101, 102 and 103 as well as in FIG. 97, hood member 624 is hinged by a hinge arrangement 626 to a second foldout "dashboard" member 628. The latter is stored beneath hood member 624 in the inoperative position thereof (see, e.g., FIGS. 97 and 102). Hood member 624 and dashboard member 626 are lifted from the stored positions by placement of the hands of a user in hand holds 630 provided therein (see FIG. 103). When erected, member 624 is hinged by a hinge member 629 or otherwise pivoted connected at the opposite end thereof to a fixed "grill" member 631 at the front of car 500 and formed by a stub wall similarly to those described hereinabove in connection with other embodiments. Members 624 and 628 form a tent-like construction (see FIG. 101) wherein dashboard member 628 faces the "drivers" of the car 600. As shown in FIG. 103, member 628 includes two steering wheels 632 (although a single steering wheel could obviously be employed) as well as various gauges 634 and other ornamentation simulating that found on a real automobile dashboard. Member 628 includes oppositely directed projections or protrusions 728a at the distal end thereof which are received with a resilient fit in openings 636 (see, e.g., FIGS. 96 and 97) provided in the sidewalls of "car" 500.

It will be appreciated that the other lid or cover 620 can also be of a multi-piece, fold out construction similar to that just described, as can pivotable seat back member 618.

Figure 96:
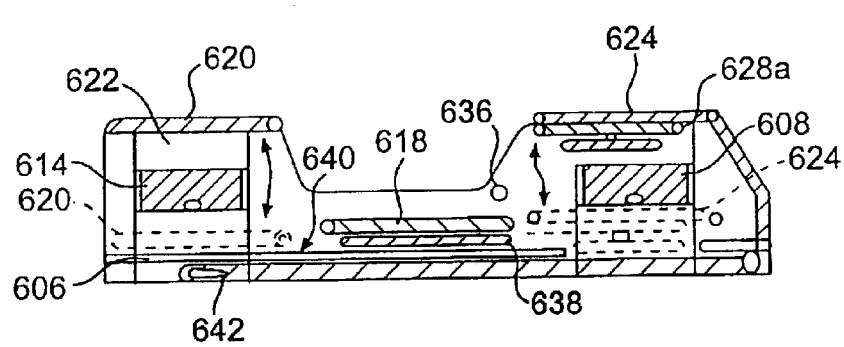

As perhaps can be best seen in FIGS. 96, 97 and 100, a generally flat sliding panel or cover 638 is provided which is slidable between a first, retracted position shown in solid lines in FIG. 97 and a second, operative position wherein cover 638 covers a slightly smaller opening 640 (hidden by a pull handle 642 in FIG. 97 but shown in FIG. 100) in the base 606 of the "car" 600. Opening 640 allows the feet of a child to extend therethrough to the ground to propel the car (as in a "Flintstones" cartoon). With this arrangement, the user, after pivoting the seatback member 618 to the upright position thereof, slides cover 638 out of the way to reveal the opening 640 of the feet of a child. It will be appreciated that cover 638 can be slid forward over opening 640 when the carrier device 600 is used as a pull wagon or cargo carrier, as described below.

Figure 104:
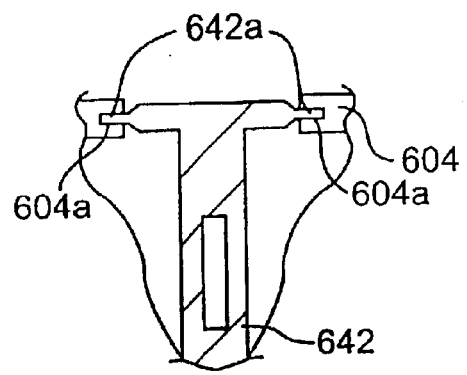

As is perhaps best seen in FIG. 97, pull handle 642 is pivotable (e.g., through about 270°) between a stowed position, along the underside of the base 608 of the carrier device 600, and an operative position. Pull handle 642 can be mounted in any suitable manner so as to provide the required pivoting action, preferably at the lowest portion of the front wall 604 of device 600. In the embodiment illustrated (see, in particular, FIG. 104) handle 642 includes oppositely extending integrally molded ears 642a which resiliently snap into recesses 604a in the front wall 604. To release the handle 642 from the stowed position thereof under carrier device (car) 600 (after the retention elements about to be described have been disengaged), i.e., to put the handle 642 in a position where the user can pull the carrier device 500 using the handle, the device 500 is simply placed on its side or inverted to enable the handle 642 to be freely manipulated. The handle 642 is held in the stowed position thereof by downwardly projecting retention elements 644 (see FIG. 100) provided in the underside of bottom or base member 606 Of course, the pivoting mount for handle 642, as well as retention elements 644, can take other forms.

It is further noted that, as shown in dashed lines in FIG. 97, the handle 642 can also be retained in an upright position generally parallel with the front end wall 604 at which "grill" member or wall 631 is located and suitable retention means or cooperating retention elements (not shown) provided on the handle and in the end wall 604 (or in member 631, if wall 604 and member 631 are separate elements) can be used to releasably retain handle 642 in the upright position.

Considering steps involved in setting up the carrier device (car) 600 from the compact collapsed state shown in FIG. 96, the user lifts, one at a time, covers 642 and 620 to gain access to wheel support members 608 and 614. Both covers 624 and 620 preferably include easy to overcome, snap-fit retention arrangements (not shown) for retaining them in place. With access being provided for the wheel support assemblies 608 and 614, the corresponding latch arrangements 608a and 614a are unlatched with a "finger squeeze" as described previously, and the assemblies are pivoted or unfolded to the operative or erected position thereof shown in FIG. 97. Wheels 608 and 614 may pivot either 270° or 90° to the stowed position, as disclosed hereinafter in this application. The dashboard assembly formed by cover 624 and dashboard member 628 can be erected at this time and snapped into place using resilient projections 628a and cooperating openings 636, described above.

In this setup procedure, the user also pivots cover member 618 to the upright position thereof shown in FIG. 97 where member 618 serves as a backrest. If a child is the intended occupant or user of the carrier device 600, the slide cover 618 would be retained in the stored position shown in FIG. 96 so that the opening bottom opening 640 is exposed. The child can use "foot power" to move the carrier device (car) 600 around, using the simulated steering wheel 632. If a parent or other user is desirous of using the carrier device 600 as a pull wagon or the like, the user can fold out the pivoting handle 642 from the underside of the carrier device 600 in the manner described above and slide the sliding cover 638 forward so as to cover opening 640 to thereby prevent the feet of a child from being pulled under the "wagon" device 600 or from inadvertently passing through opening 640.

If the parent or other user desires to use the carrier device 600 as a wagon or the like, there are features of the disclosed embodiment which provide efficient use thereof as a wagon and, in particular, which enable the carrier device 600 to have a nearly flat base or bed so that the device is more like a conventional wagon. In this regard, lids or covers 620 and 624 can be completely removed (by, e.g., an upward pressure or force which frees the same from a corresponding, non-illustrated retaining recess or groove) and after such removal, as shown in FIG. 96, the lids or covers 620 and 624 can be repositioned and stored at a location just above base or bottom 606. Moreover in this regard, suitable cover retaining recesses (not shown) can be molded into the interior facing side walls to permit the lids or covers 620 and 624 to be retained just above the level of the carrier base 606. The "dashboard" construction formed by members 624 and 628 (along with steering wheels 632 and any other structures projecting outwardly from member 628) can be disposed or positioned to partially or entirely extend through opening 640, as indicated by the dashed line representations of steering wheels 632 in FIG. 100. With this configuration, sliding cover 638 can obviously not be used to cover opening 640, and members 624 and 628 would be stored in a general flush profile with the bottom of the "cargo wagon" so formed, and a relatively flat interior cargo bed would still be provided.

It will be appreciated that although the device 600 is constructed so as to accommodate two children sitting side by side, the width thereof could be made to accommodate a single child occupant. Moreover, rather than providing pivoting wheel assemblies 608 and 614 which are stowed as shown in FIG. 98, the wheel assemblies could be of the type described above in connection with, e.g., FIG. 86. Further, an arrangement could be provided wherein the pivoting handle 642 would still be disposed so as to pass under opening 640 but a child would place one foot on either side of the handle 642 when using the carrier device as a foot powered "fun car." In addition, the dashboard construction comprising members 624 and 628 can be made of a very thin profile so as to permit storage thereof under the carrier base. More generally, in order to fuel the imagination of a child user, simulated headlights and other vehicular and/or other fanciful equipment or features can be molded into or otherwise incorporated into the overall construction.

It will be appreciated that the carrier device 600 of the embodiment of FIGS. 96 to 103 has a thin profile in the collapsed state so as to be readily stowed away whether in a car trunk, on a hook on a wall (or simply by leaning the device against a wall), on a vehicle rack, and so on, yet readily converts into both a "cargo wagon" and "fun car" as described above, or into variations thereof. The device 600 can also be readily stacked or nested with other such devices for storage in marketing or other environments. In the latter regard, protrusions, such as indicated at 646 in FIG. 97, at the bottom of the carrier, and recesses, such as indicated at 648 in FIG. 98, in the upper walls, can be used to assist in this nesting or stacking of the devices (although, again, the locations of protrusions and recesses can obviously be reversed).

Referring to FIGS. 105 to 110, yet another embodiment of the invention is shown. Although not limited to this application, the carrier device of FIGS. 105 to 110 is generally designed for use as what is commonly known as a jogger or stroller. As shown, the carrier device, which is generally denoted 650, includes an open carrier frame 652 which, in the embodiment of FIGS. 105 to 107, supports a front wheel assembly 654 and a pair of rear wheel assemblies 656. As shown in FIGS. 108 and 109, in other embodiments, two front wheel assemblies, denoted 658 in FIGS. 108 and 660 in FIG. 9, can also be provided in contrast to the single wheel assembly 654 of FIGS. 105 to 107. It will also be understood that, for example, in connection with FIG. 108, wheels 658a of wheel assemblies 658 can be stacked one on top of the other, as in previously described embodiments.

Figure 105:
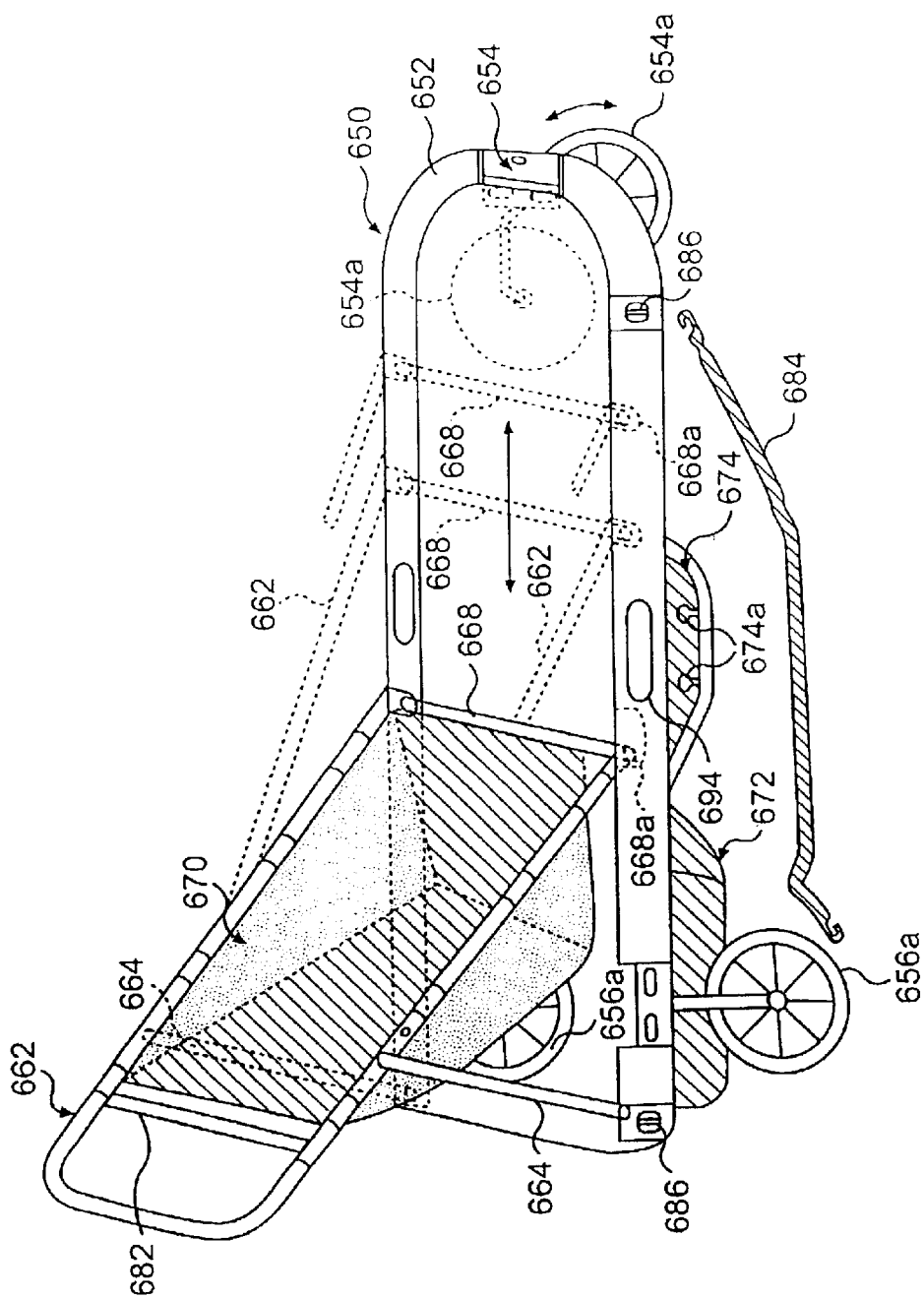
Figure 106:
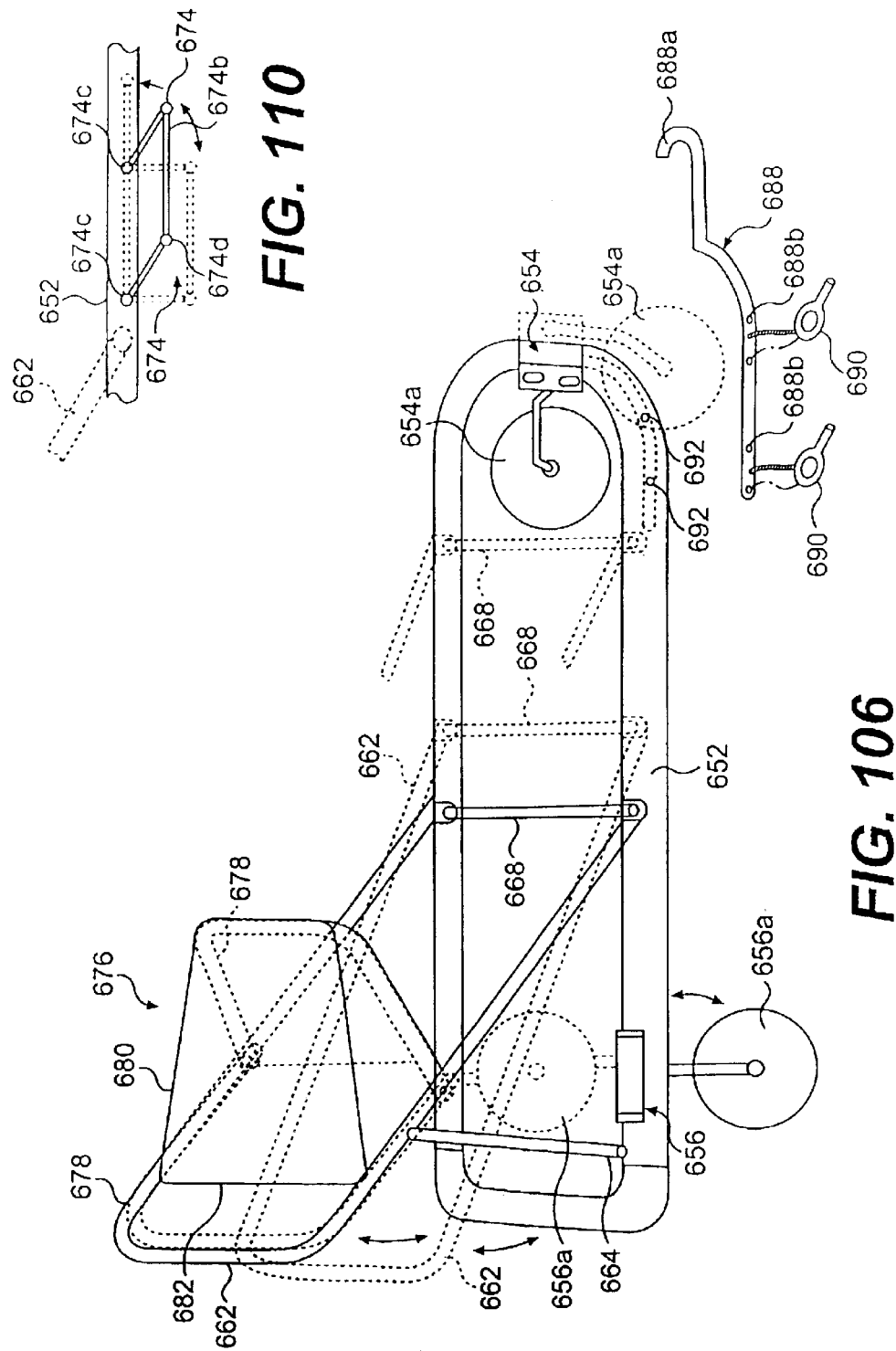

As shown in FIGS. 105 to 107, a U-shaped seat frame member 662 is supported by two spaced support members 664, which, in a preferred embodiment, are affixed at one end to carrier frame 652 and affixed at the other end to frame member 662. In an alternative, non-illustrated embodiment, the support members 664 may instead form the legs of a U-shaped (or inverted U-shaped) support member which may be used to provide further transverse support for seat frame member 662 and/or provide transverse support for the carrier frame 652. A cross member or transverse support member 668 secured to the proximal ends of legs of seat frame member 662 is releasably and selectively affixed to carrier frame 652 at at least two (and potentially more) locations, indicated at 668a along carrier frame 652, as described in more detail below. In FIG. 105, the seat frame member 662 and support member 664 are shown in solid lines in the operative positions thereof. To stow the seat frame member 662, cross member 668 is lifted away from its rearmost location 668a, shown in solid line, and pulled forward together with seat frame member 662, as indicated in dashed lines in FIG. 105 to the forward location 668a. This causes support members 664 to pivot forwardly and downwardly, so that members 662 and 664 are positioned flush with, and extend parallel to, carrier frame 652. To raise or erect the seat frame member 662, the reverse operation is carried out, i.e., the user moves the cross member 668 rearwardly so that by pushing rearwardly thereon, the seat frame member 662 pivots rearwardly and upwardly out of the plane of carrier frame 662, and so that support members 664 are received in locking recesses or cavities described below. As indicated above and is shown in FIG. 107 (as well as FIG. 105), cross member 668 can be fit into either of two sets of recesses 668a in carrier frame 652 so as to fix the position of the crossmember 668 and thus of seat frame member 662.

As indicated in FIGS. 105 to 107, the front wheel 654a of wheel assembly 654 can be pivoted through 270° to a position shown in dashed lines in FIGS. 105 and 106, and in solid lines in FIG. 107, wherein wheel 654a extends inwardly from carrier frame 652 in the plane of carrier frame 652. Wheel 652a can be fixed or locked in the position by locking means described below. Alternatively, as is also described below, wheel 654a can be pivoted through 90°. Preferably, the rear wheels 656a pivot through 90°, although a 270° pivot can be used if desired.

A drop down fabric seat (including a seat base) 670 is provided which is made of a hammock style fabric adapted to collapse and flatten when seat frame member 662 is pivoted to the stowed position thereof and to drop down from seat frame member 652 into the configuration shown when frame member 662 is erected. The seat 670 can include a plurality of solid inserts (not shown) incorporated in the fabric portion thereof to provide shaping, strengthening and support. The fabric of seat 670 is wrapped around frame member 662 and affixed to frame member 662 by suitable means (not shown) such as screws, hooks and loops fasteners, snap fasteners and the like.

A drop down, collapsible or flexible storage receptacle or basket 672 is located beneath seat 670. Basket 672, which is advantageously made of a fabric which is similar to that used in making seat 670, is secured to the inner aspect of carrier frame 652 by suitable means, such as screws, hooks and loops fasteners, snap fasteners and the like. When wheels 656a are pivoted to the stowed position thereof beneath carrier frame member 652, flexible basket 672 is pressed upwardly so as to extend generally parallel with frame member 652. Suitable projections or protrusions (not shown) on basket 672 can be provided which cooperate with matching projections or protrusions (not shown) on the inner aspect of frame member 652 to loosely retain basket 672 in the stowed position thereof. When wheels 656a are pivoted lo the erected state thereof shown in dashed lines in FIG. 105, storage basket 672 can be dropped down, as shown in FIG. 105, so as to form a suitable storage compartment.

A collapsible foot protection section or unit 674 is suspended from carrier frame member 652 forwardly of storage basket 672 and is of a similar construction. In this regard, foot protection unit 674 is made of a flexible sheeting member such as a suitable fabric and can be pressed upwardly to a position in the plane of frame 652 so as not to add to the side elevational profile of carrier device 650. A series of projections or protrusions, indicated at 674a are preferably provided which cooperate with corresponding recesses (not shown) in frame member 652 to loosely hold the unit 674 in the collapsed state in the plane of frame member 652, and so that a simple pushing movement or other pressure on the unit 674 causes the unit to drop down and be deployed beneath the frame member 652. In use, when a child sits on seat 670, his or her feet can be secured in and supported by foot protection unit 674.

As shown in FIG. 106, a folding canopy 676 of the general type used on baby strollers and the like is preferably provided along with seat 670 (which is not shown in FIG. 106). Canopy 676 is mounted on seat frame member 662 by means including a generally U-shaped forward support element 678 which is pivotably connected to opposite sides of member 662. Canopy 676 is constructed of a sheet of suitably flexible material 680 which passes around element 678 as well as an upper cross member 682 that extends between the sides of frame member 662 near the top thereof. The flexible sheet 680, which is preferably made of a suitable fabric, extends between member 682 and U-shaped support element 678 and is preferably releasably secured thereto by, e.g., hooks and loops fasteners or the like. The canopy 676 can be folded out of the way by folding or pivoting the U-shaped element backwardly against seat frame member 662, as indicated in dashed lines.

As shown in FIG. 105, a shoulder strap 684 is preferably provided to enable handle carrying of device 650. Strap 684 is, in use, connected to spaced openings 686 in the outer surface of one side of frame member 652.

As shown in FIG. 106, an attachment device 688 is provided which permits carrier device 650 to be attached to a suitable wheeled device such as a bicycle or other similar cycle or other vehicle so as to be pulled thereby. As shown, attachment device 688 is curved at one end to conform to the shape of the front end of frame 652 and includes a suitable attachment element 688a at the other end. Removable pins 690 having detents or threading at one end thereof are used to attach device 688 to frame 652 and to this end, device 688 includes holes 688b which are aligned with corresponding holes 692 in frame 652 when pins 690 are used to effect attachment of device 688.

As shown in FIG. 105, a handhold 694 is provided in frame 652 to enable gripping thereof. A plurality of such handholds can, of course, be provided.

Referring to FIG. 110, an alternative embodiment of foot protector unit 674 is illustrated In this embodiment, unit 674 includes a flexible member or fabric sheet 674b affixed to frame members 674c which are, in turn, resiliently affixed to the inner aspect of carrier frame 652. Frame members 674c can be pivoted upwardly to lie in the plane of carrier frame 652, as indicated in dashed lines at the top of the figure, and, with some slight user manipulation, can be caused to swing downwardly, towards the ground, so that base forming elements 674d are positioned as shown in dashed lines at the bottom of the figure and define the shape of the unit 674.

Figure 111:
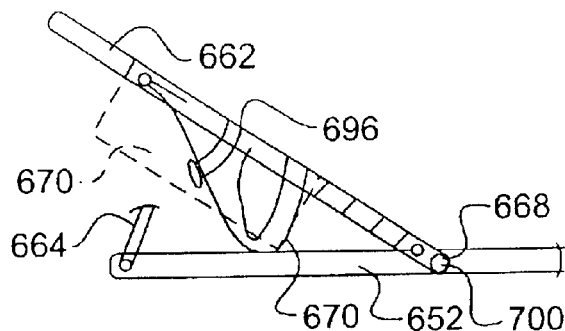
Figure 112:
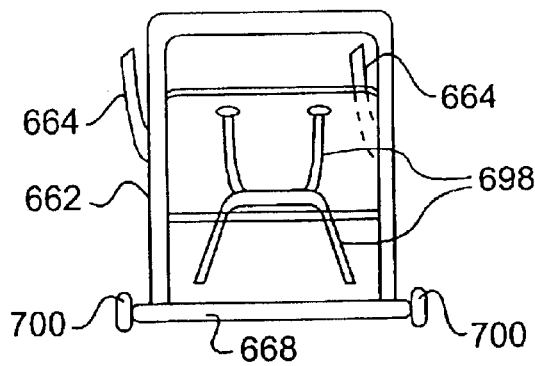

Referring to FIGS. 111 and 112, further views of the seat frame 662 and seat 670 are shown. As indicated in FIG. 111, the hammock style seat 670 drops by gravity to an operative position shown in solid lines. A strap 696 is provided which extends between the sides of seat frame member 662 and which, when released, allows the flexible seat 670 to drop down further, as indicated in dashed lines, to a position wherein a child or infant can recline further, for sleep or additional comfort. Strap 696 can be fabricated of a suitable strapping material and can include releasable fasteners, such as those described above, to provide releasable attachment thereof on seat frame member 662. As illustrated in FIG. 112, suitable belting, indicated at 698, is provided to retain the child seated in seat 670.

It will, of course, be appreciated that the carrier device 650 can widen to accommodate two (or more) children abreast therewithin. Further, additional transverse support beams (not shown) can be provided to strengthen seat frame member 662, as well as carrier frame 652.

Figure 113:
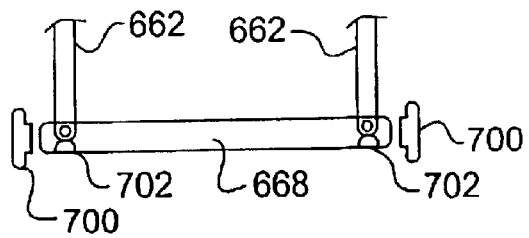
Figure 114:
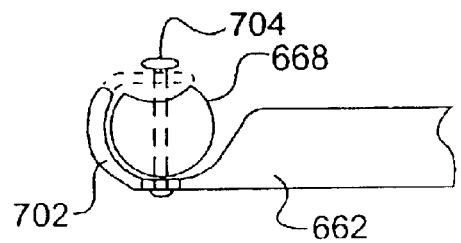

Referring to FIG. 113, it will be seen that cross member or transverse support member 668 includes end caps 700 (also shown in FIGS. 111 and 112). As shown in FIG. 114, frame member 662 is connected to cross member 668 at a shaped, thinned out portion 702 thereof by a pin 704. As indicated in dashed lines, in an alternative embodiment, this portion 704 can extend over and partially around cylindrical frame member 662 so that pin 704 passes therethrough. It will be understood that, alternatively, member 668, rather than member 662, can be thinned and shaped and that, further, members 668 and 662 can be of a one piece unitary construction.

Figure 115:
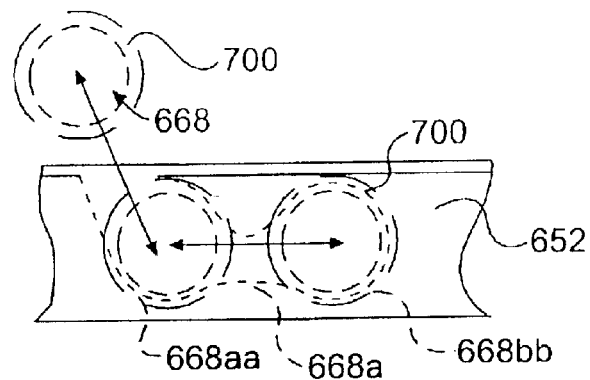
Figure 116:
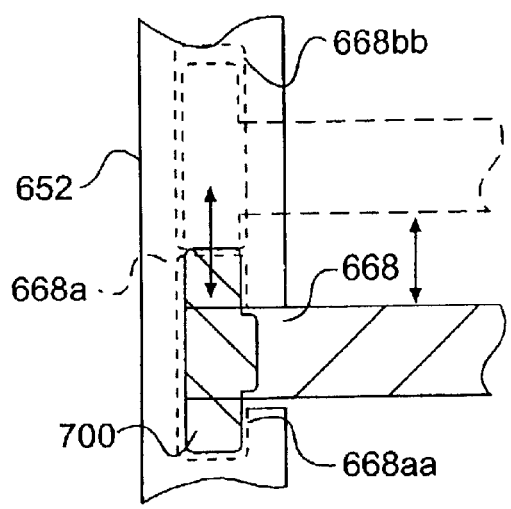

Referring to FIGS. 115 and 116, details of a preferred embodiment of the above-mentioned cavities 668a is shown. As illustrated, cavity 668a includes spaced sections 668aa and 668bb and, in use, an end cap 700 of cross member 668 first drops a section 668aa and is then moved longitudinally along carrier frame 652 so as to be more firmly secured in section 668bb.

Figure 117:
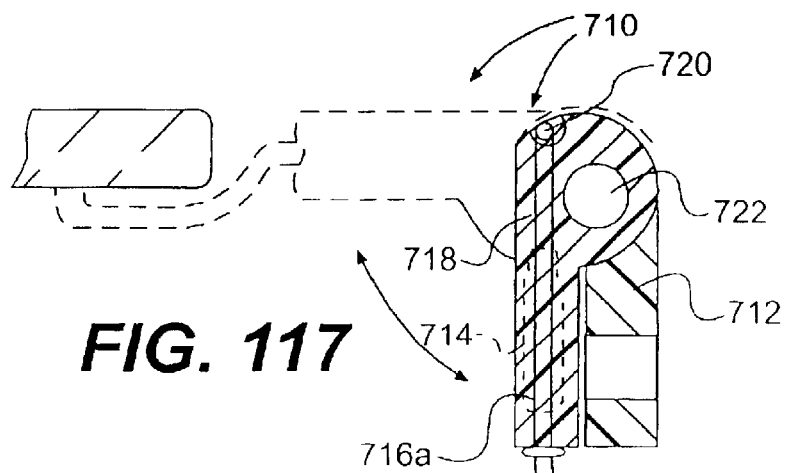
FIGS. 117 and 118 are transverse cross-sectional and side elevation views, respectively, of a wheel support assembly in accordance with a further embodiment of the invention.
Figure 118:
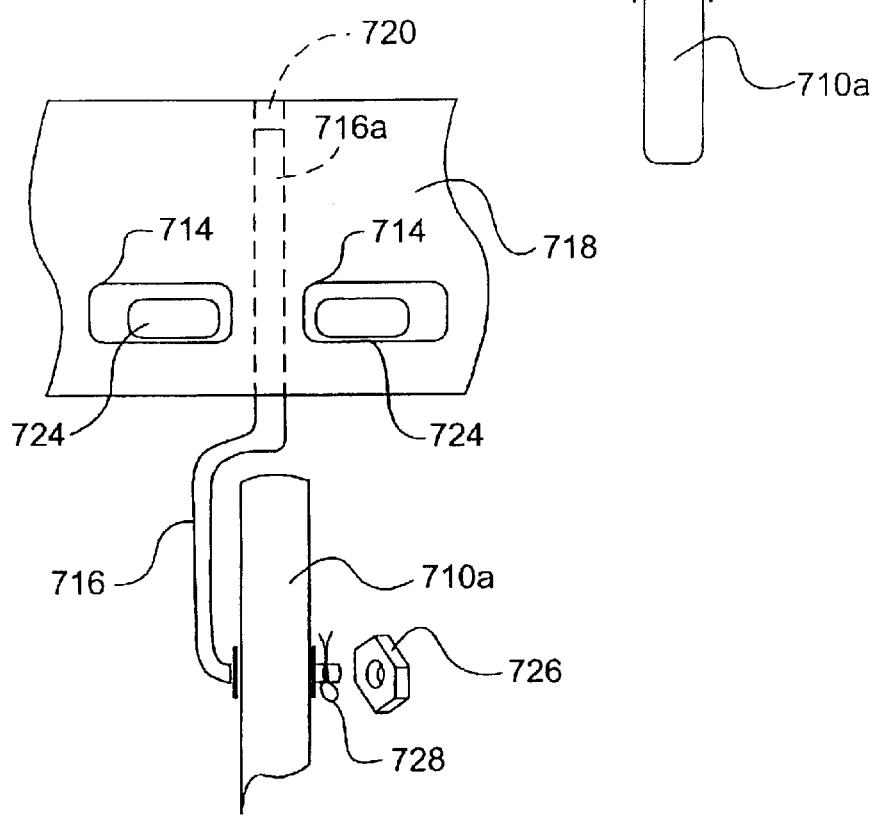
Figure 119:
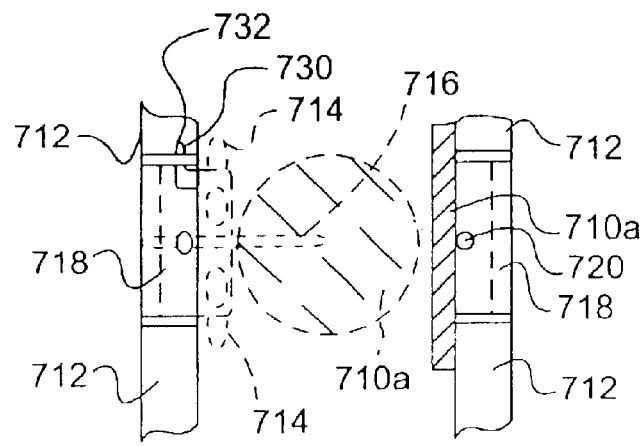
FIG. 119 is a top plan view, partially broken away, of the embodiment of FIGS. 117 and 118.

Referring to FIGS. 117 to 119, there is shown a further embodiment of the invention wherein the pivoting wheel assemblies of previous embodiments have been modified to provide 90° (rather than 270°) pivoting of the associated wheel. The wheel assembly of the embodiment of FIG. 117, which is generally denoted 710, is similar to those of previous embodiments and the description thereof will generally be limited to the important differences. This embodiment is "reversed" relative to the frame wall 712, so that latching mechanism, including opposed latch members (one of which, denoted 714, is shown in FIG. 117) at opposite ends of the pivoting wheel assembly 710, spring outwardly into the wall or frame 712 toward the inner aspect of the wall or frame, rather than toward the outer aspect of the base wall or frame as in previous embodiments. In the operative position thereof, the support axle 716 for wheel 710a extends, at the upper end 716a thereof, through wheel support member 718 and is closed off at its terminal end by a nut or the like 720. The wheel support member 718 is mounted in the wall or frame 712 by a dowel 722 as in the embodiments described above. As best seen in FIG. 118, the user can access the latch members 714 by virtue of through holes 724 provided in the outer aspect of wall or frame 712. In this manner, the user can access the finger latches 714 from outside of the wall or frame 712 or, when no carrier base is provided (i.e., when an open frame is used), from inside the wall or frame 712. Either a permanent nut 726 or a removable cotter pin 728 can be used to affix wheel or tire 710a to axle 716, with the removable cotter pin 728 (or other removable fastener) providing easy removal, where such is desired.

In FIG. 119, an embodiment is illustrated wherein the carrier device is formed by a frame without a base or bottom, i.e., is open at the bottom thereof, so that only walls 712 are seen in the plan view provided in FIG. 119. The finger latches 714 are shown in the outwardmost position, and as discussed in connection with previous embodiments, one (or both) of the latches 714 includes a locking projection or protrusion 730 which is spring biased into a corresponding recess or cavity 732 in stub wall or frame member 714. This arrangement serves to secure the wheel assembly 710, and the associated wheel or tire 710a, in place in the stowed position thereof. By inwardly pressing finger latches 714 in the manner described previously, i.e., by squeezing these latches toward each other, locking projection 730 is released and the wheel 710a can be pivoted to the operative position thereof. It is noted that the opposing pivoting wheel assemblies 710 can be mounted at different levels along the opposed frame walls 714 so that the associated tires 710a are offset when sandwiched in the stowed positions.

Figure 120:
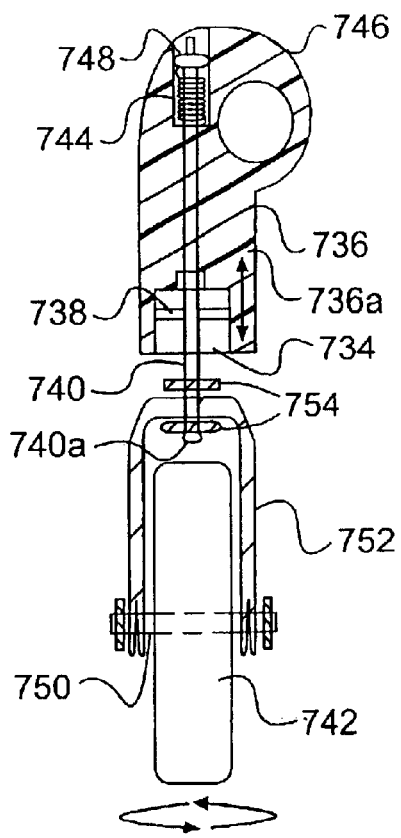
FIG. 120 is a transverse cross-sectional view of a wheel support assembly in accordance with an additional embodiment of the invention, including an alternative rotation fixation arrangement.
Figure 121:
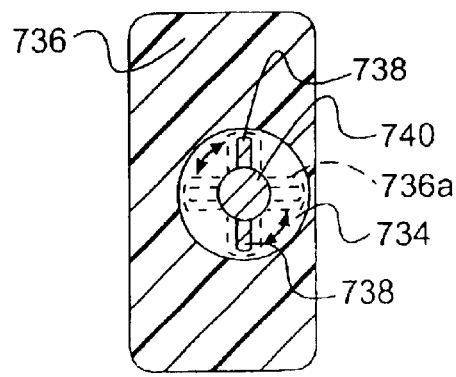
FIGS. 121 is a detail of the embodiment of FIG. 120.

Referring to FIGS. 120 and 121, two further alternative embodiments of the pivoting wheel structure are shown. The embodiment of FIG. 120 is similar overall to previous embodiments and thus, in general, only the most important elements will be described. Broadly speaking, the arrangement illustrated permits the wheels, at the selection of the user, to be fixed or to rotate (vertically) about the corresponding support axle. In FIG. 120, a lower cavity 734 in a wheel support member 736 permits rotation of a transverse pin 738 affixed to wheel support axle 740 for a wheel or tire 742. A second, upper cavity 744 in member 736 accommodates a spring 746 as well as whatever nut or other fastener 748 is affixed to axle 740 at the terminal end thereof. As shown in FIG. 121, pin 738 forms a pair of oppositely extending "ears" which are adapted to be received in corresponding slots or cavities 736a of member 736. Referring to FIG. 120, the "ears" of pin 738 can be rotated a quarter turn and pressed upwardly into cavities 736a and locked in place Alternatively, the cavities can be arranged such that downward movement will have the same locking effect. In general, the purpose of this arrangement is to permit wheel 742 to be locked against rotation by a simple quarter turn operation. It will be noted that a single "ear" (i.e., a single pin extending outwardly in one direction only) can be used, and two (or more) fixation positions can thus be provided for wheel 742. In a further alternative embodiment, a manually controlled fixating pin (not shown) can be employed which is adapted to engage an opening (not shown) in axle 740 and which, in use, is pressed into or pulled out of this opening by the user to effect engagement and disengagement and, when engaged, to thereby fixate wheel 742.

In a further alternative embodiment not depicted but best understood in relation to FIG. 120, a shaped cam or shaped protruding portion of the axle is fabricated to surround one portion of the axle 740 (within a cavity portion of the wheel assembly 736 which is then suitably closed off). Perpendicular to the axle 740, a sliding latch (not shown) is recessed into a corresponding slot within the wheel assembly 736 and affixed thereto, except that the latch is allowed space to slide a suitable distance perpendicular to the axle. By virtue of any suitable shaped finger tab or finger cavity, the user selectively manipulates the sliding latch (by sliding the latch perpendicular to the axle) so that corresponding shaped portions of the latch engage around the periphery of the shaped cam or shaped axle, effectively "locking" or fixating the axle in one or more positions. To alter the "fixation" position, the user slides away the latch, repositions the axle, and then slides the latch back into engagement, or selectively leaves the "latch" in a non-engaged position to allow free rotation of the wheel.

In the embodiment of FIG. 120, a pin 750 passes through the center of wheel or tire 742 and is disposed between and affixed to the legs of an inverted U-shape fork member 752. The latter is affixed to axle 740, which has an enlarged terminal end 740a, by threaded nuts, washers or the like, indicated at 754. Bolts, nuts or the like, indicated at 756, serve in affixing fork member 752 to pin 750. This arrangement provides bilateral support for wheel or tire 750, in common with embodiments discussed above.

Figure 122:
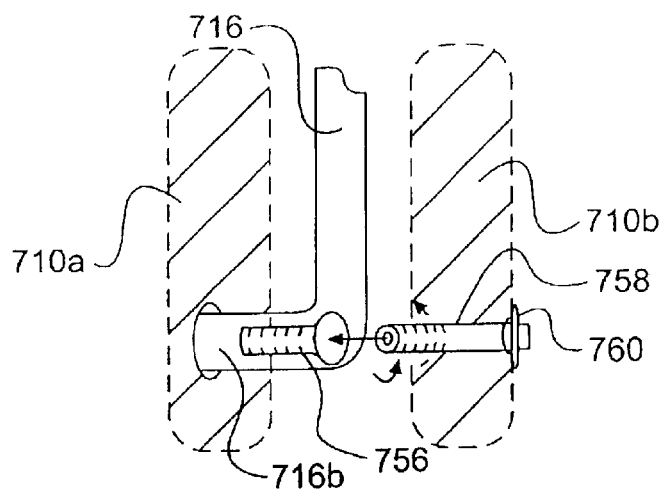
FIG. 122 is a perspective view of a dual wheel attachment arrangement in accordance with another embodiment of the invention.

Referring to FIG. 122, an embodiment is shown which is similar to that of FIGS. 117 and 118 but employs a pair of wheels or tires 710a and 710b. Axle 716 includes a threaded opening 756 in the inwardly curved, orthogonal portion 716b thereof which supports one tire 710a. A threaded axle portion 758 of the second tire 710b is screwed to opening 756 and a nut, cap or the like, denoted 760, holds axle portion 758 in place. In this manner the second tire 710b can be added in a simple, efficient way to axle 716.

Figure 123:
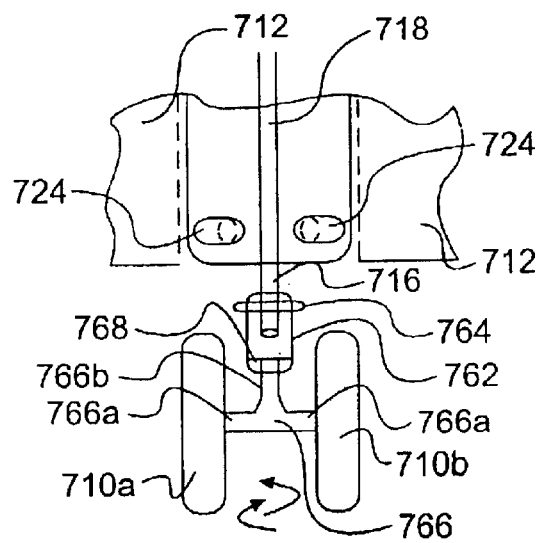
FIG. 123 is a side elevation view of a dual wheel assembly in accordance with a still further embodiment of the invention.

Referring to FIG. 123, a further double tire embodiment is shown. In this embodiment, support axle 716 is received in a sleeve 762 and a transverse pin 764 connects axle 716 to sleeve 762. At the lower end of sleeve 762, a reduced size opening receives a double wheel mounting member 766 including oppositely extending axle shafts 766a and a vertically extending mounting element 766b having a slightly enlarged head. The latter positively engages a lip 768 formed within the opening in sleeve 762, so as to secure mounting member 766 to sleeve 762. As indicated by the arrows in FIG. 123, wheels or tires 710a and 710b can be made free to rotate vertically about axle 740, or may be fixated using any of the various fixating arrangements discussed above. It will, of course, be appreciated that the fixation/rotation methods outlined above in connection with FIGS. 120 and 121 are adaptable to any of the pivoting wheel assembly structures and axle arrangements disclosed herein.

It will be understood that in addition in the various embodiments specifically discussed above with respect to the wheel arrangements and handle, other embodiments can also be used. For example, two sets of wheels can pivot in from the sides as shown, e.g., in FIG. 43, so as to be laterally spaced apart in the stowed position in a carrier device, or arranged as shown in FIGS. 108 and 109, with or without a base (i.e., in combination with an open frame) and with the handle extending between the wheels or with the handle stowed above or beneath the wheels (and/or under the base). Further, the two sets of wheels can overlap, as shown, e.g., in FIG. 86, in a carrier device with or without a base and with or without pivoting handle stowable underneath or above the stowed wheels. Further, a three or four wheel cart or carrier device can be provided with rotatable wheel(s) at the front and back and on each side and a U-shaped handle of the general type shown in FIG. 69, FIGS. 105 to 107 (including a seat frame/handle 662 with or without hammock style seat) or a center handle as shown in FIG. 43 and in FIG. 83. A three or four wheel embodiment can be provided similar to that shown, e.g., in FIG. 69, including a U-shaped pivotable handle which can also function as a child seat, which may utilize any arrangement of wheel structures situated around the carrier perimeter, as discussed hereinabove. Further, a two wheel cart can be provided having a pivotable U-shaped support stand disposed on the under side wherein the arms of the support stand each share a common rotation pin with any suitable pivoting U-shaped cart handle.

It will also be appreciated that while in some embodiments it is useful that the various collapsible components be disposed with the side elevational profile of the base in the collapsed state thereof, in other embodiments, where, for example, the base has a narrow profile (e.g., comprises a simple, open frame) this is not possible or not practical and that, in general, the aim of the invention is to reduce the overall side elevational profile so that the device can be readily stored away and easily handled.

Although the invention has been described above in relation to preferred embodiments thereof, it will be understood by those skilled in the art that variations and modifications can be effected in these preferred embodiments without departing from the scope and spirit of the invention.

What is claimed is:

1. A carrier device for children which, when erected, simulates the appearance of a motor-driven vehicle, said device comprising:

a base member defining a side elevational profile, an outer perimeter and a plurality of stub walls; and a plurality of simulative motor vehicle components, the simulative motor vehicle components being at least partly movable and having a first, operative position, wherein said components simulate a motor vehicle appearance, and a second, stowed position wherein said simulative components stow substantially within the side elevational profile of the base member;

a seat component mounted to the base member which serves at least partly as a seat for at least one occupant of the carrier device;

a plurality of wheel support units mounted to said base member, said units defining a movable wheel mounting member, which incorporates wheel attaching means, and a wheel having an outer periphery, and a central axis of rotation, and movable between a first, operative, position wherein said wheels are erected to provide rolling support for said base member and a second, stowed, position wherein said wheels and their central axis of rotation are displaced through an angle from said first position so as to be disposed substantially parallel with, and substantially within, the side elevational profile of the base member, the central axis of rotation of each said wheel being wholly within, and the outer wheel periphery being substantially within, the outer perimeter defined by said base member; and each movable wheel mounting member which incorporates the wheel attaching means is mounted by oppositely extending mounting elements, and in said first operative position the movable wheel mounting member includes an outer wall which substantially emulates and melds with the contiguous outer stub wall profile, and in the second, stowed position of said movable wheel mounting member the outer stub wall profile is interrupted revealing a cavity, and the movable wheel mounting member is at least close to perpendicular to said movable wheel support member's first operative position; and releasable latching means for positively latching each said wheel support unit in said first and second positions, by interaction of said latching means with the movable wheel mounting member.

2. A device in accordance with claim 1 wherein said simulative motor vehicle components include a collapsible front end portion movable between the first, operative, erected position wherein the front end portion of a motor driven vehicle is simulated, and a collapsed, second, storage position parallel to and substantially within the side elevational profile of the base member.

3. A device in accordance with claim 1 wherein said simulative motor vehicle components include a trunk portion movable between the first, position wherein the trunk portion of a motor driven vehicle is simulated, and a second position wherein the trunk portion is moved and a storage space is accessible between the base member and said trunk portion.

4. A device in accordance with claim 1 wherein said wheel support units move approximately 270° between said first and second positions.

5. A device in accordance with claim 1 wherein said wheel support units move approximately 90° between said first and second positions.

6. A device in accordance with claim 1 wherein said simulative motor vehicle components include a steering wheel.

7. A device in accordance with claim 1 wherein said device includes a handle which in a first, operative, position serves as a user handle for said device, and in a second, stowed, position is substantially parallel with and substantially within the side elevational profile of said base member.

8. A device in accordance with claim 1 wherein the simulative motor vehicle components are manually manipulable wherein in the second, stowed, position said components stow substantially between the wheel support units in their second, stowed, position, and the base member.

9. A device in accordance with claim 1 wherein the simulative motor vehicle components are manually manipulable and permit the wheel support units in their second, stowed, position to be stowed substantially between said simulative motor vehicle components in their second, stowed, position and the base member.

10. A device in accordance with claim 1 wherein wheels are mounted on said base member by a wheel support member including means cooperating with said base member to provide a releasable snap-in connection between said wheel support member and said base whereby release of said snap-in connection enables movement of said wheels between said first and second positions thereof.

11. A device in accordance with claim 1 wherein at least two opposing wh el support units, in said second stowed positions, are at least partly overlapping.

12. A device in accordance with claim 1 wherein said simulative motor vehicle components include means for the user to illuminate at least one of said motor vehicle simulative components.

13. A device in accordance with claim 1 wherein the device includes an opening which permits a separate hook structure to pass through the said opening, permitting the stowed device to be hung from said separate hook structure.

14. A device in accordance with claim 1 wherein at least one said carrier device is equipped with a coupler means to allow said carrier device to be coupled to another wheeled device enabling both of said devices to move together.

15. A device in accordance with claim 1 such that at least two of said carrier devices nest upon each other in their second, stowed, positions.

16. A device in accordance with claim 1 wherein the simulative motor vehicle components include at least one door at least partly mounted to said base member, which door is movable along a hinge.

17. A device in accordance with claim 1 including simulative hood and trunk compartments which a user may manipulate to access cargo stowed at least partly on the base member.

18. A device in accordance with claim 1 wherein at least one occupant's feet pass through an opening in said base member, and said occupant's feet serve to propel the device for rolling movement.

19. A device in accordance with claim 1 which includes braking means controlled by a user, which braking means causes at least one wheel to cease rotation along its central axis of rotation, when at least said one wheel is in the first, operative position.

20. A device in accordance with claim 1 wherein at least one beverage container opening on the base member allows for retention of a beverage within said opening.

21. A device in accordance with claim 1 wherein at least one wheel of said wheel support unit includes an outer rim and a central hub and said hub including a transverse opening therein, and said wheel support unit for said at least one wheel including a wheel support member, and an elongate wheel support element having first and second ends, said wheel support member including a transverse portion at said first end received in said opening in said hub and forming an axle about which said wheel rotates, and a further portion extending orthogonally to said transverse portion and being received in said support member, said further portion terminating in said second end, and said wheel support member including a cavity therein disposed adjacent to said second end, and said wheel support member further comprising a terminal fixing member affixed to said second end of said support element and received in said cavity, said fixing member being of size and shape relative to that of said cavity so as to prevent rotation thereof in said cavity, whereby axial rotation of said further portion is prevented and thus said at least one wheel is prevented from rotation about said further portion and is limited to rotation about an axis formed by said transverse portion.

22. A device in accordance with claim 1 further comprising a simulated trunk component movable into a second, non-stowed position which allows an occupant to be seated at least partly on top of the area of the base, which seat area is at least partly below the area occupied by the trunk component when said trunk component occupies a first, stowed position simulating a vehicle trunk.

23. A device in accordance with claim 1 wherein a panel is movable on the base member to close and open a space through which an occupant may pass their legs when the wheel support units of said carrier device are in a first, operative, position.

24. A device in accordance with claim 1 wherein the said wheel attaching means of at least one of said wheel support units includes a support axle which provides for 360 degree rotation of said wheel about an axis defined by said support axle.

25. A device in accordance with claim 1 wherein components comprising a simulative dashboard and steering means are manipulable from a first, operative, position simulating a motor vehicle dashboard, to a second, stowed, position parallel with, and substantially within the side elevational profile of said base member.

26. A device in accordance with claim 1 wherein a handle is selectively removable from the base member.

27. A device in accordance with claim 1 wherein the simulative motor vehicle components are selectively removable from the base member.

28. A device in accordance with claim 1 wherein the simulated motor vehicle components include simulated electrical gauges on the vehicle dashboard.

29. A device in accordance with claim 1 wherein the dimension of the perimeter of said base member, together with a plurality of wheel support units, is less in the second, stowed position than in the first, operative position.

30. A device in accordance with claim 1 wherein each said wheel support unit includes wheel attaching means substantially vertical to the rolling surface when in the first, operative position and substantially horizontal to said rolling surface when in the second, stowed position.

31. A carrier device for children which, when erected, simulates the appearance of a motor-driven vehicle, said device comprising:
  a base member defining a side elevational profile and a first outer perimeter; and
  a base member, together with a plurality of wheel support units defining a second outer perimeter; and
  a plurality of simulative motor vehicle components, the simulative motor vehicle components being at least partly movable and having a first, operative position, wherein said components simulate a motor vehicle appearance, and a second, stowed position wherein said simulative components stow substantially within the side elevational profile of the base member;
  a seat component which serves at least partly as a seat for at least one occupant of the carrier device;

an opening through at least part of the base member through which an occupant is permitted to pass their feet in order to propel the device along a rolling surface;

a dashboard mounted to the base member with simulated steering means affixed thereto;

a plurality of wheel support units, each including a wheel having an outer periphery, and a central axis of rotation, mounted to said base member and movable between a first, operative, position wherein said wheels are erected to provide rolling support for said base member and a second, stowed, position wherein said wheels and their central axis of rotation are displaced through an angle from said first position so as to be disposed substantially parallel with, and substantially within, the side elevational profile of the base member, the central axis of rotation of each said wheel being wholly within, and the outer wheel periphery being substantially within, the first outer perimeter defined by said base member;

releasable latching means for positively latching each said wheel support unit in said first and second positions; and the simulative motor vehicle components are manually manipulable and permit the wheel support units in their second, stowed, position to be stowed substantially between said simulative motor vehicle components in their second, stowed, position and the base member.

32. A carrier device for children which, when erected, simulates the appearance of a motor-driven vehicle, said device comprising:

a base member defining a side elevational profile, an outer perimeter and a plurality of stub walls; and a plurality of simulative motor vehicle components, the simulative motor vehicle components being at least partly movable and having a first, operative position, wherein said components simulate a motor vehicle appearance, and a second, stowed position wherein said simulative components stow substantially within the side elevational profile of the base member;

a seat component mounted to the base member which serves at least partly as a seat for at least one occupant; of the carrier device;

an opening through at least part of the base member through which an occupant is permitted to pass their feet in order to propel the vehicle along a rolling surface;

a plurality of wheel support units mounted to said base member, said units defining a movable wheel mounting member, which incorporates wheel attaching means, and a wheel having an outer periphery, and a central axis of rotation, and movable between a first, operative, position wherein said wheels are erected to provide rolling support for said base member and a second, stowed, position wherein said wheels and their central axis of rotation are displaced through an angle from said first position so as to be disposed substantially parallel with, and substantially within, the side elevational profile of the base member, the central axis of rotation of each said wheel being wholly within, and the outer wheel periphery being substantially within, the outer perimeter defined by said base member; and each movable wheel mounting member incorporates both said wheel attaching means and releasable latching means; and the releasable latching means for positively latching each said wheel support unit in said first and second positions is one and the same means.

* * * * *